United States Patent
Visco et al.

(10) Patent No.: US 8,048,570 B2
(45) Date of Patent: *Nov. 1, 2011

(54) COMPLIANT SEAL STRUCTURES FOR PROTECTED ACTIVE METAL ANODES

(75) Inventors: Steven J. Visco, Berkeley, CA (US); Yevgeniy S. Nimon, Danville, CA (US); Lutgard De Jonghe, Lafayette, CA (US); Bruce D. Katz, Emeryville, CA (US); Alexei Petrov, Walnut Creek, CA (US)

(73) Assignee: PolyPlus Battery Company, Berkeley, CA (US)

( * ) Notice: Subject to any disclaimer, the term of this patent is extended or adjusted under 35 U.S.C. 154(b) by 930 days.

This patent is subject to a terminal disclaimer.

(21) Appl. No.: 12/032,564

(22) Filed: Feb. 15, 2008

(65) Prior Publication Data

US 2008/0182157 A1 Jul. 31, 2008

Related U.S. Application Data

(63) Continuation-in-part of application No. 11/501,676, filed on Aug. 8, 2006, now Pat. No. 7,824,806.

(60) Provisional application No. 60/706,886, filed on Aug. 9, 2005, provisional application No. 60/713,668, filed on Sep. 2, 2005.

(51) Int. Cl.
*H01M 4/40* (2006.01)
*H01M 4/76* (2006.01)
*H01M 2/08* (2006.01)

(52) U.S. Cl. ........... 429/231.95; 429/231.9; 429/403; 429/322; 429/246

(58) Field of Classification Search ............. None
See application file for complete search history.

(56) References Cited

U.S. PATENT DOCUMENTS

| | | | |
|---|---|---|---|
| 2,996,562 | A | 8/1961 | Meyers |
| 3,607,417 | A | 9/1971 | McRae et al. |
| 3,703,415 | A | 11/1972 | Mitoff et al. |
| 3,912,536 | A | 10/1975 | Galli et al. |
| 4,091,182 | A | 5/1978 | Farrington et al. |
| 4,210,707 | A | 7/1980 | Farrington |

(Continued)

FOREIGN PATENT DOCUMENTS

EP 0838441 4/1998

(Continued)

OTHER PUBLICATIONS

CN patent application No. 2006800376117, Office Action mailed Sep. 25, 2009.

(Continued)

*Primary Examiner* — Krishnan S Menon
(74) *Attorney, Agent, or Firm* — Weaver Austin Villeneuve & Sampson LLP

(57) ABSTRACT

Protected anode architectures have ionically conductive protective membrane architectures that, in conjunction with compliant seal structures and anode backplanes, effectively enclose an active metal anode inside the interior of an anode compartment. This enclosure prevents the active metal from deleterious reaction with the environment external to the anode compartment, which may include aqueous, ambient moisture, and/or other materials corrosive to the active metal. The compliant seal structures are substantially impervious to anolytes, catholytes, dissolved species in electrolytes, and moisture and compliant to changes in anode volume such that physical continuity between the anode protective architecture and backplane are maintained. The protected anode architectures can be used in arrays of protected anode architectures and battery cells of various configurations incorporating the protected anode architectures or arrays.

18 Claims, 26 Drawing Sheets

U.S. PATENT DOCUMENTS

| | | | |
|---|---|---|---|
| 4,401,731 A | 8/1983 | Steinleitner | |
| 4,414,293 A | 11/1983 | Joy et al. | |
| 4,985,317 A | 1/1991 | Adachi et al. | |
| 5,166,011 A | 11/1992 | Rao et al. | |
| 5,314,765 A | 5/1994 | Bates | |
| 5,368,702 A | 11/1994 | De Nora | |
| 5,506,068 A | 4/1996 | Dan et al. | |
| 5,702,995 A | 12/1997 | Fu | |
| 6,025,094 A | 2/2000 | Visco et al. | |
| 6,030,909 A | 2/2000 | Fu | |
| 6,214,061 B1 | 4/2001 | Visco et al. | |
| 6,218,050 B1 | 4/2001 | Yoon et al. | |
| 6,228,527 B1 | 5/2001 | Medeiros et al. | |
| 6,315,881 B1 | 11/2001 | Fu | |
| 6,358,651 B1 | 3/2002 | Chen et al. | |
| 6,383,347 B1 | 5/2002 | Stuart et al. | |
| 6,391,492 B1 | 5/2002 | Kawakami et al. | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,458,622 B1 | 10/2002 | Kesar et al. | |
| 7,282,295 B2 | 10/2007 | Visco et al. | |
| 7,582,385 B2 | 9/2009 | Clarke | |
| 7,824,806 B2 | 11/2010 | Visco et al. | |
| 2001/0041294 A1 | 11/2001 | Chu et al. | |
| 2002/0034678 A1 | 3/2002 | Shibuya et al. | |
| 2003/0082445 A1 | 5/2003 | Smith et al. | |
| 2003/0134198 A1 | 7/2003 | Sawa et al. | |
| 2003/0143456 A1 | 7/2003 | Kazacos et al. | |
| 2004/0067417 A1 | 4/2004 | Oosawa et al. | |
| 2004/0081894 A1 | 4/2004 | Nimon et al. | |
| 2004/0126653 A1 | 7/2004 | Visco et al. | |
| 2004/0142244 A1 | 7/2004 | Visco et al. | |
| 2004/1266536 | 7/2004 | Visco et al. | |
| 2004/0191604 A1 | 9/2004 | Artibise et al. | |
| 2004/0191617 A1 | 9/2004 | Visco et al. | |
| 2004/0197641 A1 | 10/2004 | Visco et al. | |
| 2005/0095506 A1 | 5/2005 | Klaassen | |
| 2005/0100792 A1 | 5/2005 | Visco et al. | |
| 2005/0100793 A1 | 5/2005 | Jonghe et al. | |
| 2005/0147883 A1 | 7/2005 | Kubota | |
| 2005/0175894 A1 | 8/2005 | Visco et al. | |
| 2006/0078790 A1 | 4/2006 | Nimon et al. | |
| 2007/0037058 A1 | 2/2007 | Visco et al. | |
| 2007/0051620 A1 | 3/2007 | Visco et al. | |
| 2007/0117007 A1 | 5/2007 | Visco et al. | |

FOREIGN PATENT DOCUMENTS

| | | |
|---|---|---|
| EP | 1162675 | 12/2001 |
| WO | 2004/001879 | 12/2003 |
| WO | 2004/109823 | 12/2004 |
| WO | 2005/038953 | 4/2005 |
| WO | 2005/038962 | 4/2005 |
| WO | 2005/083829 | 9/2005 |
| WO | 2009/102982 | 8/2009 |

OTHER PUBLICATIONS

U.S. Appl. No. 11/501,676, Office Action mailed Mar. 26, 2010.
U.S. Appl. No. 12/607,360, "Compliant seal structures for protected active metal anodes", Visco et al., filed Oct. 28, 2009.
U.S. Appl. No. 11/514,678, Office Action mailed Jul. 8, 2010.
AU patent application No. 2006280097, Examiner's First Report mailed Jun. 9, 2010.
U.S. Appl. No. 11/501,676, Notice of Allowance mailed Sep. 9, 2010.
Thokchom, Joykumar S., et al., "*Water Durable Lithium Ion Conducting Composite Membranes from the $Li_2O$-$Al^2O_3$-$TiO_2$-$P_2O_5$ Glass-Ceramic*", Journal of The Electrochemical Society, 154 (4), 2007, pp. A331-A336.
Linden and T.B. Reddy, *Handbook of Batteries*, McGraw-Hill, NY 3$^{rd}$ Edition, 2002, p. 38.5.
PCT patent application No. PCT/US2004/033424, International Search Report mailed Mar. 6, 2006.
PCT patent application No. PCT/US2004/033371, International Search Report mailed Mar. 6, 2006.
PCT patent application No. PCT/US2004/033371, Written Opinion mailed Mar. 6, 2006.
PCT patent application No. PCT/US2004/033424, International Preliminary Report on Patentability mailed Apr. 27, 2006.
U.S. Appl. No. 10/824,944, Office Action mailed Sep. 7, 2006.
U.S. Appl. No. 10/824,944, Office Action mailed Mar. 12, 2007.
Loctite® Technical Data Sheet, Loctite® Hysol® E-120HP™, Aug. 2001.
Galbraith, a.D., *The lithium-water-air battery for automotive propulsion*, Chemical Abstracts Service, Columbus, Ohio, Dec. 31, 1976. XP-002355800.
European patent application No. 04 794 699.1, Examination Report mailed Nov. 6, 2006.
WO patent application No. PCT/US2009/034101, International Search Report and Written Opinion mailed Aug. 24, 2009.
EP patent application No. 04794699.1, Examination Report mailed May 31, 2007.
WO patent application No. PCT/US06/30985, International Search Report and Written Opinion mailed Jul. 31, 2007.
WO patent application No. PCT/US06/45407, International Search Report and Written Opinion mailed Aug. 30, 2007.
U.S. Appl. No. 10/824,944, Notice of Allowance mailed Jul. 31, 2007.
U.S. Appl. No. 10/824,944, Allowed Claims.
EP patent application Nno. 06813340.4, Extended Search Report mailed Feb. 24, 2011.
Visco, S.J. et al., "Lithium-Air", Encyclopedia of Electrochemical Power Sources, Dyer (editor), Elsevier, 2009, ISBN: 9780444527455, pp. 376-383.
CN patent application No. 200680037611.7, Office Action mailed May 11, 2011.

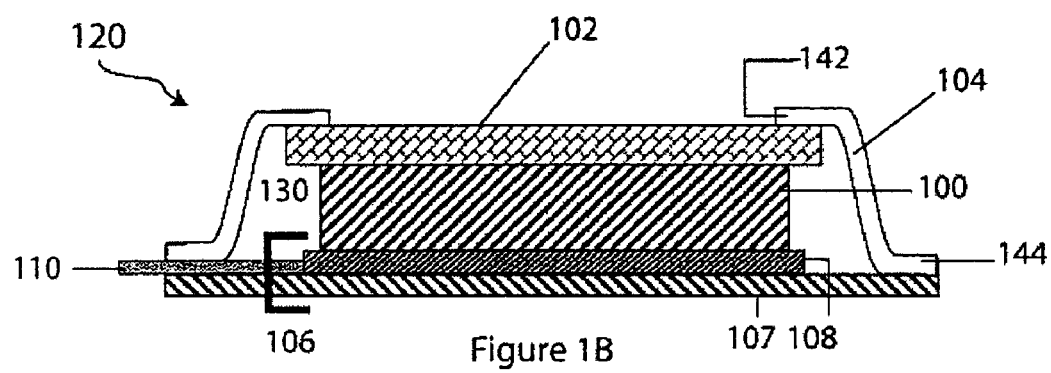
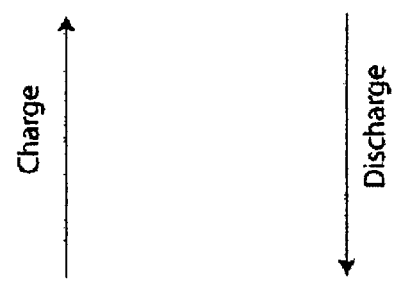
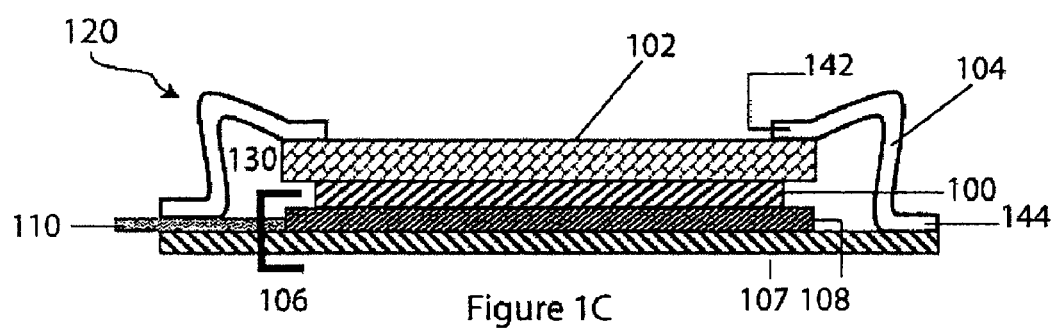

Charge ↑ ↓ Discharge

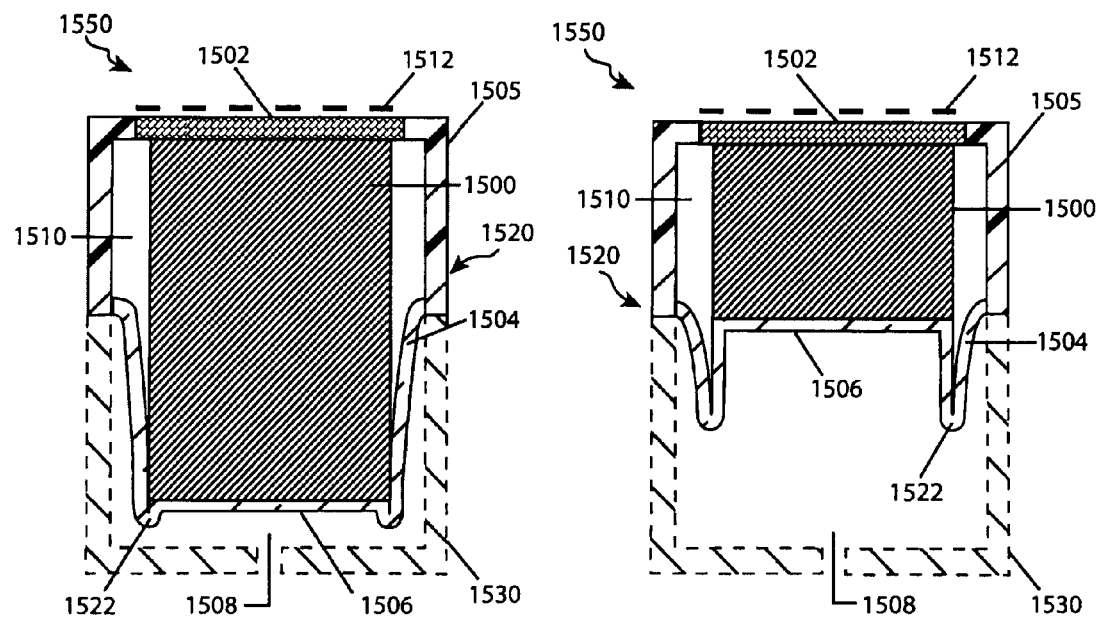
Figure 15A
Figure 15B
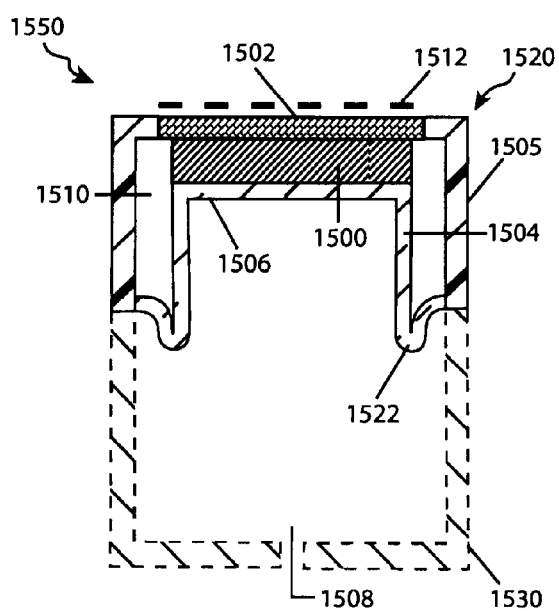
Figure 15C

Discharge of double-sided protected Li anode with compliant seal in seawater

Compliant seal fabrication: cross-sectional views of preformed MLLM shape (a) and MLLM frame bonded to GC plate (b)
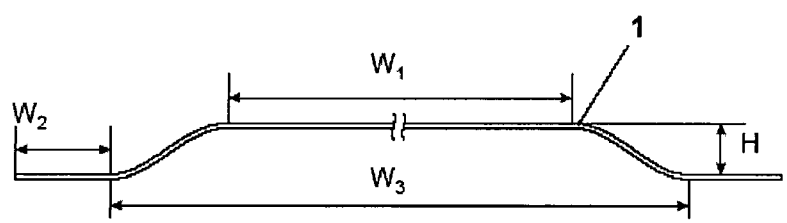
Figure 17A
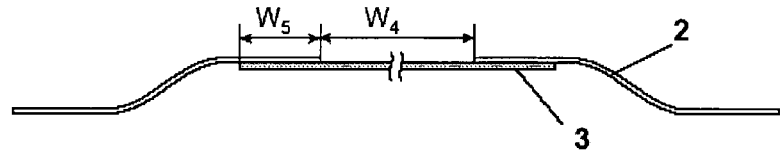
Figure 17B
Figure 17

Discharge of double-sided protected Li anode with compliant seal in aqueous electrolyte containing 3M NH₄Cl

*Peripheral area of the GC plate was coated with $SnN_x$ layer prior to bonding with the MLLM*

Discharge of double-sided protected Li anode with compliant seal in aqueous electrolyte containing 3M NH₄Cl

*Peripheral area of the GC plate was etched with LiOH prior to bonding with the MLLM*

Discharge of double-sided protected Li anode with compliant seal in seawater

*Primary bond between the GC plate and the MLLM was reinforced with epoxy Hysol E-120HP*

COMPLIANT SEAL STRUCTURES FOR PROTECTED ACTIVE METAL ANODES

CROSS-REFERENCE TO RELATED APPLICATIONS

This application is a continuation-in-part of U.S. patent application Ser. No. 11/501,676 filed Aug. 8, 2006, titled COMPLIANT SEAL STRUCTURES FOR PROTECTED ACTIVE METAL ANODES, now U.S. Pat. No. 7,824,806; which claims priority to Provisional Application No. 60/706,886 filed Aug. 9, 2005, titled ELASTOMERIC SEALS FOR PROTECTED ACTIVE METAL ANODES, and U.S. Provisional Application No. 60/713,668 filed Sep. 2, 2005, titled ADHESIVE SEALS FOR PROTECTED ACTIVE METAL ANODES; the disclosures of which are incorporated by reference herein.

BACKGROUND OF THE INVENTION

The present invention relates generally to active metal electrochemical devices. More particularly, this invention relates to protected anodes architectures incorporating compliant seal structures, including single and double sided protected anodes and arrays of protected anodes, and their associated electrochemical cell structures and devices such as batteries, particularly, active metal/air batteries and active metal/seawater batteries, and methods for their fabrication.

The low equivalent weight of alkali metals, such as lithium, make them particularly attractive as a battery electrode component. Lithium provides greater energy per volume than the traditional battery standards, nickel and cadmium. Unfortunately, no rechargeable lithium metal batteries have made significant penetration in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits that can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte that contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Prior work in the present applicants' laboratories has developed technology for protecting active metal anodes with highly ionically conductive protective membrane architectures. These protected active metal anodes structures and associated electrochemical cells, described in applicants' co-pending published US applications US 2004/0197641 and US 2005/0175894, and their corresponding International Patent Applications WO 2005/038953 and WO 2005/083829, respectively, represent major advances in active metal battery technology, for instance rendering possible functional Li/air and Li/water batteries. This technology would be further advanced by the development of appropriate seal structures techniques that would facilitate and/or optimize the incorporation of these protected active metal anodes in a variety of cell structures.

SUMMARY OF THE INVENTION

The present invention addresses this need by providing protected anode architectures having ionically conductive protective membrane architectures that, in conjunction with compliant seal structures and anode backplanes, effectively enclose an active metal anode inside the interior of an anode compartment. This enclosure prevents the active metal from deleterious reaction with the environment external to the anode compartment, which may include aqueous, ambient moisture, organic liquid electrolytes (or catholytes—electrolytes in contact with the cathode, and in some aspects catholyte may also comprise dissolved or suspended redox active species and redox active liquids), aqueous and non-aqueous catholytes, redox active liquids such as seawater, oxyhalides such as $SOCl_2$, dissolved redox species such as transition metal chlorides or bromides, and/or electrochemically active materials corrosive to the active metal, and it prevents loss of volatile components that may be used in the interior volume of the sealed anode.

During discharge, the active metal mass and volume of the anode decreases. If this volume decrease is not compensated in some manner, interfacial gaps between the active metal anode and the protective membrane architecture could result, leading to reduced ionic contact area between the active metal anode and protective membrane architecture with subsequent performance degradation. Similar gaps or voids between the active metal anode and backplane can also degrade performance where the backplane is or includes the anode current collector and electrical communication between the two is disrupted. If such interfacial gaps and void formation in the anode compartment could be eliminated, enhanced electrochemical performance would result along with a compact cell structure.

The compliant seal structures of the present invention are substantially impervious to anolytes, catholytes, dissolved species in electrolytes, and moisture, and compliant to changes in anode volume such that physical continuity (e.g., ionic, electronic and/or mechanical continuity) between the anode, protective architecture and backplane are maintained. The volume of the anode compartment changes in direct relationship to changes in the active metal thickness during charging and discharging of the sealed protected anode and thereby minimizes the volume (and weight) and maximizes the energy density of a corresponding electrochemical cell structure.

In the context of the present invention, physical continuity corresponds to at least one of ionic continuity, mechanical force continuity and electronic continuity. For the anode of the present invention to be in physical continuity with another component, such as the anode backplane or the protective membrane architecture, it is meant that the anode is at least in one of ionic continuity, mechanical force continuity and/or electronic continuity with the other component.

By ionic continuity, it is meant that under an associated electric field and/or concentration gradient active metal ions are transportable between the anode and the protective membrane architecture.

By electronic continuity it is meant that under an associated electric field electrons are transportable between the anode and the anode backplane in the instance whereby the anode backplane provides current collection for the anode.

By mechanical force continuity it is meant that mechanical force applied onto or by the anode backplane and/or protective membrane architecture are transmittable to the anode; and mechanical force applied onto or by the anode are transmittable to the anode backplane and/or protective membrane architecture.

In all instances of the invention, the protective ion membrane architecture is in ionic transport continuity with anode. It may also be in mechanical force continuity with the anode.

In the instances whereby the anode backplane is an insulator, the anode backplane is in mechanical force continuity with the anode.

In the instances whereby the anode backplane comprises an electronic conductor that provides current collection for the anode, the anode backplane is in electronic continuity with the anode. In this instance, the anode backplane may also be in mechanical continuity with the anode.

In the instances whereby the anode backplane is a protective architecture, the anode backplane is in ionic continuity with the anode. It may also be in mechanical force continuity with the anode.

The greater the extent and uniformity of the physical continuity, the better will be the performance of the protected anode architecture. Loss of physical continuity means that the physical continuity has degraded to such an extent that the protected anode architecture of the present invention is no longer functional as an anode.

In one aspect, the invention relates to a protected anode architecture. The protected anode architecture includes an active metal anode having a first surface and a second surface; an ionically conductive protective membrane architecture on the first surface of the anode; an anode backplane on the second surface of the anode; and a compliant seal structure interfacing with the protective membrane architecture and the anode backplane to enclose the anode in an anode compartment, the seal structure being compliant to changes in anode thickness such that physical continuity between the anode, protective architecture and backplane are maintained. The ionically conductive protective membrane architecture comprises one or more materials configured to provide a first membrane surface chemically compatible with the active metal of the anode in contact with the anode, and a second membrane surface substantially impervious to and chemically compatible with an environment exterior to the anode compartment. The compliant seal structure, the protective membrane architecture and the anode backplane are interfaced (e.g., bonded, joined or in contiguity) such that a substantially impervious barrier between the interior and exterior of the anode compartment is provided.

Arrays of protected anode architectures, battery cells of various configurations incorporating the protected anode architectures or arrays, and methods of making them are also provided.

These and other features of the invention will be further described and exemplified in the drawings and detailed description below.

BRIEF DESCRIPTION OF THE DRAWINGS

FIGS. 1A-E illustrate various views of a protected anode architecture in accordance with one embodiment of the present invention.

FIGS. 15A-C depict an embodiment of a metal/seawater cell battery with a protected anode architecture in accordance with the present invention.

FIGS. 17A-B illustrates the shape and configuration of a multi-layer laminate compliant seal structure of Example 3 in accordance with the present invention.

DETAILED DESCRIPTION OF SPECIFIC EMBODIMENTS

Figure 1A:
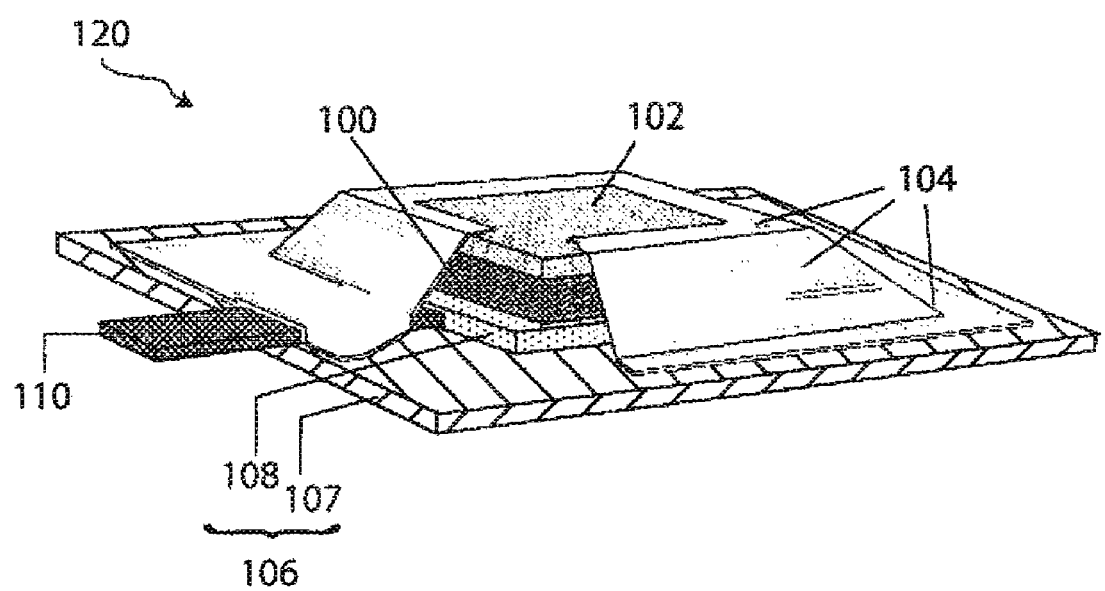

In the following description, the invention is presented in terms of certain specific compositions, configurations, and processes to help explain how it may be practiced. The invention is not limited to these specific embodiments. For example, for clarity of presentation, the invention is described herein primarily with reference to Li-based anodes. However, it should be understood that suitable anodes may be composed of other active metals, alloys and intercalating anodes as described herein, and the protective films or reagents described as containing Li may correspondingly contain such other active metals or alloys. Examples of specific embodiments of the invention are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope and equivalents of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The protected anodes of the present invention have ionically conductive protective membrane architectures that in conjunction with compliant seal structures of the present invention and anode backplanes effectively enclose an active metal (e.g., alkali metals like Na and Li) anode inside the interior of an anode compartment. This enclosure prevents the active metal from deleterious reaction with the environment external to the anode compartment, which may include aqueous, ambient moisture, catholytes (electrolytes in contact with the cathode, and in some aspects catholyte may also comprise dissolved or suspended redox active species and redox active liquids), the general cathode environment (cathode compartment) and/or electrochemically active materials corrosive to the active metal, and it prevents loss of volatile components that may be used in the interior volume of the sealed anode.

During discharge, the active metal mass and volume of the anode decreases; typically manifested as a decrease in active metal thickness. Unless this volume decrease is compensated for in some manner, voids could be created as interfacial gaps between the active metal anode and the protective membrane architecture, leading to losses in ionic contact between the active metal and protective membrane architecture along with subsequent performance degradation. Similar voids between the active metal anode and backplane can also degrade performance where the backplane is or includes the anode current collector and electrical continuity between the two is disrupted. If such interfacial gaps and void formation in the anode compartment could be eliminated, enhanced electrochemical performance would result along with a compact cell structure.

Similarly, internal seals can adversely affect the energy density of a battery cell in that as the battery is discharged, the active metal material thickness decreases (to a limit of zero thickness at 100% discharge for an active metal foil) leaving an internal void in the battery at the same time that products formed outside the protected anode compartment, for example in the positive electrode, lead to a volume expansion. As a result, the battery design needs to include extra space to accommodate that expansion. If the void volume formed in the anode compartment during battery discharge could be used to accommodate the positive electrode expansion, a compact cell design would result, and a higher energy density as well. The use of a conventional seal precludes capture of the liberated anode volume.

The compliant seal structures of the present invention are substantially impervious to anolytes, catholytes, dissolved species in electrolytes, and moisture and compliant to changes in anode volume such that physical continuity between the anode protective architecture and backplane are maintained. The protective membrane architecture comprises a substantially impervious solid electrolyte membrane that provides active metal ion transport while effectively blocking transport of liquids and gases; in this way the active metal is protected from the deleterious effects of ingress of air or water, and prevents loss of volatile components which may be used adjacent to the active metal surface. In order to form an enclosed anode compartment that effectively encapsulates the active metal anode, the perimeter of the solid electrolyte is sealed by compliant seal structures of the instant invention which are substantially impervious to liquids and gases and in conjunction with the protective membrane architectures and anode backplanes fully enclose an anode compartment.

The protected anode architecture prevents loss of effective functional contact (providing ionic communication) of the active metal of the anode with the protective membrane architecture by virtue of the compliant nature of the compliant seal. The seal conforms to volume changes in the anode compartment during cycling as the active anode material (e.g., lithium) is exhausted on discharge or regenerated on charge, and enables the protected anode compartment to adjust to pressure and volume changes that take place both within and external to the anode compartment. The compliant seal structure also serves to minimize volume of the anode compartment and thereby minimizes the volume (and weight) and maximize the energy density of the corresponding electrochemical cell structure (e.g., battery cell).

The protected anode architectures with compliant seal structures of the instant invention have particular utility in metal air batteries such as Li/air (or Na/air) batteries. In the galvanic Li/Air cell, the negative electrode supplies a source of lithium to the reaction, physically manifested by the disappearance of the lithium metal foil, concomitant with the production of lithium hydroxide at the positive electrode. In the Li-Air cell, the product LiOH is stored in an aqueous catholyte reservoir, leading to an expansion of positive electrode volume with proceeding cell discharge. As the discharge progresses, the presence of the compliant seal structure allows the expansion of the positive electrode volume to be compensated by the decrease in volume of the negative electrode.

The protected anode architectures with compliant seal structures of the instant invention also yield significant benefit for metal/seawater batteries including Li/seawater (or Na/seawater). Such batteries have exceptionally high energy density (Wh/l) and specific energy (Wh/kg) since seawater serves as both the aqueous electrolyte and oxidant, and does not have to be carried in the battery pack. The use of flexible seals to enclose the protected anode compartment allows the hydrostatic pressure of the ocean to compress the anode compartment as discharge of the negative electrode proceeds, facilitating uniform pressure of the solid electrolyte plate against the active metal of the anode which is important to achieve full utilization of the active metal.

The present invention also encompasses arrays of protected anodes or cells. In particular, the compliant seal structures of the instant invention allow for flexible anode arrays with varying degrees of joint flexibility, and both rigid and flexible arrays having a wide variety of geometric configurations, including the ability to be assembled onto and/or conform to various structural shapes and forms. A number of configurations for the protective membrane architecture and their associated electrochemical structures are enabled by the anode arrays of the present invention including tubular arrays of cells, arrays conformed to the surface of regular or irregularly shaped bodies and spiral-type configurations. While the present invention enables protected anode arrays that are rigid, flexibility may add ruggedness especially in the case of large area protective membrane architectures where significant benefits in terms of handling during manufacture and implementation may be gained.

The ionically conductive protective membrane architectures described in commonly-owned co-pending published US applications US 2004/0197641 and US 2005/0175894, in combination with the compliant seal structures of the present invention, isolate the active metal anode from its surrounding environment, such that the active metal anode and the components in the interior of the anode compartment are not in contact with ambient moisture or battery cell components such as aprotic or aqueous catholytes. This is in contrast to conventional active metal batteries, such as lithium metal batteries where the lithium metal foil, microporous separator (e.g., Celgard) and positive electrode are all in intimate contact with the organic aprotic solvent in the liquid electrolyte. The compliant seal structures of the present invention provide a substantially impervious, chemically resistant barrier that encloses the entirety of the protected anode compartment and also provide a mechanical framework to maintain a gap free interface and a compact structure that minimizes wasted volume and weight and maximizes energy density and specific energy.

Protected Anode Architecture

The protected anode architectures of the present invention comprise an active metal anode, an ionically conductive protective membrane architecture, an anode backplane, and a compliant seal structure, that when joined together effectively form an hermetic anode compartment that encloses the active metal anode. The protected anode architecture provides active metal ion transport into and out of the anode compartment via the protective membrane architecture and can be configured to provide an electronic current transport into and out of the anode compartment via an electronically conductive backplane or other terminal contact. The anode compartment of the present invention is substantially impervious to anolytes, catholytes, dissolved species in electrolytes, and moisture; and by virtue of its compliant seal structure is compliant to changes in anode volume such that physical continuity (e.g., ionic, electronic and mechanical continuity) between the anode, protective architecture and backplane are maintained.

In the context of the present invention, physical continuity corresponds to at least one of ionic continuity, mechanical force continuity and electronic continuity. For the anode of the present invention to be in physical continuity with another component, such as the anode backplane or the protective membrane architecture, it is meant that the anode is at least in one of ionic continuity, mechanical force continuity and/or electronic continuity with the other component.

By ionic continuity, it is meant that under an associated electric field and/or concentration gradient active metal ions are transportable between the anode and the protective membrane architecture.

By electronic continuity it is meant that under an associated electric field electrons are transportable between the anode and the anode backplane in the instance whereby the anode backplane provides current collection for the anode.

By mechanical force continuity it is meant that mechanical force applied onto or by the anode backplane and/or protective membrane architecture are transmittable to the anode; and mechanical force applied onto or by the anode are transmittable to the anode backplane and/or protective membrane architecture.

In all instances of the invention, the protective membrane architecture is in ionic transport continuity with anode. It may also be in mechanical force continuity with the anode.

In the instances whereby the anode backplane is an insulator, the anode backplane is in mechanical force continuity with the anode.

In the instances whereby the anode backplane comprises an electronic conductor that provides current collection for the anode, the anode backplane is in electronic continuity with the anode. In this instance, the anode backplane may also be in mechanical continuity with the anode.

In the instances whereby the anode backplane is a protective membrane architecture, the anode backplane is in ionic continuity with the anode. It may also be in mechanical force continuity with the anode.

The greater the extent and uniformity of the physical continuity, the better will be the performance of the protected anode architecture. Loss of physical continuity means that the physical continuity has degraded to such an extent that the protected anode architecture of the present invention is no longer functional as an anode.

Basic components of the protected anode architecture include:

i) an active metal anode having a first and second surface;

ii) an ionically conductive protective membrane architecture that is substantially impervious and encapsulates the first surface of the active metal anode while providing active metal ion transport;

iii) an anode backplane that is substantially impervious and encapsulates the second surface of the active metal anode; and iv) a compliant seal structure, that is substantially impervious and joins, by a seal, the protective membrane architecture to the anode backplane while allowing the anode compartment to alter its volume (essentially by changes in thickness) during charge and discharge.

In order to extract electrical current from the anode, an electronically conductive member in electronic continuity with the active metal anode and extending outside the anode compartment is also required. This can be provided by an anode backplane that is electronically conductive or has an electronically conductive component in contact with the anode active material, or by a separate electronically conductive terminal connector in contact with the anode active material.

The protected anode architecture of the present invention is described below in more detail and this is followed by further detailed descriptions of specific embodiments including those of protected anodes, arrays of protected anodes and electrochemical cells such as those using aqueous electrolytes or other electrolytes that would otherwise adversely react with the active metal material of the anode if not for the hermetic enclosure provided by the anode compartment.

A representative protected anode architecture in accordance with the present invention is described with reference to FIGS. 1A-E. It should be understood that the architecture depicted in FIGS. 1A-E is only one embodiment of the invention, and many variations are possible, as described further below.

Referring to FIG. 1A there is illustrated a perspective view, with a cut-away to reveal the various layers, of a stand alone single sided, protected anode architecture 120 comprising an active metal anode 100, a protective membrane architecture 102, an anode backplane 106, and a compliant seal structure 104. When joined and sealed, the protective membrane architecture 102, anode backplane 106, and compliant seal structure 104 effectively form a hermetic anode compartment that encloses the active metal anode 100. An optional separate current collector 108 disposed between the anode 100 and the backplane 106 and an electronically conductive terminal 110 connected with the current collector 108 extends outside the anode compartment through a portal formed at a juncture between the anode backplane 106 and the compliant seal structure 104. In this embodiment, the anode backplane more broadly includes backplane support component 107, which may be, for example, a battery cell packing/container material, and the current collector 108 and electronically conductive terminal 110. In other embodiments, components 108 and 110 may be a single piece of material (e.g., a copper sheet). Also, support component 107 may be absent where the backplane is a substantially impervious anode current collector; and in this instance component 110 may also be unnecessary.

The protected anode architecture is hermetic in the sense that the anode compartment is substantially impervious, as defined above, to its external environment, and internal volatile components are prevented from escaping to the external environment. By substantially impervious it is meant that the material provides a sufficient barrier to constituents of the external environment, such as moisture, aqueous and non-aqueous catholytes, constituents from the cathode environment (cathode compartment) including redox active species and solvents and other active metal corrosive battery component materials that would be damaging to the active metal anode material, to prevent any such damage that would degrade electrode performance from occurring. Thus, it should be non-swellable and free of pores, defects, and any pathways allowing moisture, electrolyte, catholyte etc. to penetrate through it. It also provides a substantially impervious barrier to components, including volatile anolyte solvents, inside the anode compartment from escaping, to prevent any such damage that would degrade electrode performance from occurring. The protected anode architecture also provides active metal ion transport into and out of the anode compartment via the protective membrane architecture and for passage of electronic current to and from the active metal anode to the exterior of the anode compartment by means of an current collector/electronically conductive terminal that may be or be incorporated in the anode backplane.

Referring to FIG. 1B, a cross-sectional view of the protected anode architecture of FIG. 1A is shown in the charged state. The active metal anode 100 has a first and second surface. The first surface is adjacent to the ionically conductive protective membrane architecture 102 and the second surface is adjacent to the anode backplane 106. An optional current collector 108 is bonded to the active metal anode. A substantially impervious compliant seal structure 104 provides the surrounding enclosure for the active metal anode 100 and is joined, by a seal, to the protective membrane architecture 104 and the anode backplane 106, which serve to encapsulate the first and second surface of the active metal anode 100, respectively. The electronically conductive terminal 110 is in direct contact with the current collector 108; accordingly, it is also in electronic continuity with the active metal anode 100. The electronically conductive terminal 110 extends outside the anode compartment through a portal formed at a juncture between the anode backplane and the compliant seal structure.

FIG. 1C depicts a cross-sectional view of the protected anode architecture of FIG. 1B in a discharged state, which helps to illustrate a substantial benefit of the compliant seal structure. As it is discharged, the anode 100 loses mass and volume. The protected anode architecture 120 is able to accommodate the loss of anode volume with the compliant seal structure 104 flexing as the gap between the protective membrane architecture 102 and the anode backplane 106 narrows. In this way, the anode compartment remains sealed and the anode remains in ionic and electronic communication with the protective membrane and current collector 108 of the backplane 106, respectively.

Figure 1D:
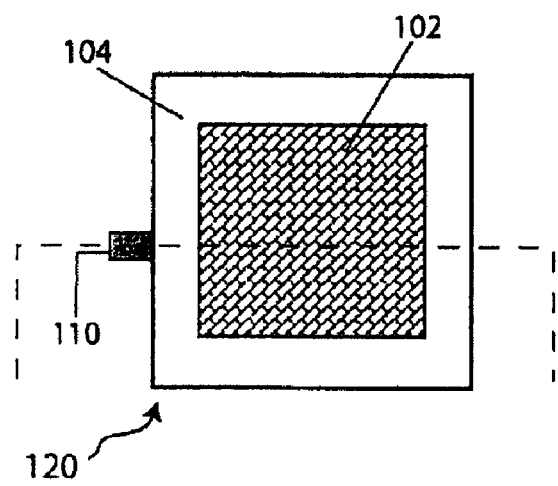
Figure 1E:
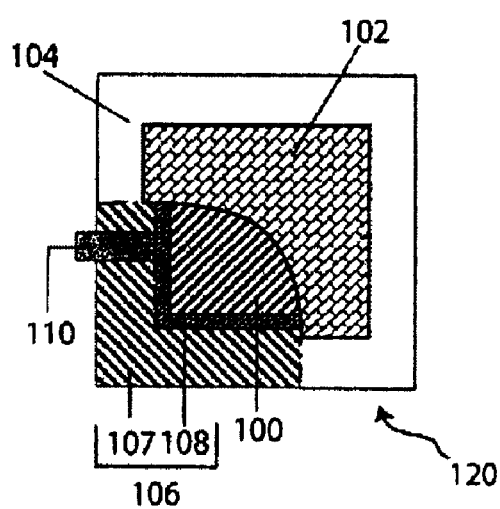

FIGS. 1D and 1E show top plan views of the protected anode architecture of FIGS. 1A-C, with FIG. 1E showing a cut-away to reveal the various layers below the top surface.

Features of the protective anode architecture will now be described in more detail:

(i) Active Metal Anode

The active metal anode 100 comprises at least one of an active metal material layer, active metal alloy layer, active metal ion layer and active metal intercalating layer.

Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In, Sb. Preferred alloys include lithium aluminum alloys, lithium silicon alloys, lithium tin alloys, lithium silver alloys, and sodium lead alloys (e.g., $Na_4Pb$). Preferred active metal electrodes are composed of the alkali metals lithium (Li) or sodium (Na). Li is particularly preferred.

Moreover, in a discharged state, the active metal material layer may be an active metal alloying metal such as aluminum, silicon or tin, or an active metal intercalating material such as carbon or others well known in the art. The use of active metal intercalating layers that reversibly intercalate and de-intercalate active metal ions such as Li ions and Na ions provide beneficial characteristics. First of all, it allows the achievement of prolonged cycle life of the battery without the risk of formation of active metal dendrites. Preferred active metal intercalating layers have a potential near that (e.g., within about 1 volt) of their corresponding active metal (e.g., Li, Na). A preferred active metal intercalating layer is carbon, well known to those of skill in the art of Li-ion batteries.

Electrochemical cell structures, such as secondary batteries, that incorporate a carbon anode greatly benefit from the protected anode architectures of the present invention in that the anode is completely de-coupled from the cathode environment. Accordingly, both anolyte (electrolyte in contact with the anode) and catholyte (electrolyte in contact with the cathode) are optimized independently.

As illustrated in FIGS. 1A-E, the active metal anode layer 100 has two major surfaces. A first surface that is encapsulated by the protective membrane architecture 102 and a second surface opposing that of the first and which is encapsulated by the anode backplane 106. In its various embodiments the active metal anode layer generally encompasses those instances wherein the thickness of the anode layer is greater or less than the length of a line that bisects the face formed by either its first or second surfaces. For instance, if the first anode surface forms a circular or square face, the length of the bisector is its diameter or side length, respectively.

In certain preferred embodiments, the anode layer is in the form of an active metal layer or active metal alloy layer such as a lithium foil, disc, sheet, cylinder, block or plate, or more generally a body of lithium having two opposing ends and a lateral surface. The surfaces of the two ends are generally referred to herein as the first and second surface of the anode layer, respectively. Preferably, the first and second surfaces of the anode are not only opposing, they are preferably aligned and parallel with each other. For instance, in various embodiments the anode body is in the form of a block or cylinder of lithium. A particularly preferred anode is a lithium or sodium metal layer in the form of a right cylinder (e.g., a rod of lithium) or a rectangular prism (e.g., a slab of lithium with, for example, square shaped opposing ends)

Regardless of the geometry of the anode, when configured in a protected anode architecture, the first surface is encapsulated by a protective membrane architecture and the second opposing surface is encapsulated by the anode backplane. With regard to the height/thickness of the active metal anode, it is measured as the shortest distance between the first and second surface.

As noted above, in a preferred embodiment, the active metal material is lithium or sodium metal, in particular Li. The active metal material layer is at least 10 microns thick, and may be up to 1 cm or more thick. Some preferred thickness ranges are preferably between 10 and 50 microns, 50 and 100 microns, 0.1 and 1 mm, 1 mm and 10 mm, 10 mm and 100 mm, and 100 mm and 500 mm thick.

(ii) Protective Membrane Architecture

The protective membrane architecture 102 on the first surface of the active metal anode 100 selectively transports the active metal ions into and out of the anode compartment while providing an impervious barrier to the environment external to the anode compartment. It also provides a barrier to components inside the anode compartment from escaping. Protective membrane architectures suitable for use in the present invention are described in applicants' co-pending published US applications US 2004/0197641 and US 2005/0175894 and their corresponding International Patent Applications WO 2005/038953 and WO 2005/083829, respectively, incorporated by reference herein.

Figure 2A:
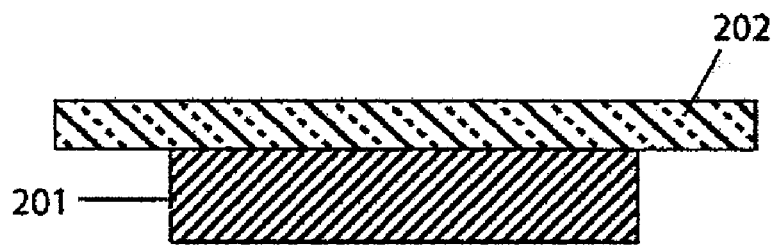
FIGS. 2A-D illustrate various alternative configurations of a protective membrane architecture in accordance with the present invention.

FIGS. 2A-D illustrate representative protective membrane architectures from these disclosures suitable for use in the present invention:

Referring to FIG. 2A, the protective membrane architecture can be a monolithic solid electrolyte 202 that provides ionic transport and is chemically stable to both the active metal anode 201 and the external environment. Examples of such materials are Na-β" alumina, $LiHfPO_4$ and NASICON, Nasiglass, $Li_5La_3Ta_2O_{12}$ and $Li_5La_3Nb_2O_{12}$. $Na_5MSi_4O_{12}$ (M: rare earth such as Nd, Dy, Gd,)

More commonly, the ion membrane architecture is a composite composed of at least two components of different materials having different chemical compatibility requirements, one chemically compatible with the anode environment in the interior of the anode compartment, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 2B:
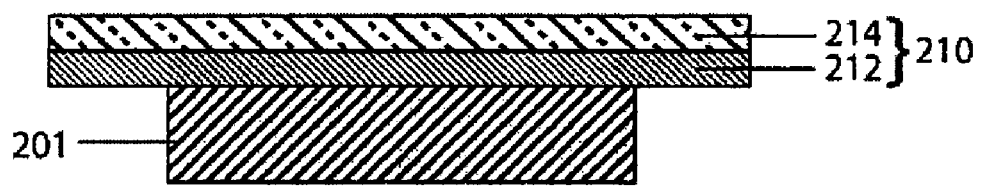
Figure 2C:
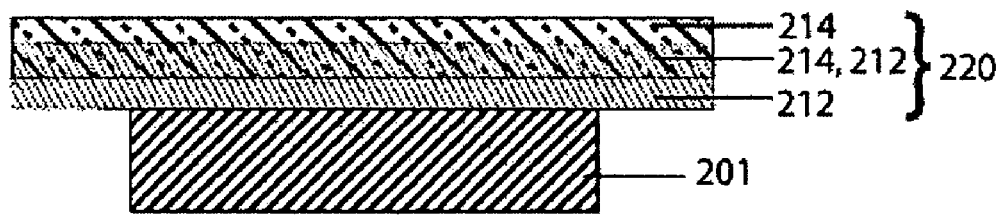

Referring to FIG. 2B, the protective membrane architecture can be a composite solid electrolyte 210 composed of discrete layers, whereby the first material layer 212 is stable to the active metal anode 201 and the second material layer 214 is stable to the external environment. Alternatively, referring to FIG. 2C, the protective membrane architecture can be a composite solid electrolyte 220 composed of the same materials, but with a graded transition between the materials rather than discrete layers.

The low equivalent weight of alkali metals, such as lithium, render them particularly attractive as a battery electrode component. However, metals such as lithium or sodium or compounds incorporating lithium with a potential near that (e.g., within about a volt) of lithium metal, such as lithium alloy and lithium-ion (lithium intercalation) anode materials, are highly reactive to many potentially attractive electrolytes and cathode materials. The protective membrane architectures provide a barrier to isolate an active metal, active metal alloy or active metal ion anode in the anode compartment from ambient and/or the cathode side of the cell while allowing for efficient ion active metal ion transport into and out of the anode compartment. The architecture may take on several forms. Generally it comprises a solid electrolyte layer that is substantially impervious, ionically conductive and chemically compatible with the external ambient (e.g., air or water) or the cathode environment. By chemically compatible it is meant that the reference material does not react to form a product that is deleterious to battery cell operation when contacted with one or more other referenced battery cell components or manufacturing, handling, storage or external environmental conditions.

Generally, the solid state composite protective membrane architectures (described with reference to FIGS. 2B and C) have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^5$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 2D:

A fourth suitable protective membrane architecture is illustrated in FIG. 2D. This architecture is a composite 230 composed of an interlayer 232 between the solid electrolyte 234 and the active metal anode 201 whereby the interlayer is impregnated with anolyte. Thus, the architecture includes an active metal ion conducting separator layer with a non-aqueous anolyte (i.e., electrolyte about the anode), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 2D) generally shares the properties of the second material layer for the composite solid state architectures (FIGS. 2B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of FIGS. B and C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed in situ by contacting precursors such as metal nitrides, metal phosphides, metal halides, red phosphorus, iodine, nitrogen or phosphorus containing organics and polymers, and the like with lithium. A particularly suitable precursor material is $Cu_3N$. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention.

For the anolyte interlayer composite protective architecture embodiment (FIG. 2D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode compartment. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc., and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdF-HFP), polyacrylonitrile compounds, cross-linked polyether compounds, polyalkylene oxide compounds, polyethylene oxide compounds, and combinations and the like may be added to gel the solvents. Suitable anolytes will also, of course, also include active metal salts, such as, in the case of lithium, for example, $LiPF_6$, $LiBF_4$, $LiAsF_6$, $LiSO_3CF_3$ or LiN $(SO_2C_2F_5)_2$. In the case of sodium suitable anolytes will include active metal salts such as $NaClO_4$, $NaPF_c$, $NaAsF_6$ $NaBF_4$, $NaSO_3CF_3$, $NaN(CF_3SO_2)_2$ or $NaN(SO_2C_2F_5)_2$, One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasiglass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ $(0.1 \leq x \leq 0.9)$ and crystallographically related structures, $Li_{1+x}Hf_{2-x}Al_x(PO_4)_3$ $(0.1 \leq x \leq 0.9)$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0 < 10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or and $Li_{1+x+y}Q_xTi_{2-x}Si_yP_{3-y}O_{12}$ where $0 < X \leq 0.4$ and $0 < Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

(iii) Anode Backplane

The anode backplane 106 in physical continuity with the second surface of the active metal anode 100 is substantially impervious and provides structural support for the active metal anode 100 and serves as part of the hermetic enclosure. The anode backplane encapsulates the second surface of the anode and in various embodiments the backplane is in mechanical force continuity with the anode's second surface. In certain embodiments the anode backplane may be in direct physical contact with the active metal anode. Depending on its configuration, the anode backplane may have one or more components and provide additional functions as well. For example, and as described further below, the anode backplane may be or include a current collector and/or electrical terminal connector, or another protective anode architecture resulting in a double-sided protected anode architecture. The anode backplane can also serve as either the bottom base or top cover of a battery cell container. The anode backplane may also include a compressible material to moderate anode thickness variations that may arise during discharge and charge.

Generally, the anode backplane comprises a suitable material or combination of materials that result in an anode backplane that is substantially impervious to the external environment surrounding the anode compartment and chemically compatible with internal components. The choice of anode backplane is not limited to a class of materials, in the sense that the anode backplane may comprise metals, polymers, ceramics and glasses. The anode backplane may be flexible or rigid. The backplane must comprise materials with barrier properties and be thick enough to be substantially impervious to its surrounding environment, yet not so thick that it causes undue burden on the overall weight and volume of the protected anode.

In one aspect of the present invention, the anode backplane 106 includes a laminar composite material comprising multiple layers that provide specific functionality in terms of chemical resistance and barrier properties against the ingression of ambient moisture and electrolyte solvents including aqueous electrolytes. In one aspect of the present invention this anode backplane support component (e.g., 107 of FIG. 1B) is a multi-layer laminate composite comprising a plurality of layers; for example, a laminar composite comprising two or more layers.

A particularly suitable anode backplane support component 107 of the present invention comprises a multi-layer laminate composite having three or more adjacently stacked layers: a top and a bottom layer and at least one middle layer. In one aspect of the invention, the bottom layer is adjacent to the second surface of the active metal anode 100; in this aspect the bottom layer must be chemically compatible with the second surface of the active metal anode. In the case of a protected anode comprising an protective membrane architecture with a liquid anolyte interlayer, the bottom layer must also be compatible with the anolyte. By compatible with the anolyte, it is meant that the bottom layer does not dissolve or swell with the anolyte to the extent that it hinders the intended service life of the protected anode architecture. In a preferred embodiment the bottom layer comprises a low melting temperature thermoplastic that is heat-sealable. A particularly suitable bottom layer is low density polyethylene (LDPE). By contrast, the top layer of this anode backplane component comprising a multi-layer laminate is chemically resistant to the external environment. The top layer is also preferably an electronic insulator. A particularly suitable top layer is polyethylene terephthalate (PET). While all layers of a multi-layer laminate may provide some barrier functionality, at least one of the middle layers is a barrier layer. A particularly suitable middle barrier layer is a metal foil with appropriate thickness to block out ambient moisture and other deleterious penetrants external to the anode compartment, and also prevents components inside the anode compartment from escaping. A particularly suitable inner layer is aluminum foil, for example about 30 microns thick. The multi-layer laminate may include additional middle layers such as metals, polymers, glasses and ceramics. Moreover, the layers may comprise adhesives for bonding the layers together and wetting layers to improve bonding.

The anode backplane component 107 may be molded or embossed to a preformed shape having any number of possible configurations. For example it may be molded to include steps that provide a platforms to set bonds for the joining of the anode backplane to the compliant seal structure 104. Other preformed shapes may also be appropriate for ease of manufacture, and to facilitate configuration of anode arrays having various configurations such as cylindrical shapes and spiral wounds.

A particularly suitable anode backplane component 107 comprises a flexible multi-layer laminate manufactured by Lawson Mardon Flexible, Inc. in Shelbyville, Ky., with the product specification Laminate 95014. This laminate is about 120 microns thick, comprising a top layer of polyethylene terephthalate (about 12 micron thick); a middle layer of aluminum foil (about 32 micron thick); a middle layer of polyethylene terephthalate (about 12 micron thick), and a bottom layer of low density polyethylene.

The anode backplane 106 can also be configured to provide current collection and a terminal connection. To serve as a current collector, the anode backplane 106 should comprise a suitably conductive and chemically stable material such as a metal (e.g., copper, stainless steel, and nickel) that does not alloy with or intercalate the active metal of the anode. In this embodiment of the invention the anode backplane serves as current collector and terminal connector. When the active metal anode 100 is lithium, a particularly suitable, current collecting, anode backplane 106 is copper, nickel or stainless steel. Accordingly, the anode backplane may be a suitably thick copper, nickel or stainless steel foil or plate or an expandable copper metal mesh such as Exmet. As understood by those of skill in the art, it is desired that the thickness and weight of the current collector be minimized in balance and consideration with the need to provide adequate electronic conductance. In one embodiment, the anode backplane comprises a backplane support component 107 and a current collector 108 placed between the second surface of the active metal anode 100 and the backplane support component 107. In this embodiment a particularly suitable backplane support material is a multi-layer laminate as described above, for example the laminate manufactured by Lawson Mardon Flexible; and a suitable current collector is copper foil in the range of 8 to 25 microns, e.g., 25 microns, or nickel foil, about 50 microns thick. In other embodiments, the thickness of the copper or nickel current collector is minimized to be in the range of 5 microns to 15 microns.

If the anode backplane is a metal, it may be a suitably thick metal foil or plate that is chosen for its stability against reaction with the external environment and coated on the side adjacent to the anode with a different metal or conductive material such as copper or a carbon ink that is particularly stable to the active metal anode. By suitably thick, the anode backplane must provide sufficient structural support for the protected anode based on its intended use and be substantially impervious. However, it should not be so thick as to place an undue weight burden on the protected anode. A suitable current collector backplane is stainless steel foil in the range of about 25 to about 250 microns, e.g., 100 microns.

In another embodiment of the invention, an electronically conductive material is coated onto the surface of an non-conductive anode backplane component (such as component 107, described above) to provide current collection and/or a terminal connection. In this aspect, the anode backplane may be any material; preferably, the surface that is exposed to the external environment, outside the anode compartment, is insulating. The insulator may be any suitable material such as a glass, ceramic or a polymer. Polymers are particularly useful as they are both lightweight and can have excellent chemical resistance properties. The electronically conducting film may be any suitable metal film so long as the surface in contact with the second surface of the active metal anode is chemically stable or forms a chemically stable interface. In one embodiment the electronically conducting film comprises at least one metal, such as copper (or molybdenum or tantalum), deposited by physical vapor deposition onto a polymeric substrate, such as PET, to a thickness of about 2 to 5 microns. In one embodiment, the anode backplane along with its electronically conducting surface film extends beyond the anode compartment such that the electronically conducting film provides a terminal connection from the active metal anode to outside of the anode compartment. Similarly, the substrate for the current collector/terminal connection film may be the backplane support component such as a multi-layer polymer/metal laminate composite such as described above.

Moreover, in some instances, the anode backplane, or a component thereof, may be a single contiguous piece of material forming both the backplane/component and the compliant seal structure of the protective anode architecture. This embodiment of the invention is described in more detail with reference to FIGS. 3G and 3H, below.

While incorporation of a current collector in the anode backplane 106 is often preferred, there are instances whereby current collection/terminal connection are provided otherwise. For example, in certain designs, a terminal connector separate from the anode backplane directly contacts the active metal anode material. One instance of this is in double-sided protected anode architectures in accordance with the present invention, such as described with reference to FIG. 4A, below, wherein the anode backplane is a second ionically conductive protective membrane and current collection and terminal connection are provided by a separate structure(s) in electrical contact with the anode. Such an arrangement is also possible in single-sided embodiments such as depicted in FIGS. 1A-E.

In order to supply power to an external device, the active metal anode must be in electronic continuity with at least one electronically conductive terminal that extends outside the anode compartment. In certain embodiments of the invention the electronically conductive terminal is in direct physical contact with the active metal anode. In other embodiments, particularly in embodiments that comprise an array of protected anodes, an active metal anode may not be in direct physical contact with a terminal connector; however, every active metal anode is in electronic continuity with at least one terminal connector.

In the embodiment depicted in FIG. 1B, the anode backplane 106 comprises a substrate component 107, such as a polymer (e.g., PET) or a multi-layer polymer/metal laminate such as described herein and a terminal connector 110 in electronic continuity with the current collector 108. In the illustrated embodiment, a particularly suitable terminal connector 110 is a metal tab. Suitable metal tabs are nickel, aluminum, aluminum alloys, and stainless steel alloys. While the tab may have any appropriate geometric form, it must have a low enough resistance such that it is able to pass the electronic current drawn from the anode without excessive heating and or causing significant voltage drop to the associated battery cell. The tab may be of any length provided that it is able to extend outside the anode compartment. Nickel is a particularly suitable current collector and a particularly suitable terminal connector. The current collector and terminal collector may be resistance welded to each other. In an alternative embodiment, the current collector and terminal are a single piece of nickel.

Alternatively, the terminal connector is in contact with the active metal material of the anode, or simultaneously in contact with both the active metal material and the current collector. If the terminal 110 is attached to or contacts the active metal material, the terminal 110 must not adversely react with the active metal material.

The terminal may be attached to the current collector or the active metal material of the anode by any of a number of well-known methods such as but not limited to soldering, physical pressure, ultrasonic welding, and resistance welding.

The terminal connector 110 may exit the anode compartment through any of a number of possible portals such as through the compliant seal structure 104, or through the anode backplane 106, or preferably as illustrated in FIG. 1B a portal is formed at the junction between the compliant seal structure 104 and the anode backplane 106.

(iv) Compliant Seal Structure

Referring again to FIG. 1B, the compliant seal structure 104 provides the surrounding enclosure for the active metal anode 100 and is joined by sealing to the protective membrane architecture 102 and the anode backplane 106, which serve to encapsulate the first and second surface of the active metal anode, respectively. The compliant seal structure is chemically resistant, substantially impervious and flexible. In various embodiments, the compliant seal structure is interfaced with the protective membrane structure and anode backplane to form the anode compartment; this encompasses instances where the compliant seal structure is bonded or joined to one or more of the other elements or is otherwise contiguous or made contiguous with one or more of the other elements, such as when the compliant seal structure and the anode backplane, or component thereof, are formed from a single piece of material. For illustration purposes, several embodiments of compliant seal structures showing how they are interfaced with the protective membrane architectures and anode backplanes in accordance with the present invention are illustrated below in FIGS. 3A-H.

It is a feature of the present invention that as the active metal anode 100 volume shrinks or expands, manifested by changes in the active metal thickness, the compliant seal structure 104 deforms in such a manner as to alter the thickness of the anode compartment 130. The deformation is enabled by the compliant seal structure's ability to bend, stretch, compress or generally adapt its shape under an applied load, such as a net force applied against the protective membrane architecture 102 and/or the anode backplane 106. Accordingly, if there is a normal component to the net force, or the net force is in the normal direction, the flexibility of the compliant seal structure allows the protective membrane architecture to follow the first surface of the active metal anode and/or the anode backplane to follow the second surface of the active metal anode, in response to mass transfer (leading to anode thickness changes) during charge and discharge.

The extent of the range of motion depends, in part, on the flexural characteristics of the compliant seal structure and the magnitude of the net force applied to the protected anode architecture. The net force on the anode compartment is the sum of the external forces applied from outside the anode compartment and the internal forces applied by the components of the anode compartment, which includes the active metal anode, the anode backplane, the protective membrane architecture and the compliant seal structure.

External forces are those that derive from components or environments that are outside and not part of the anode compartment For example, external forces may be generated by battery components such as springs; come about as a result of the environment that surrounds the protected anode, such as hydrostatic pressure in the case of a metal/seawater battery; be induced by electrochemical reactions that drive the cathode to expand against the protective membrane architecture, such as the formation of discharge products in the case of a metal/air battery The external forces may derive from other phenomena and combinations thereof.

During discharge, the internal forces (within the anode compartment) are generally, but not always, reciprocal forces or reactive forces in that they respond to the application of an external force. The internal forces are applied by the components of the anode compartment: active metal anode, anode backplane, protective membrane architecture and the compliant seal structure. For example, at rest the net force on the anode compartment 130 is zero, as the external forces applied onto the protective membrane architecture 102 and anode backplane 106 are absorbed, in part, by the active metal anode 100. During operation (charge or discharge), as mass is moved into and out of the anode compartment 130 the thickness of the active metal anode changes, the forces become unbalanced and the protective membrane architecture 102 and/or the anode backplane 106 responds by moving with the first and second surface of the active metal anode 100, respectively. A compliant seal structure 104 in accordance with the present invention provides enough flexibility and ease of flexure so that a protective membrane architecture under the influence of the external forces is able to translate across its entire range of motion while retaining substantial imperviousness. The compliant seal structure 104 may also be under tension, so that it provides a tensile stress rather than a responsive force on the ion membrane architecture and anode backplane, tending to pull the two in the direction of the active metal anode (e.g., with an extended elastomer relaxing to its non-stretched state).

In various embodiments, in accordance with the protected anode architectures of the instant invention, the protective membrane architecture and/or the anode backplane is provided a significant range of motion to move/translate with the first and second surface of the anode, as the active metal anode thickness changes as a result of electrochemical oxidation or reduction. In various embodiments, the protective membrane architecture and/or the anode backplane is able to follow the first and second surface of the anode, respectively, until the anode is fully exhausted. In various embodiments, the protective membrane architecture is able to move along with the first surface of the anode, and the anode backplane is able to move along with the second surface of the anode over distances that generally correspond to the thickness of the anode. In various embodiments, one or both of the anode backplane and protective membrane are able translate along with their respective anode surfaces over distances that are typically greater than 10 microns, more preferably greater than 50 microns, even more preferred greater than 100 microns. In certain embodiments, when the protected anode architecture is electrochemically oxidized (e.g., during discharge of a battery) the translation distance afforded one or both the anode backplane or protective membrane architecture is typically greater than 250 microns, preferably greater than 500 microns, and more preferably greater than 1 centimeter.

The degree to which the anode compartment thickness will shrink or expand depends on the change in active metal thickness during charge and discharge and the flexural characteristics of the compliant seal structure in response to the magnitude and direction of the externally applied forces. In an embodiment where the protected anode architecture is used in a primary battery cell, the compliant seal structure should allow the thickness of the anode compartment, as measured from the anode backplane to the ion membrane architecture, to shrink, by as much as the thickness of the anode employed. Similarly, for a secondary battery cell, the thickness of the anode compartment should reversibly shrink and expand by at least the thickness change that the anode undergoes per cycle. In one aspect of the invention, the protected anode structures of the present invention may provide a significant range of motion for the thickness of the anode compartment to shrink and expand during discharge and charge. By a significant range of motion it is meant that the compliant seal structure provides a range of motion for the thickness of the anode compartment (as illustrated in FIGS. 1B and C) to change by at least 10 microns, more preferably at least 50 microns, even more preferred is greater than 100 microns. In some aspects of the present invention, the range of motion is greater than 250 microns, greater than 500 microns, and greater than 1 centimeter.

In various embodiments, both the protective membrane architecture and anode backplane are afforded a significant range of motion so that both are able to translate as a result of anode thickness changes caused by discharge or charge. In certain embodiments, only one of the anode backplane and protective membrane architecture is provided a range of motion to translate along with the anode surface that it encapsulates. For instance, in certain embodiments, one or the other of the anode backplane or protective membrane is joined to a positionally fixed rigid member, such as a battery container, or casing, or the like, and is therefore precluded from translating as the anode thickness changes.

In one embodiment of the present invention, the compliant seal structure is compliant such that it easily deforms and folds onto itself yet provides suitable barrier properties. More generally, however, in the design of the compliant seal structure there is a compromise between the ease of flexure, ruggedness, barrier properties, and ability to withstand continued flex cycles without failure; along with a consideration of the externally applied forces (magnitude and direction).

The compliant seal structures of the present invention enable both primary and secondary battery cells.

The compliant seal structure may derive its flexibility, barrier properties and chemical resistance from a combination of intrinsic material properties (e.g., elastic modulus, hardness, ductility, solubility and reactivity); geometric form (e.g., aspect ratio and thickness); and configuration (e.g., folds, crinkles, etc). Within the spirit of the invention the seal structure can derive its properties by any combination of the proper choice of materials (such as polymers, metals, ceramics and glass), geometries (such as films and foils with varying aspect ratios) and configurations (such as crinkles and accordion type folds).

In one embodiment of the invention the compliant seal structure comprises a single material composition having all the required characteristics of chemical resistance, flexibility, and substantial imperviousness.

Polymers exhibit a wide range of properties. Some polymers, such as elastomers, are springy, having low elastic moduli typically in the range of 0.01 to 0.1 GPa; and can be reversibly stretched to very large strain. Most polymers have a slightly higher elastic modulus between 0.1 and 5 GPa, so their elasticity varies according to composition and structure. Even those with relatively high elastic moduli can have a large plastic deformation range that imparts flexibility. A number of polymers, in addition to being flexible, exhibit excellent chemical resistance and very good barrier properties. Polymers with very good barrier properties to moisture include ethylene-vinyl alcohol (EVOH), Polyvinylidene chloride), (PVDC), high density polyethylene (HDPE), polypropylene (PP), polyvinyl chloride) (PVC), polytetrafluoroethylene (PTFE), PVdF and Parlyene C. Others include Butyls, halogenated isobutylene, co-polymers of isobutylene and paramethylstyrene and their halogenated versions.

Unfortunately, no polymers are completely impermeable. The ability of a given polymer or combination of polymers to provide adequate barrier protection to make the compliant seal structure substantially impervious depends on the intended lifetime of the device, the rate of permeation through the barrier, the composition of the permeant, and the wall thickness of the barrier. There is a tradeoff between wall thickness (for improved barrier properties) and flexibility. Polymers are a class of material that, because of their ability to undergo large deformation strain without breaking, enable relatively thick walled compliant seal structures having improved ruggedness and adequate barrier properties. Accordingly, in some embodiments of the invention the compliant seal structure comprises a polymer or combination of polymers having all the required characteristics of chemical compatibility, flexibility, and substantial imperviousness.

The proper balance between flexural characteristics, barrier properties and chemical resistance may be achieved by combining more than one polymer material. For example, a laminar polymer composite, comprising a plurality of polymer layers, effectively combines the properties of each layer to provide a more optimal compliant seal structure. For example, the polymer composite may comprise a top chemically resistant layer combined with an inner moisture barrier layer and another inner gaseous barrier layer followed by a chemically resistant bottom layer and possibly another heat-sealable layer for bonding the compliant seal structure to its associated elements (e.g., anode backplane and protective membrane architecture). For example the polymer composite may comprise a PTFE outer layer, which has excellent chemical resistance properties, with an inner PVDC layer, having excellent moisture and gaseous barrier properties, another inner layer such as EVOH with excellent gaseous barrier properties, and a polyethylene (HDPE or LDPE) bottom layer with very good chemical resistance properties. Accordingly, in other embodiments of the present invention the compliant seal structure comprises a combination of polymer materials together to form a laminar polymer composite with improved characteristics and properties.

While polymers offer significant advantages in terms of chemical resistance and flexibility, metal foils have excellent barrier properties. Moreover, ductile metals such as aluminum, alloys of aluminum and stainless steels, while possessing only moderate elastic deformation range, are extremely flexible when provided in a geometric form having a high aspect ratio such as in foil format. Depending on metal foil composition, microstructure and thickness, the problem of cracks and pinholes formed during device fabrication or operation may reduce barrier properties. The ruggedness of metal foils may be enhanced by the addition of polymer buffer films or foils that add structural support and ductility. Moreover, a polymer layer on the surface of the metal foil may improve its chemical resistance, while providing electronic insulation to the compliant seal structure. This is well known to those skilled in the art of packaging material for foods, electronic components, and other products that need to be sealed against an external environment.

Accordingly, in one embodiment of the invention the compliant seal structure comprises a laminate composite comprising a first polymer layer that is electronically insulating and chemically resistive to the environment external to the anode compartment (e.g., EVOH, PVDC, PTFE, PET, Surlyn), a second polymer layer that is also electronically insulating and chemically resistive to the elements inside the anode compartment (e.g., PE, PP, PTFE, ionomer resins such as those comprising acid neutralized ethylene acid copolymers commonly referred to by the trademark name Surlyn), and a third metal foil layer (e.g., Al foil thickness range 10-150 microns) sandwiched between the first and second layers that provides an excellent barrier to the ingression of moisture and gases as well as the egress of elements from within the anode compartment. Compared to single material layers, the properties of a multi-layer laminate structure can be tailored by varying the composition and thickness of each layer. For example, polymers have excellent mechanical and chemical properties, but are not impermeable; and while metal foils are in themselves excellent barrier materials, and are flexible when thin, they can benefit from a having at least another layer to close off pinholes and insulate surfaces. Accordingly, in some preferred embodiments of this invention the compliant seal structures of the present invention are composed of a plurality of layers stacked together in a laminar format to provide a substantially impervious, chemically resistive and flexible structure; such as a multi-layer laminate.

The multi-layer laminate compliant seal structures of the present invention have at least two layers: a top layer and a bottom layer. Additional layers between the top and bottom layers may, among other things, improve barrier properties and ruggedness. The top and bottom layers are chemically resistant to the environment they contact. In one variant, the multi-layer laminate comprises three layers: i) a substantially impervious inner/middle barrier layer, ii) a chemically resistant outer-top layer, and iii) a chemically resistant outer-bottom layer. The thickness of the individual layers are determined by the tradeoff between barrier properties, flexibility (thicker films provide improved barrier properties but impaired flexibility) and weight. All three layers may have additional desirable properties that contribute to the overall ability of the laminate to provide a substantially impervious and compliant seal structure. In instances whereby the middle layer is exposed to the external or internal environment of the anode compartment, it must be chemically stable with those environments or be sealed off in some manner such as the application of a discrete sealant, for example an epoxy sealant. Discrete sealants suitable for use in accordance with the present invention are described in more detail below.

Examples of metal foils used for the middle barrier layer include but are not limited to aluminum, tin, copper, and stainless steels. From the perspective of weight and flexibility, aluminum is preferred. However, other metals may provide improved ruggedness over the course of bending and stretching such as ductile copper alloys. The thickness of the metal layer is selected by taking into account the balance between its overall weight, ease of flexure and barrier properties. The thickness of the metal barrier layer is preferably in the range of several microns to 150 microns, more preferably from about 25 um to 75 um.

While metal foils such as aluminum are generally excellent barrier layers, thin ceramic layers, thin glass layers and physical vapor deposited materials, such as metals, may all be used in combination to optimize the balance between barrier properties, flexibility and chemical resistance. When provided with a high enough aspect ratio, thin glasses and thin ceramics offer very good chemical resistance and barrier properties as well. For example thin films of $SiO_x$ can be deposited by PVD or CVD to provide a moisture and oxygen barrier, The thin layers may be fabricated by a number of techniques including sputter deposition, CVD, laser ablation, e-beam evaporation, etc. Accordingly, in embodiments of the invention, the compliant seal structure comprises an assemblage of thin layers of materials such as glasses, polymers, ceramics, metals and combinations thereof.

The materials of the laminate must be chemically resistant to the environments with which they are in direct contact. This includes the environment external to the anode and the internal environment of the anode. The external environment may include battery electrolytes comprising aqueous or non-aqueous solvents, seawater, and ambient air. The internal environment may include a variety of non-aqueous solvents used in the formulation of anolytes that stable to the active metal.

In embodiments of the invention, the compliant seal structure is a multi-layer laminate, the top layer of which contacts the environment external to the anode compartment and the bottom layer of which contacts the environment internal to the anode compartment. Materials with excellent resistance to anticipated external environments such as strong base as is encountered in Li/air batteries are polypropylene, poly isobutylene, PTFE, Other materials such as PE, PP, PTFE, poly isobutylene have exceptional resistance to organic solvents, and still others such as PE, PP, PTFE, poly isobutylene provide resistance to aqueous environments including seawater. The thickness of the top (external exposed) layer (external exposed) is a balance between ruggedness of the structure, barrier properties and flexibility. In the case of a PET top layer material, its thickness is typically between 5 and 100 microns, preferably between 10 and 50 microns. Other materials may have very different thickness requirements, such as thin glasses and ceramics that will usually be about 10 microns or less.

The bottom (internal exposed) layer material, must be chemically resistive with elements inside the anode compartment. Common elements include liquid and gel type anolytes such as those described in the discussion of anolyte interlayer protective membrane architectures (FIG. 2D). Materials that are particularly stable to common anolyte solvents and salts include PE, PP, PTFE, poly isobutylene. Again, the thickness of the bottom layer is a balance between ruggedness of the structure, its barrier properties and flexibility. In the case of a polyethylene layer, the bottom layer is between 25 and 400 microns, preferably between 50 and 200 microns. Other materials may have very different thickness requirements, such as thin glasses and ceramics that will usually be less than 10 microns.

In some embodiments of the invention, a sealant may be integrated into the structure of a multi-layer laminate compliant seal structure. For example, at least one of the top or bottom outer layers may comprise a primary sealant layer for bonding the multi-layer laminate to the protective membrane architecture and to the anode backplane. For example, such a layer may be made of ionomer, polyethylene, polypropylene or other polymers known to those skilled in the art of heat-sealable plastics used in the packaging industry. These thermoplastics soften at relatively low temperatures and may be bonded to the protective anode architecture by thermal compression. In one embodiment of the invention, the heat sealable layer is the bottom layer of a multi-layer laminate compliant seal structure in contact with the internal environment of the anode. Accordingly, the layer should be chemically resistive and heat-sealable. In order to prevent leaking of anolyte in the case of anolyte interlayer protective membrane architectures, such as described above (FIG. 2D), the inner thermoplastic layer should be one that does not swell with or dissolve into anolyte. Examples of heat sealable polymers with resistance to chemical attack by liquid and gel anolytes are polyethylene, polypropylene, polystyrene, polyphenylene oxide, acrylic acid modified polyethylene and acrylic acid modified polypropylene.

A particularly suitable compliant seal structure 104 of the present invention comprises a multi-layer laminate composite having three or more adjacently stacked layers: a top and a bottom layer and at least one middle layer. In a preferred embodiment the bottom layer comprises a low melting temperature thermoplastic that is heat-sealable. A particularly suitable bottom layer is low density polyethylene (LDPE). By contrast, the top layer of this compliant seal structure comprising a multi-layer laminate is chemically resistant to the external environment. The top layer is also preferably an electronic insulator. A particularly suitable top layer is polyethylene terephthalate (PET). While all layers of a multi-layer laminate may provide some barrier functionality, at least one of the middle layers is a barrier layer. A particularly suitable middle barrier layer is a metal foil with appropriate thickness to block out ambient moisture and other deleterious penetrants external to the anode compartment. A particularly suitable inner layer is aluminum foil, for example about 30 microns thick. The multi-layer laminate may include additional middle layers such as metals, polymers, glasses and ceramics. Moreover, the layers may comprise adhesives for bonding the layers together and wetting layers to improve bonding.

The compliant seal structure may be molded or embossed to a preformed shape having any number of possible configurations. For example it may be molded to include steps that provide platforms to set bonds. Other preformed shapes may also be appropriate for ease of manufacture, and to facilitate configuration of anode arrays having various configurations such as cylindrical shapes and spiral wounds.

A particularly suitable compliant seal structure 104 comprises a flexible multi-layer laminate manufactured by Lawson Mardon Flexible, Inc. in Shelbyville, Ky., with the product specification Laminate 95014. This laminate is about 120 microns thick, comprising a top layer of polyethylene terephthalate (about 12 micron thick); a middle layer of aluminum foil (about 32 micron thick); a middle layer of polyethylene terephthalate (about 12 micron thick), and a bottom layer of low density polyethylene.

It should be noted that while the elastic modulus is a good measure of a material's degree of reversible flex, in the context of the present invention, the flexible structure may achieve its range of motion by any mechanism including irreversible processes, such as plastic deformation. The range of plastic deformation dictates a materials plasticity or ductility. While stiffness and ductility are both intrinsic material properties that, in part, determine the degree and ease of flexure, an important criteria to be considered for choosing an appropriate compliant seal structure in the context of this invention is the capability of the compliant seal structure to provide the required range of motion to the seal over the lifetime of the protected anode. Accordingly, in embodiments of the present invention the compliant seal structure may comprise metal foils and plastic foils that are pre-stressed, both elastically and plastically, to enhance their degree and ease of flexibility.

In addition to the proper choice of material and aspect ratio, the configuration of the compliant seal structure can impart flexibility as well as enhance ruggedness to the seal structure. For example, the compliant seal structure may be molded into a preformed article prior to bonding to the protective membrane architecture and/or the anode backplane. The article may comprise a variety of configurations such as accordion folds or a series of steps having varying angles between each step. Accordion folds, such as those common for bellows, can impart pliancy due to the flex of their corrugations, and enhance ruggedness thereby improving the ability for the seal structure to withstand the stress and strain of being flexed and bent during processing and operation. Likewise, random wrinkles and crinkles (pre-wrinkling) by way of plastic deformation can impart added range and ease of motion to a material such as a metal foil, thermoplastic or combinations thereof.

As previously described, increasing its aspect ratio can augment the flexibility of the compliant seal structure. This can be done by decreasing thickness, which is a compromise with barrier properties; or by increasing the length of the structure, including providing angled configurations such as, but not limited to, S shapes, Z shapes, inverted Z shapes, C shapes and inverted W shapes. Adding flexibility to the compliant seal structure by means of its configuration widens the choice of suitable materials. Moreover, certain structural configurations have other benefits such as providing a platform for bonding the compliant seal structure to the anode backplane and protective membrane architecture. Of course there is a practical limit to improving flexural properties by geometric manipulation alone, in the sense that the length of the compliant seal structure must be balanced with an attempt to minimize the space it occupies and the area it deactivates. A particularly useful configuration for the compliant seal structures of the present invention may be described as a double step structure having an oblique, acute or right angle between steps. This shape provides added flexure and a convenient platform for bonding.

Referring again to FIG. 1B, the compliant seal structure 104 has a double-step configuration having a first step 142 and second step 144 and an oblique angle between steps. Each step provides a bonding platform, and the distance and angle between steps is a design criterion that depends, in part, on the thickness of the active metal anode and the flexural properties of the compliant seal structure. The angle is a tradeoff between minimizing wasted space and ease of flexure. The depth of each step determines the maximum width of the bonding platform. The width of the bond is an important criterion, balanced between being as wide as possible, in order to obtain a strong, hermetic bond and minimized as the area becomes electrochemically de-activated by the bond, creating both wasted volume and lost active area.

As illustrated in the embodiment of FIG. 1B, the inner surface of the first step 142 of the compliant seal structure 104 is bound to the protective membrane architecture 102. The inner surface of the second step 144 is bonded to the anode backplane 106. The bond can generally be set anywhere on the protective membrane. While FIG. 1B shows the bond to be set on the surface of the protective membrane architecture 104 adjacent to the environment external to the anode compartment, the invention is not limited to this arrangement.

The inner surface of the second step 144 of the compliant seal structure 104 is bonded to the anode backplane 106. Likewise, the compliant seal structure 104 may be bonded to any portion of the anode backplane, including the surface that is adjacent to the active metal anode or on the opposing surface, bearing in mind the desire to optimize hermeticity of the seal while maximizing the active metal anode surface area relative to the total area of the protected anode. Referring back to FIG. 1B the compliant seal structure is bonded to the surface of the anode backplane that is adjacent to the active metal anode.

It should also be noted that the overall geometry of the anode is square in the embodiment illustrated in FIG. 1A-E (seen particularly in FIG. 1D), it could equally well be any shape such as rectangular or circular. The choice of geometry depends on the eventual device application, the materials properties of the device components, and other performance optimization parameters.

Referring now to FIGS. 3A-H, there is illustrated a variety of compliant seal structures in accordance with the present invention with various configurations and bond placements. The drawings are depicted in columns labeled I, II and III: column I illustrates a three-dimensional (3-D) perspective of an edge of the compliant seal structure; column II shows the edge in cross-sectional depiction as it appears in the context of protected anode architecture drawings; and column III illustrates cross-sections of the protected anode architectures having the various compliant seal structures.

Eight different configurations are illustrated in FIGS. 3A-H. In all eight depicted embodiments the protected anode architecture comprises an active metal anode, 300, a compliant seal structure 304 bonded to a protective membrane architecture 302 and an anode backplane 306 (including, in some embodiments forming a portion of the anode backplane). The main differences among the embodiments are the configuration of the compliant seal structure and the location of the bond between the compliant seal structure and the protective membrane architecture and anode backplane. There is one further difference that is particular to the embodiments illustrated in FIG. 3G and FIG. 3H in that in these embodiments the compliant seal structure and the anode backplane share a contiguous piece of material.

Figure 3A:
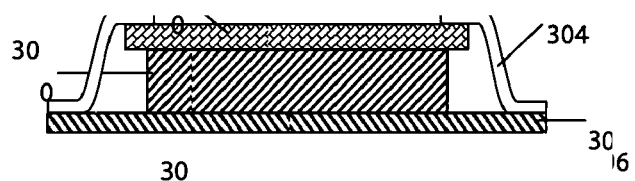
FIGS. 3A-H illustrate various alternative configurations of a complaint seal structure for a protected anode architecture in accordance with embodiments of the present invention.
Figure 3B:
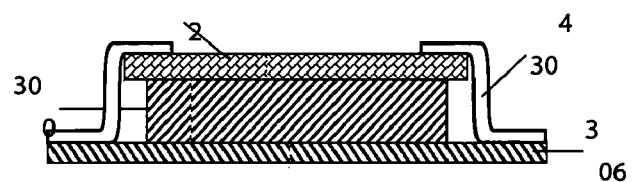

The compliant seal structure 304 illustrated in FIG. 3A is like that previously described with reference to FIG. 1B. It comprises a double-step configuration having a first and second step and an oblique angle between steps. Each step provides a platform for bonding. The bond between the compliant seal structure 304 and the ion membrane architecture 302 is located between the inner surface of the first step and the top surface of the protective membrane architecture 302. The second step is bonded between its inner surface and the bottom surface of the anode backplane. The angle between steps may be adjusted to fine-tune the flexural characteristics of the compliant seal structure 304. For example, a greater angle (more oblique) between steps provides ease of flexure. As the angle decreases, approaching 90 degrees, as illustrated in the compliant seal structure 304 shown in FIG. 3B, there is a tradeoff between ease of flexure and volume savings with respect to unused space in the anode compartment.

Figure 3C:
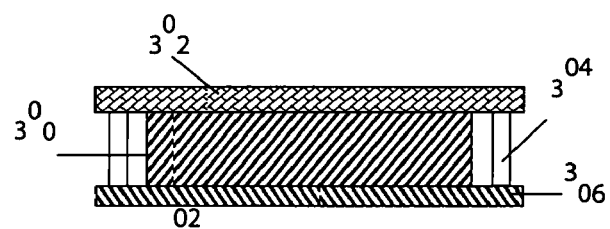
Figure 3D:

The compliant seal structure 304 in FIG. 3C, has what may be termed a straight configuration; bonded on its edge to the bottom surface of the ion membrane architecture 302, preferably directly on the surface of the impervious ionically conductive layer. The compliant seal structure 304 is bonded on its opposing edge to the bottom surface of the anode backplane 306. While this configuration has a seemingly minimal footprint, the edge needs to be wide enough to provide enough surface area for adequate bonding. Accordingly, for thin compliant seal structures 304 that do not provide adequate surface area for edge bonding, a discrete sealant 312 can be applied that engulfs the edge and covers part of the nearby inner and outer surfaces, as illustrated in FIG. 3D. Particularly useful discrete sealants are room or moderate (<200° C.) temperature curing epoxies that are substantially impervious and chemically resistant, such as Hysol E-120HP, a polyamide manufactured by Loctite Corporation or poly-isobutylene of average molecular weight from 60,000 to 5,000,000, preferably from 700,000 to 2,500,000.

Figure 3E:
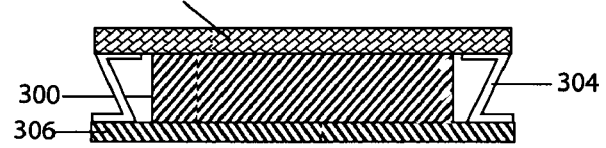

In the preceding examples, the angles illustrated for a double-step configuration have ranged from nearly perpendicular to oblique. If the angle between steps of a double step configuration is acute, it is more appropriately termed a Z or inverted Z configuration. In FIG. 3E, a Z configuration is illustrated with the bonds located on the outer and inner surface of the compliant seal structure 304 between the bottom surface of the protective membrane architecture 302 and the bottom surface of the anode backplane 306, respectively. Again, it is preferable that the bond on the ion membrane architecture 302 be located on the surface of the impervious ionically conductive layer.

Figure 3F:
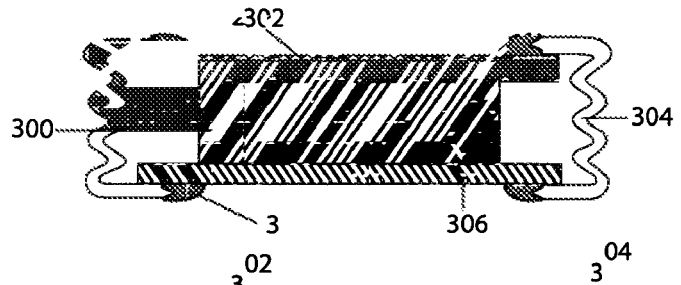

Another configuration for the compliant seal structure 304, that of accordion like folds with a bond placed on the top surface of the anode backplane 306 and the top surface of the protective membrane architecture 302 is illustrated in FIG. 3F. FIG. 3F also illustrates the embodiment of multi-sealant practice, whereby a discrete secondary sealant 312 covers the seams and area where the primary sealant was applied. For example, the edge of a compliant seal structure comprising a multi-layer laminate might expose its inner metal barrier layer and an integrated heat-sealable thermoplastic layer used as a primary sealant, to the environment external to the anode compartment. A chemically resistant and substantially impervious discrete sealant applied on the edge of the heat seal would provide chemical protection against corrosion of the barrier layer and prevent permeants from seeping underneath or swelling the thermoplastic layer. Again, a particularly suitable discrete secondary sealant is Hysol E-120HP and another particularly suitable discrete secondary sealant is poly-isobutylene of average molecular weight from 60,000 to 5,000,000, preferably from 700,000 to 2,500,000.

Figure 3G:
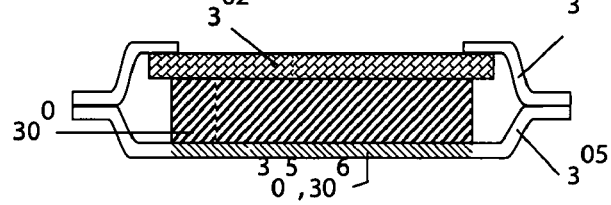

In FIG. 3G there is illustrated a compliant seal structure component 304 bonded to the ion membrane architecture 302 and to the anode backplane 306. In this embodiment, the anode backplane 306 and the compliant seal structure component 305 share a common, contiguous piece of material. In a preferred embodiment the compliant seal structure and the anode backplane both have a thermoplastic heat-sealable inner layer of the same composition, which leads to particularly strong heat seal bonds and facilitates the incorporation of a portal for a terminal connector such as a tab.

Figure 3H:
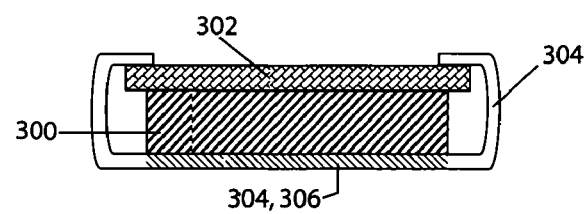

Finally in FIG. 3H there is illustrated a compliant seal structure 304 that is bonded to the protective membrane architecture and wraps around the backside of the anode 300, such that the anode backplane 306 and the compliant seal structure 304 again share a common, contiguous piece of material.

As noted above with reference to the various compliant seal structure embodiments, a sealant (or sometimes more than one) is used to bond the compliant seal structure to the protective membrane architecture and to the anode backplane. Generally, any sealant can be used so long as it provides the necessary strength to maintain the bond over the lifetime of the device and is substantially impervious and chemically resistant as described above. The proper choice of sealant is important as it must be matched to the material properties of the anode compartment in terms of chemical compatibility and processing conditions such as temperature. Special consideration should be given to matching materials properties. As previously described, a number of the preferred compliant seal structures of the present invention comprise polymers that degrade at relatively low temperatures (<350° C.) and as a result require sealants that bond at low temperature, and preferably room temperature. Moreover, the components inside the anode compartment may be very sensitive to temperature, such as the active metal anode and liquid anolyte. Preferred sealants of the present invention are set below the melting or glass transition temperatures of either or any of the materials being joined. Particularly useful sealants are low melting temperature thermoplastics bound by thermal compression (e.g., LDPE, LDPP, etc), and chemically resistive epoxy sealants that can be set at moderate or room temperature, such as Hysol E-120HP and others such as poly isobutylene of average molecular weight from 60,000 to 5,000,000, preferably from 700,000 to 2,500,000.

While adhesive sealants, such as Hysol E-120HP or poly isobutylene (average molecular weight from 60,000 to 5,000,000, preferably from 700,000 to 2,500,000) and thermo-plastic sealants such as LDPE and LDPP that are bound by thermal compression are preferred, they are not the only type of discrete sealant useful for the instant invention. For instance, in the case where the compliant seal structure or materials being joined do not comprise thermally sensitive material, a number of alternative sealants and sealing techniques may be employed including glass seals, brazing, solder seals etc. For example, in the instances where the protective membrane architecture comprises a fully solid state architecture, and the compliant seal structure comprises thermally stable materials such as metals and ceramics, such alternative sealants may be employed.

In some embodiments, the sealant is an integral component of the compliant seal structure. For example, a low melting temperature thermoplastic layer forming a surface of a multi-layer laminate structure. Such a thermoplastic bottom layer softens at relatively low temperature and is bonded using thermal compression (heat-sealing). When a liquid or gel anolyte interlayer protective membrane architecture (FIG. 2D) is used, the heat sealable thermoplastic bottom layer must be chemically stable with and should not be swelled by the liquid anolyte impregnated in the interlayer. Examples of suitable heat sealable layers include ionomer, polyethylene, polypropylene, polystyrene, Surlyn, polyphenylene oxide, acrylic acid modified polyethylene and acrylic acid modified polypropylene. In other embodiments the integrated sealant is an adhesive such as poly isobutylene that may be coated onto the compliant structure prior to bonding to the protective architecture or anode backplane.

Discrete sealants such as epoxy sealants (e.g., Hysol E-120HP), or adhesive sealants such as poly isobutylene as opposed to sealants that are an integral component of the compliant seal structure, may also be used as a primary seal, bonding the compliant seal structure to its opposing surface; such as the surface of the protective membrane architecture and/or the surface of the anode backplane. Discrete sealants may also be used as a secondary sealant; for example, around the seams where a primary sealant was already applied, for example around the edges of a heat sealed thermoplastic. Such a multi-seal system improves ruggedness of the primary seal and barrier properties. It is within the scope of the invention to use a multi-sealant system comprising heat-sealable integrated sealants and discrete sealants of varying compositions and combinations thereof. In the instances where a heat-seal bond is a primary bond, the secondary and tertiary sealants etc. are preferably processed at temperatures below the softening temperature of the heat-seal thermoplastic. Particularly useful secondary sealants dispensed on a heat seal seam are epoxy adhesives such as Hysol E-120HP. Further useful discrete sealants are poly isobutylenes.

In another embodiment of the invention, a parlyene coating can be used as a discrete non-primary sealant to enhance barrier properties around anode compartment seams. Paralyene has excellent chemical resistance and can be used to make conformal coatings around edge seals or over the entire compliant seal structure. Paralyene coatings may be particularly useful for coating the edges of compliant seal structures that use a primary heat sealable thermoplastic to bond the protective membrane architecture. For example, paralyene may be applied around the seams using a masking method to avoid coating sensitive areas such as the surface of the protective membrane architecture. Furthermore, parylene coatings are conformal so they may be utilized to improve the barrier properties and insulating character of the compliant seal structure in general; for example, coating the structure to infiltrate and/or cover pinholes.

Pre-treatments of the protective membrane surface can be used to enhance the strength and stability of the bond between the protective membrane and the compliant seal structure. These include treatments to roughen the surface of the membrane such as chemical etching (acid or base) and mechanical grinding. A particularly suitable etchant is concentrated lithium hydroxide. Moreover, the membrane surface around its perimeter may be coated with a primer such as thin layers of inorganic compounds chemically stable in catholytes and anolytes. The thickness range for such primer coatings are from about 0.01 to 5 um, preferably from 0.05 to 0.5 um. Particularly suitable primer coating compounds are metal nitrides such as $SnN_x$ and titanium nitride that may be prepared by physical vapor deposition such as reactive sputtering in a $N_2$ atmosphere. Other suitable primers include oxides such $In_2O_3$, $SnO_2$, and $TiO_2$ that may be prepared by sol-gel method, thermal evaporation, chemical vapor deposition and by pyrolysis.

Referring back to FIG. 1B, in a preferred embodiment the compliant seal structure 104 comprises an integrated sealant layer, such as a LDPE layer, that bonds by thermal compression the compliant seal structure to the protective membrane architecture 102 and the anode backplane 106. In the embodiment illustrated in FIG. 1B, the anode backplane support 107 is also a multi-layer laminate comprising a low melting temperature thermoplastic inner layer of a similar if not the same composition.

While the embodiment illustrated in FIGS. 1A, D and E suggests that the compliant seal structure is fabricated in the form of a unified window frame, within the scope of the invention, the compliant seal structure may comprise discrete structures and elements or combinations of discrete structures and elements bonded together to effectively form a unified compliant seal structure.

In one preferred embodiment of the present invention both the compliant seal structure and the anode backplane have a thermoplastic heat-sealable inner layer of LLDPE. Having both materials being heat-sealable and of the same composition leads to particularly strong heat seal bonds and facilitates the incorporation of a portal for a terminal connector such as a tab. As illustrated in FIG. 1B, the tab is joined to the anode current collector inside the anode compartment, and exits the anode compartment from a portal between the compliant seal structure 104 and the anode backplane 106. To strengthen the bond and its hermeticity, the terminal connecting tab may be blanketed and/or coated with a thermoplastic resin having a low melt temperature such as LDPE.

Alternate Embodiments

Basic parameters of the invention have been described above with reference to several embodiments. The invention may also be embodied in several other anode structure architectures, arrays and cells, examples of which are described below:

Double-Sided Anode Structure

Figure 4A:
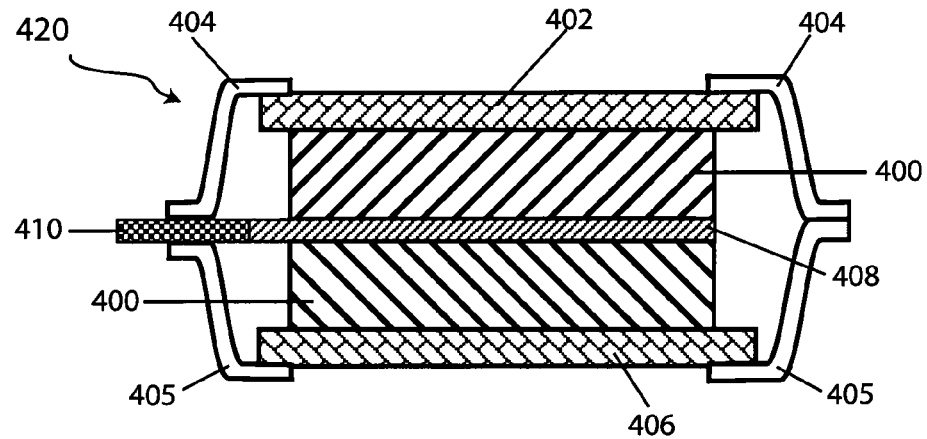
FIGS. 4A-C illustrate a protected anode architecture in accordance with an embodiment of the present invention in which the protected anode has a double-sided protected anode structure.
Figure 4B:
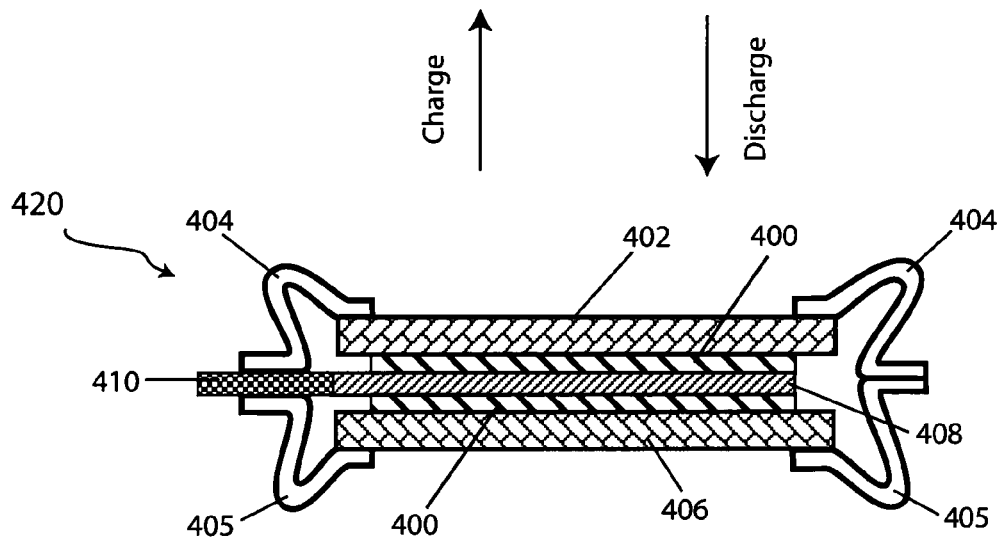
Figure 4C:
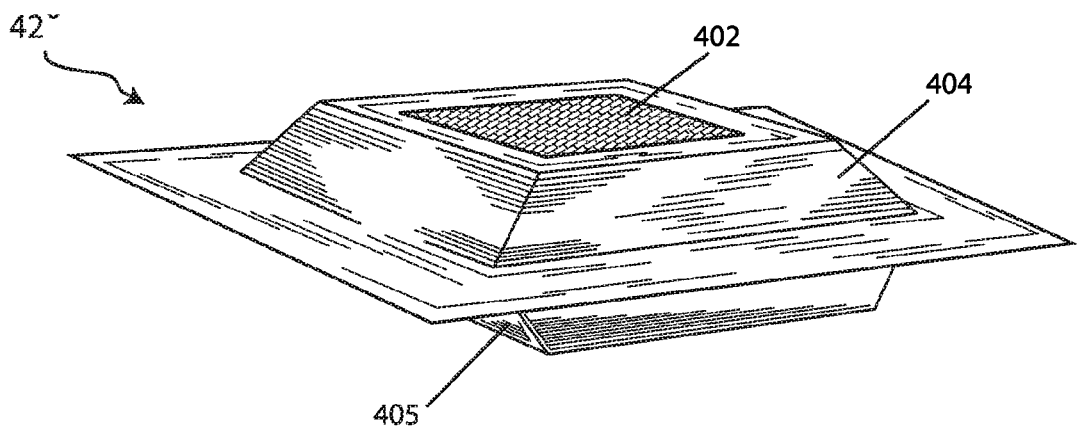

One alternative embodiment of a protected anode architecture of the present invention is illustrated in FIGS. 4A-C. FIG. 4A depicts a cross-sectional view of the protected anode architecture in a fully charged state; FIG. 4B depicts a cross-sectional view of the protected anode architecture in a partially discharged state; and FIG. 4C depicts a perspective view of the protected anode architecture. The protected anode architecture 420 has a double-sided structure. The structure is double sided in the sense that active metal ions are available to leave and enter the protected anode architecture from both planar surfaces. The protected anode architecture 420 comprises an active metal anode 400 having a first and second surface. Adjacent to the first surface of the active metal anode is an protective membrane architecture 404 and adjacent to the second surface is the anode backplane 406, which in this embodiment is a second protective membrane architecture. A current collector 408, e.g., a nickel foil is embedded inside the active material of the active metal anode. In one embodiment, the active metal material is Li and the anode is formed by adhering Li foil to both sides of the current collector, for example, by pressing. In another embodiment, the active metal material of the anode may be coated on both sides of the current collector with a composite coating comprising an active metal intercalating material such as graphite.

In the depicted embodiment, each of the two protective membrane architectures 402 and 406 are bonded to respective compliant seal structure components 404 and 405. The compliant seal structure components are molded into preformed frames with a first and second step and having slightly oblique angles between each step. The first step of the compliant seal structure 404 is bonded to its respective protective membrane architectures 402. In the same fashion, the second protective membrane architecture is bonded to the second compliant seal structure component. The second step of each compliant seal structure component is bonded to each other, around the periphery of the anode compartment. Thus, the final structure was built-up from two separate double-step structures. Of course, other configurations are possible, as discussed above.

A particularly suitable compliant seal structure of the present invention comprises a multi-layer laminate having a heat sealable thermoplastic bottom layer. Accordingly, these compliant seal structures are heat-sealed to their respective protective membrane architectures and to each other.

Referring back to FIG. 4A, the current collector 408 is joined to a terminal connector 410. The terminal connector may be attached to the current collector and/or the active metal material of the anode by any of a number of well-known methods such as but not limited to soldering, physical pressure, ultrasonic welding, and resistance welding.

The terminal tab 410 extends to the outside of the anode compartment and in one embodiment of the invention it exits the anode compartment at the junction where the first and second compliant seal structure components 404/405 are bonded together. In the instance whereby the compliant seal structure components are multi-layer laminate materials, the terminal tab can be encapsulated by the bottom layer thermoplastic material of the two compliant seal structure components 404/405 by thermal compression. In order to ensure an hermetic seal is formed around the tab, the terminal tab 410 may be coated with a low melting temperature thermoplastic or have a low melting temperature thermoplastic film wrapped around its surface in the area of the heat seal. A suitable thermoplastic is polyethylene or polypropylene.

While in most embodiments the double-sided protected anode architecture is symmetric in that the second layer material of both protective membrane architectures (or the solid electrolyte in the case of monolithic architectures) are roughly of the same composition and thickness, there are some instances whereby the functionality of the device would benefit or be derived from asymmetry. In one aspect the asymmetry may be realized by modifying the chemical composition, atomic structure and/or thickness of the second material layer such that one membrane is substantially different from the other. In another aspect, the double-sided protected anode architecture may comprise an active metal anode bisected by an electronic insulator such that the electrical current through opposing protective membranes (membranes on either side of a double-sided protected anode architecture) is under independent electrochemical control.

Protected Anode Arrays

The present invention also encompasses protected anode architecture arrays comprising an assemblage of individual protected anode cells. Having an array of protected anode cells offers design versatility in terms of augmenting the dimension of the anode, enabling conformal array structures capable of conforming to the surface of varying structural shapes and providing for arrays having various configurations such as cylindrical and spiral wound designs.

Flexible arrays offer an added degree of ruggedness during handling and manufacture as well as device deployment and operation. For example, in the case of an metal/seawater battery that is open to the ocean, protected anode architecture arrays of the present invention which have some degree of flexure offer significant benefit in terms of ruggedness for such an underwater application. Moreover, the flexible arrays have an additional benefit of being conformal and this facilitates a number of advantages with respect to volume optimization of a battery cell that needs to fit a certain volume and shape requirement. While the individual cells are all hermetically sealed from the external environment, in part, by a flexible compliant seal structure, the body of the array may be rigid or flexible. The flexural character of the array is determined by the pliancy of the compliant seal structure and in the case of arrays comprising cells that share a common anode backplane, by the flexibility of the anode backplane as well.

In some embodiments of the invention the individual cells of the array share a common anode backplane, in other arrangements the array can take on a number of configurations including planar and cylindrical shapes. The arrays may be rigid or flexible. In other embodiments the array may comprise double sided anode cells; and in other embodiments of the invention a particularly pliant array provides enough flexibility for spiral winding.

Figure 5A:
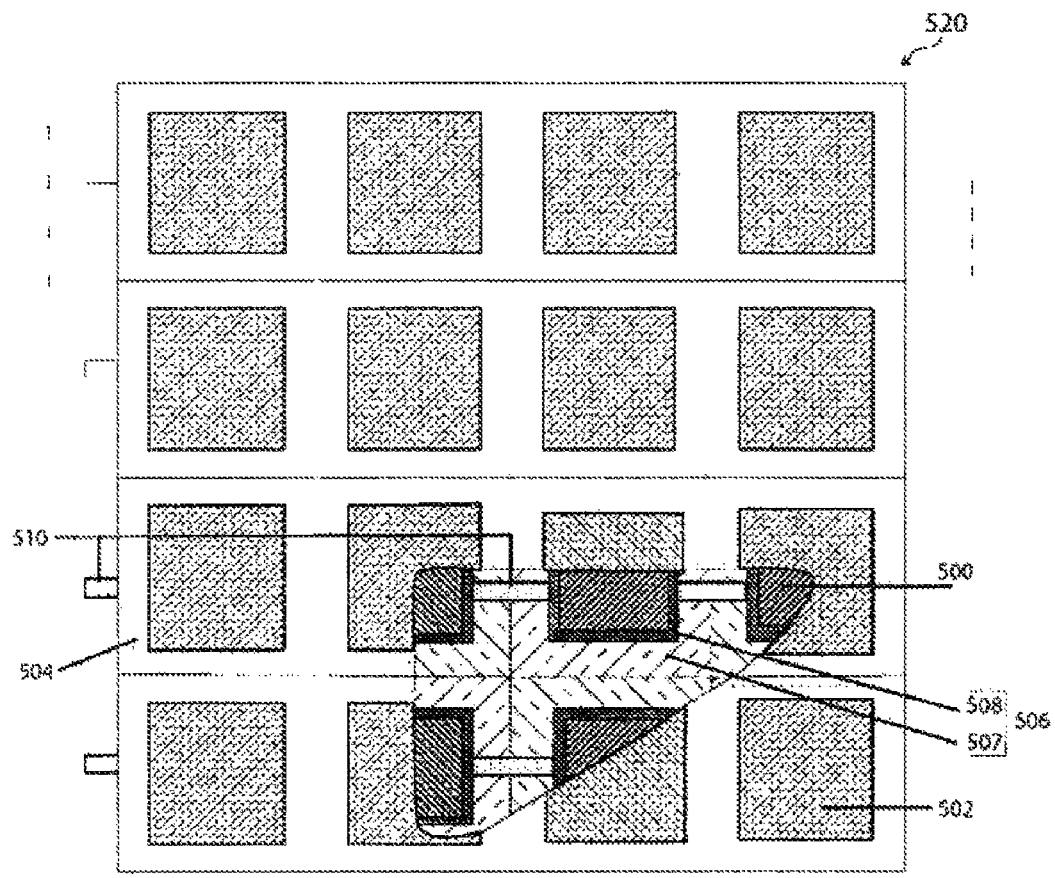
FIGS. 5A-C show protected anode architecture planar array formats in accordance with embodiments of the present invention.

A single-sided protected anode array 520 is illustrated in FIG. 5A (with a cut-away to reveal the various layers). The array shown in FIG. 5A is designated a 4×4 planar array in that the array is four cells across each row and there are four rows. For the sake of convenience in this description of the embodiment, the array dimensions are defined by the number of cells along a given row, designated as m cells and by the number of rows, designated as n rows. For example, an array with 3 rows and 6 cells per row is termed in m×n nomenclature as a 6×3 array. The m_x_n arrays of the present invention may take on any configuration including planar or cylindrical. It should also be clear that the invention is not limited to arrays of cells that are distributed in a strictly perpendicular arrangement or for that matter having any ordered arrangement whatsoever. In fact, the arrays may comprise an apparently random arrangement of anode cells.

The protected anode cells of the array may be of any geometric shape and dimension; though they are generally squares, rectangles or circles. In FIG. 5A the individual protected anode cells are square. Moreover, while it may be the case that each of the protected anode architectures is of the same dimension, the individual protected anode cells of a given array can be of different size and shape. In fact, varying shape and size of the individual protected anode architecture cells provides flexibility for the design of the array configuration and can impart pliancy to the body of the array. Accordingly, in one embodiment, the dimension of each cell varies in its width such that it enables the protected anode array to be spiral wound. The radius of curvature around each bend depends in part on the progressive variation of the cell width along a given direction of the array. This embodiment is described further below with reference to FIG. 7.

Referring back to FIG. 5A, the protected anode array 520 in this example comprises 16 cells configured as a 4×4 matrix. The individual cells are structurally similar to the embodiment illustrated in FIGS. 1A-E, which is that of a single sided protected anode architecture. Each of the 16 cells of the array comprise an active metal anode 500 having a first and second surface; and each cell has an protective membrane architecture 502 adjacent to the first surface of its active metal anode. In the embodiment shown in FIG. 5A, better viewed in the corresponding alternative cross-sectional views for FIGS. 5B and 5C, the individual cells of the array share a common anode backplane support component 507. The common anode backplane support component is substantially impervious and adjacent to the second surface of the active metal anode of each cell. The anode backplane may be rigid or flexible.

In a preferred embodiment the anode backplane support component is flexible. A suitably flexible anode backplane is or includes a multilayer laminate such as a flexible multilayer laminate manufactured by Lawson Mardon Flexible, Inc. in Shelbyville, Ky., with the product specification Laminate 95014. This laminate is about 120 microns thick, comprising a top layer of polyethylene terephthalate (about 12 micron thick); a middle layer of aluminum foil (about 32 micron thick); a middle layer of polyethylene terephthalate (about 12 micron thick), and a bottom layer of low density polyethylene. Such multi-layer laminates are particularly attractive as common anode backplanes as they form very strong heat seal bonds to the compliant seal structures of the same composition. Moreover, the multi-layer laminates are relatively lightweight and impart excellent barrier properties to the array.

Figure 5B:
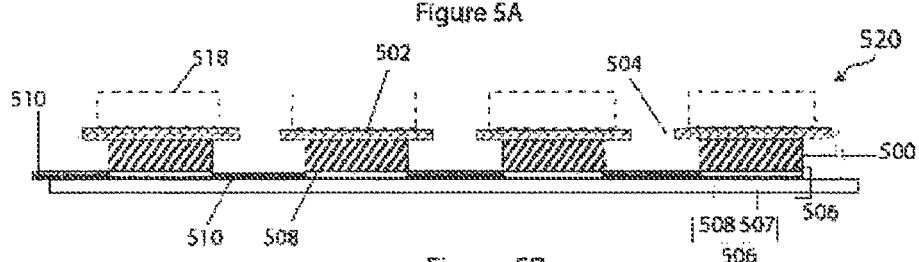

Referring now to FIG. 5B, the array illustrated is representative of what is termed a closed array design, whereby each individual cell is enclosed within its own anode compartment by a compliant seal structure 504 that is bonded to a given cell's protective membrane architecture 502 and to the common anode backplane support component 507. The compliant seal structure may be provided as 16 individually preformed structures or as a single compliant seal structure having 16 internal frames in a unified compliant seal structure. In another embodiment, each row of the array comprises its own pre-formed compliant seal structure. In the instance illustrated in FIGS. 5A and B this would amount to a compliant seal structure having four internal frames that is bonded, for example by a heat seal, to the common anode backplane support component 507.

The protected anode arrays of the present invention may vary widely with respect to the configuration of the electronic connection among cells and the output to the external environment. The distribution of electronic connections among cells effectively forms an electronically conductive network that comprises electronically conducting interconnects for cell-to-cell current collection and terminal connectors for electrical output to the external environment.

In one embodiment, the active metal anode of each individual cell has its own terminal connector that is in electrical continuity with the respective anode and extends outside the enclosure of the array. This type of configuration offers the most control over each individual cell and enables the utility of external electronic circuitry to monitor/control each protected anode cell individually. A tradeoff with this configuration is the increased likelihood of a seal breach simply due to the large number of seals that surround each external port. Accordingly in this aspect of the invention it is particularly useful to make use of a secondary room temperature curing adhesive sealant, as described above, such as Hysol E-120HP, around the seams at the junction between the compliant seal structure and the anode backplane.

In another embodiment, the protected anode architecture array comprises a common anode backplane that is an electronic conductor such as a stainless steel foil or plate and that provides electronic continuity for the entire array and a terminal connection. In some circumstances this aspect of the invention provides advantages as their is no need to provide additional terminal connections and subsequent seals for electrical output.

The array designer has the flexibility to choose between the simplicity of a common anode backplane providing both current collection and a terminal connection, and having electronic control of each anode cell individually, and/or combinations thereof.

A balance between these two designs is embodied in the array illustrated in FIG. 5A, where there is provided a separate terminal connector 510 for each row of the array. Hence, there are four terminal connectors and each one provides output current from the four cells in its given row. To do so, the anode backplane 506 of each cell comprises a current collector 508 positioned at the back of the active metal anode and the current collectors are electronically interconnected by a suitably conductive material, such as a metallic foil tab. Alternatively, the current collector behind the active metal anodes of each row may comprise a unified structure that extends to each cell along the row and thereby maintains electronic continuity among cells of a given row.

Figure 5C:
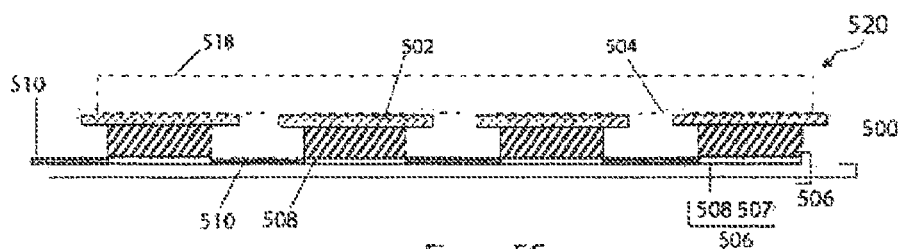

An alternative to a closed array design, shown in FIG. 5C, is an open array design whereby the protective membrane architecture of each cell is joined together by a compliant seal structure and is only joined to the anode backplane around the periphery of the array. This effectively leaves the anode compartment of adjoining cells open to each other within the array. In order to seal off the array from the environment, the cells at the periphery of the array are bound to an anode backplane. The open array design provides an open inner structure and, perhaps, greater flexibility at the joint between cells. In contrast, the closed array design, offers significantly more control over the performance of each cell as the volume of each anode compartment is able to adjust independently.

For a given anode cell size, for example determined by the size of the protective membrane architecture, the anode arrays of the present invention provide a way to augment the size of an associated electrochemical device such as a battery cell. Referring to FIGS. 5B and C. a battery cathode 518 can be placed adjacent to the protective membrane architecture 502 of the 4×4 protected anode array to form a battery cell comprising the array. In one embodiment of the invention individual cathodes cover each anode cell of the array and in another embodiment a single cathode can be large enough to cover the entire surface of the array.

The arrays of the present invention may also be flexible in the sense that the array is able to conform to a variety of structural shapes providing ruggedness to the overall character of the array. The conformability of the array depends on the flexural characteristics of the compliant seal structure, as well as the array design, such as open or closed, and in some embodiments in which the array comprises a common anode backplane, the flexibility of the anode backplane becomes a determining factor to the overall conformability of the array. For arrays that comprise individual anode cells that do not share a common backplane, in other words each has its own distinct anode backplane, the flexure of the array is determined by compliancy of the seal structure. Generally, for arrays that have a common anode backplane, the flexural character of the array depends on the pliancy of both the compliant seal structure and the flexibility of the anode backplane, which is a function of the constitution and configuration of the anode backplane.

Figure 6A:
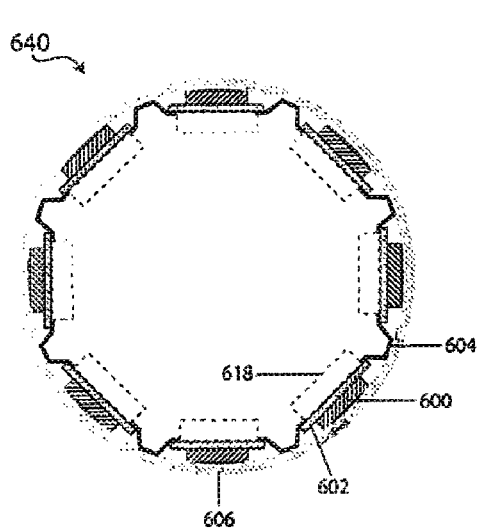
FIGS. 6A-B show protected anode architecture tubular array formats in accordance with embodiments of the present invention.
Figure 6B:
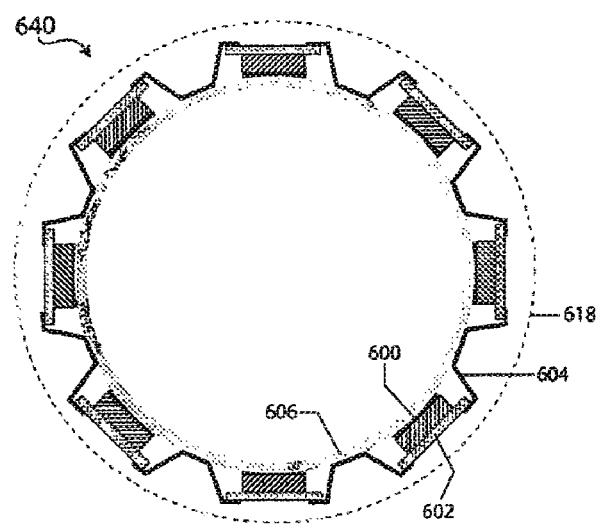

The protected anode arrays of the present invention can be configured into a wide variety of shapes, including cylindrical and spiral wound. Referring to FIGS. 6A and 6B., the arrays 640 are provided in cylindrical geometry in which the anode backplane 606 is a cylinder that is common to all cells in the array. The protected anode array is essentially curved around the inner circumference of the cylinder as shown in FIG. 6A and around the outer circumference of the cylinder in FIG. 6B. The array may be rigid or flexible. In one embodiment of the invention the array is fabricated in a planar fashion and then rolled into a cylinder. In another embodiment the cells are fashioned onto a rigid cylindrical anode backplane. Referring to FIG. 6A, the individual anode cells 620 of the array comprise an active metal anode 600 having a first and second surface. The first surface is adjacent the protective membrane architecture 602, the second surface is adjacent the anode backplane 606. The compliant seal structure 604 is joined to the protective membrane architecture 602 and to the anode backplane 606, and encloses the anode around its perimeter.

In the configuration illustrated in FIGS. 6A and 6B, the array has a closed design as each cell is individually sealed to a common anode backplane 606. The anode backplane may comprise a flexible polymer having a metal grid coated onto its surface in order to collect current from each active metal anode and to transfer current from each cell to a terminal connector. As noted above, the array may have a terminal connector for each cell, or it may have a terminal connector for a designated number of cells, or there may be one terminal connector for all the cells of the array. The flexible polymer backplane may be rolled into a cylinder format as illustrated in FIGS. 6A and 6B. In another embodiment, the cells can share a common anode backplane which may be a metal cylinder such as a copper cylinder. In this aspect the current collection and terminal connection are accomplished by the copper cylinder. The protected anode array 640, as it would be employed in a battery, comprises a cathode 618, or an electron transfer structure 618 as would be the case if water was employed as the depolarizer. The cathodes may be located anywhere in the interior of the cylinder for the embodiment illustrated in FIG. 6A; and anywhere on the exterior of the cylinder shown in FIG. 6B. In FIG. 6A individual cathodes are located directly adjacent the protected anodes inside the cylinder. In FIG. 6B a single cathode is effectively wrapped about the exterior of the cylinder. For example, in a metal/seawater battery, the cells of the array are exposed to seawater. In one instance the seawater may be rushing through the interior of the cylinder or around the exterior of the cylinder. While a cylindrical shape is illustrated in the embodiment, the array can be quite conformal and may take other forms. In one embodiment, the array is on a flexible anode backplane, providing some degree of conformity. In another aspect, the array may take the form or shape of an apparatus such that it may be placed in a conformal manner adjacent to the apparatus. Furthermore, by adjusting the shape and size of the individual cells of a given array, the array can be made more conformal, for example around edges and corners. This is illustrated further in the embodiment illustrated in FIGS. 7A-B

Figure 7A:
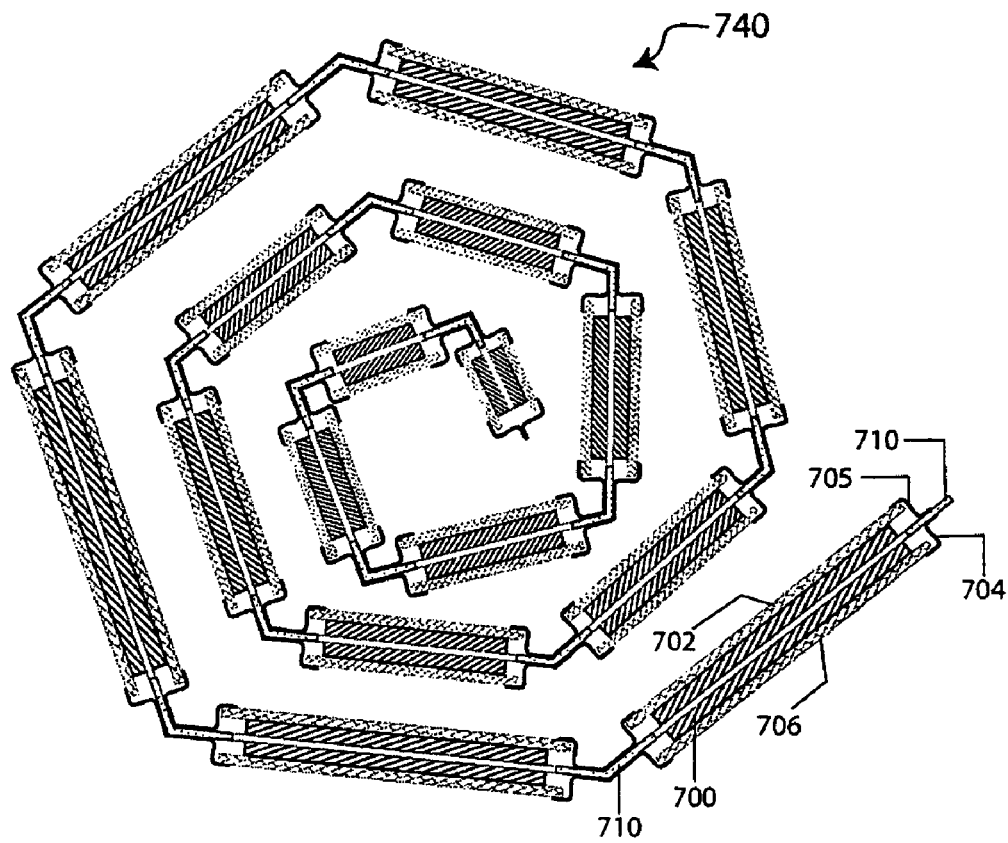
FIG. 7A-B shows a protected anode architecture spiral array formats in accordance with an embodiment of the present invention.

A number of battery performance parameters are dependent on the apparent area of the anode and cathode. In one array embodiment of the present invention, the apparent active area of the array is doubled by a double-sided assemblage. A double sided anode array 740 is illustrated in FIGS. 7A and B. The array comprises individual protected anode architecture cells 720 that are strung together to form a row of cells. Each cell comprises an active metal anode 700 having a first and second surface. The first surface of the active metal anode 700 is adjacent the protective membrane architecture 702 and the second surface is adjacent the anode backplane 706. As the embodiment is that of a double sided anode, the anode backplane is a second protective membrane architecture. A compliant seal structure component 704, in the form of a double step configuration, is bonded to the protective membrane architecture 702 and a second compliant seal structure component 705 is bonded to the anode backplane 706 (second protective membrane architecture). The two compliant seal structure components are bonded together to compete the compliant seal structure and enclose the cell. The cells are in electronic continuity having electronically conductive interconnects encapsulated between compliant seal structures of the first and second protective membrane architecture. The interconnects run across the length of the array 740 until they reach an end cell whereby a terminal connector extends to the outside of the array 740.

Figure 7B:
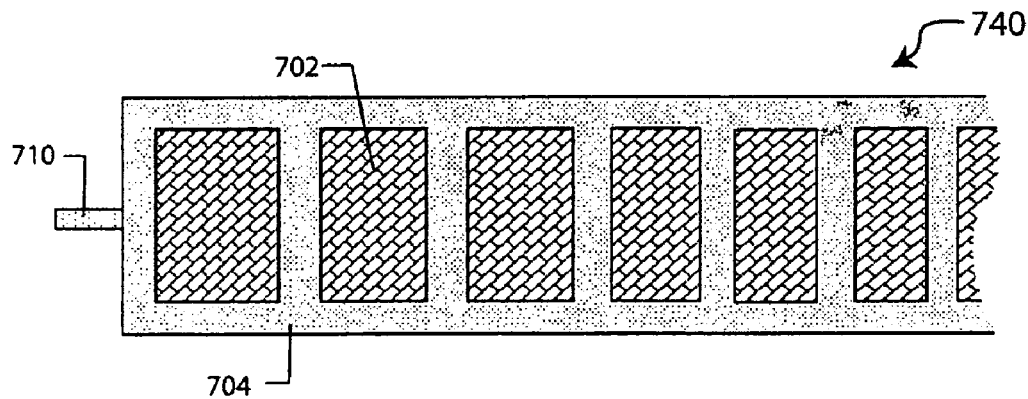

As shown in FIG. 7B, the physical length of each cell in the direction along the row of cells progressively changes, starting from the first cell, which has the longest length, to the last cell, which has the smallest length. Provided that the compliant seal structure components 704, 705 have the appropriate flexural character to allow the structure to bend around the desired radius of curvature, this design allows for the array to be spiral wound as shown in FIG. 7A. The radius of curvature around each bend depends in part on the degree of progressive variation of the cell dimension along the array length and the flexibility of the compliant seal structure. In FIG. 7B the cells do not share a common anode backplane so their flexibility depends on the pliancy of the compliant seal structure 704, 705. By winding spiral the apparent surface area of the array 740 is increased within a volumetric structure having a smaller footprint than a planar array of the same area.

Figure 8A:
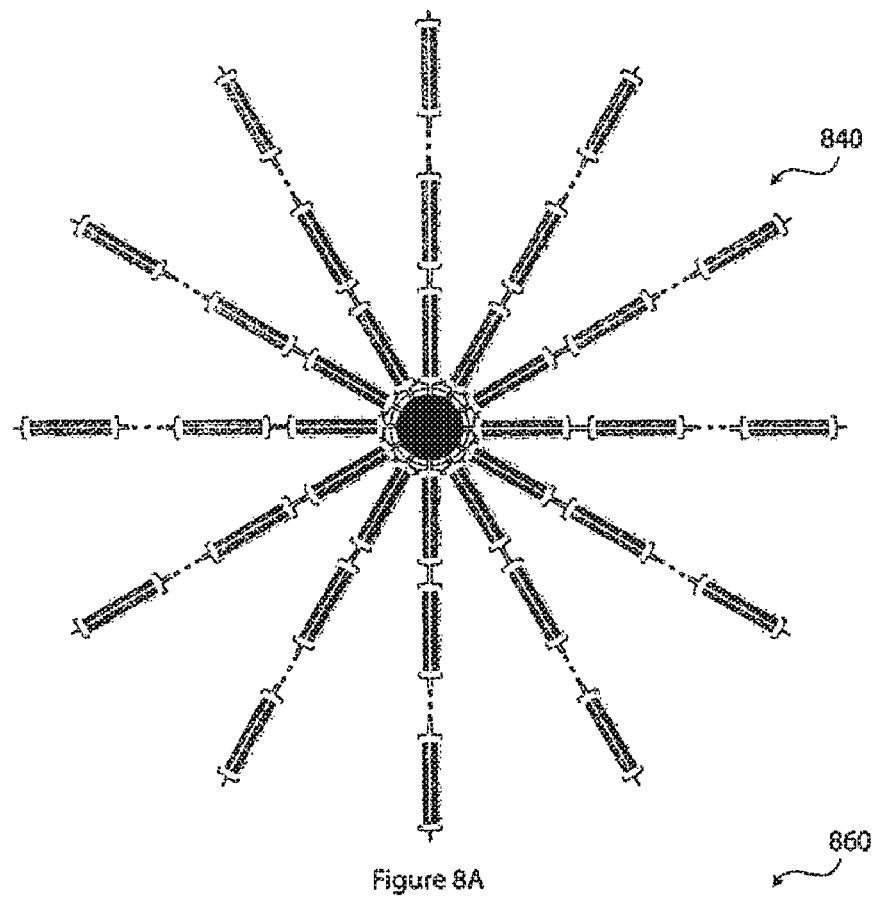
FIGS. 8A-B illustrates a hub and spoke double-sided protected anode architecture array in accordance with an embodiment of the present invention.
Figure 8B:
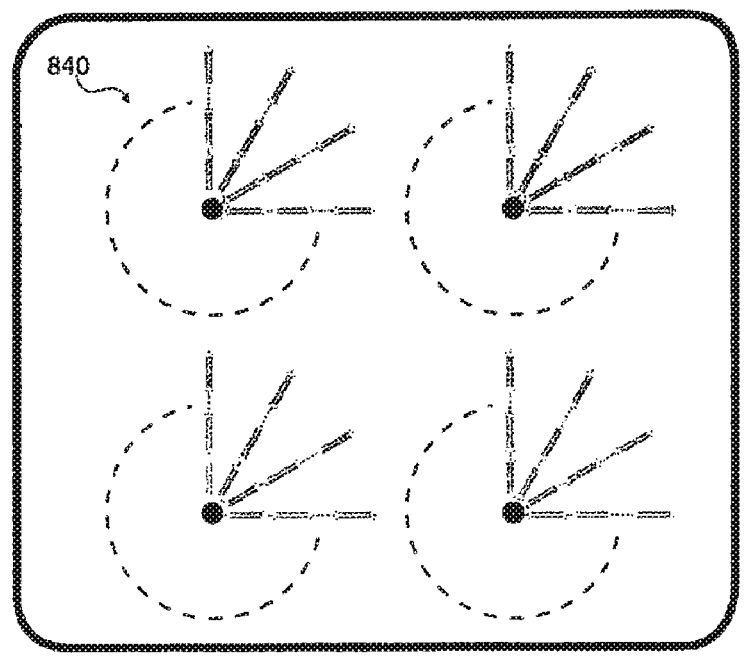

An alternative array embodiment is illustrated in FIGS. 8A-B. The array comprises double sided protected anode architectures as described above that are linked together and emanate from a center point, where the terminal connection is made. This arrangement is likened to a hub and spoke arrangement whereby the spokes correspond to an array of cells connected together at the hub. Such a hub and spoke arrangement is particularly useful to augment surface area for a metal/seawater battery cell, and is also particularly useful for redox flow cells. In a preferred embodiment, each array of cells, along the direction of a spoke, shares a common anode backplane that is rigid enough to provide structural support to the array. Ideally the common anode backplane comprises a strong yet lightweight material, such as a carbon composite.

The catholyte (e.g., seawater, redox active liquids) essentially fills the regions between anode arrays (spokes). An appropriate cathode structure comprising at least one of an electronically conductive material, not drawn, could be located adjacent to each of the arrays. There is a limit for the length of each spoke in terms of optimizing battery cell volume, in the sense that as the spokes get longer the volume between spokes gets progressively larger. In the configuration illustrated in FIG. 8B, essentially an array of so-called "spoke and hub" arrangements is illustrated. Effectively, this array of arrays makes for a denser packing of protected anode cells.

Electrochemical Cell Structures

The invention of a protected lithium anode such as are described in commonly assigned co-pending published US applications US 2004/0197641 and US 2005/0175894, and their corresponding International Patent Applications WO 2005/038953 and WO 2005/083829, respectively the disclosures of which are incorporated by reference herein in their entirety and for all purposes, offers significant advantages in the design of new electrochemical cell structures based on such anodes, including the ability to use active metal electrodes in conjunction with cathode structures and catholytes that if not for the protective membrane architecture would corrode the anode or degrade its performance.

In the context of the present invention, the term catholyte is defined as electrolyte of the electrochemical cell structure that is in contact with the cathode. Furthermore, by virtue of the protected anode architecture, the catholyte is further defined as not being in contact with the active metal anode. Accordingly, the catholyte, as defined here, is part of the environment external to the protected anode compartment. The catholyte may comprise a solid, liquid or gas. Moreover, the catholyte may comprise electrochemically active constituents such as but not limited to aqueous depolarizers, seawater, dissolved oxidants such as oxygen dissolved in aqueous or non-aqueous, reversible reduction/oxidation (redox) couples such as vanadium redox species used in flow cell batteries, and/or particulate redox couples.

The electrochemical cell structures of the present invention comprise protected anode architectures, catholytes and cathode structures. The cathode structure and catholyte are external to the anode compartment of the protected anode architecture. In combination the cathode structure and catholyte may be considered as part of a cathode compartment or a cathode environment whereby electrochemically active cathode constituents undergo reduction and oxidation. The electrochemically active cathode constituents may be part of the catholyte, cathode structure or a combination of both. The electrochemical reduction and oxidation reactions of the electrochemically active constituents take place on or within the cathode structure. Accordingly, the cathode structures, in the context of the present invention, comprise an electronically conductive component, and may additionally comprise an ionically conductive component, and an electrochemically active component.

While the cathode active constituents may in part or in whole be contained within the catholyte, the electrochemical redox reactions take place on or within the cathode structure. Accordingly, in some aspects of the present invention the catholyte is retained, in part, inside the cathode structure. In other embodiments of the invention, the catholyte is retained, in part, inside a catholyte reservoir compartment. The catholyte reservoir compartment may be partially or fully located between the cathode structure and the protected anode architecture. It may also be located, in part, inside a separate reservoir container spatially removed from the region between the cathode structure and the protected anode architecture, such as in the case of a redox flow cell. In such a configuration some of the discharge product could be stored external to the cell for disposal or charge.

Figure 13:
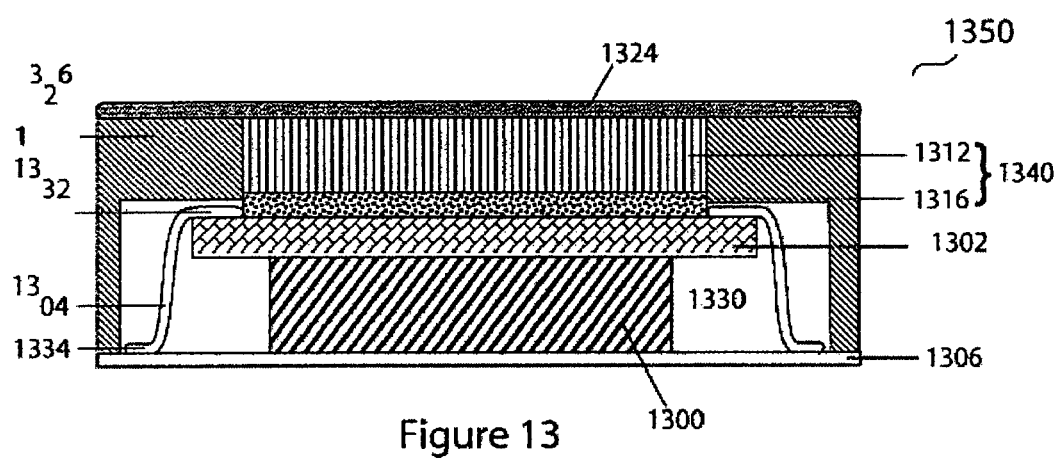
FIG. 13 illustrates a cross sectional depiction of a general electrochemical cell structure in accordance with the present invention.

A cross-sectional depiction of a general electrochemical cell structure 1350 of the present invention is illustrated in FIG. 13. The cell structure comprises a protected anode architecture comprising an active metal anode 1300 having a first and second surface enclosed inside an anode compartment 1330; and a cathode compartment 1340 comprising a cathode structure 1312 and an optional catholyte reservoir 1316 located between the cathode structure and the surface of the anode protective membrane architecture 1302. The cathode structure 1312 comprises an electronic conductor, catholyte and may also comprise electrochemically active material. The catholyte reservoir, optional, comprises catholyte and may include an optional separator material as well, such as a microporous Celgard or a porous cloth. The catholyte may be any suitable electrolyte material including aqueous or non-aqueous and may further comprise electrochemically active species dissolved or suspended in the electrolyte. Adjacent to the first surface of the anode is the protective membrane architecture 1302, and adjacent to the second surface of the anode is the anode backplane 1306. The anode and cathode compartments are enclosed in a battery container comprising a top lid 1324, and container wall 1326, and a bottom base, which in the embodiment illustrated serves as the anode backplane.

The protected anode architectures of the present invention physically and chemically isolate the active metal anode from the cathode environment, effectively creating an anode compartment and a cathode compartment (sometimes also referred to as the cathode environment) that comprises a cathode structure and catholyte. Accordingly, the present invention enables a great degree of flexibility in the choice of electrochemical cell structures, as the components in the anode and cathode compartments can be chosen and optimized independent of each other. For example, the protected anode architectures of the present invention enable active metal battery cells to be used in cathode environments that are otherwise corrosive to the anode.

The effective isolation of the anode and the cathode provides a great deal of flexibility in the choice of catholytes. While the catholytes useful in the present invention may comprise a solid, liquid or gas, they are primarily liquid phase. In many aspects of the present invention the catholytes may comprise electrochemically active redox constituents such as, but not limited to, redox active liquids such as water, seawater, oxyhalides such as $SOCl_2$, dissolved redox species such as transition metal chlorides or bromides, dissolved oxidants such as oxygen dissolved in aqueous or non-aqueous, reversible redox couples such as vanadium redox species used in flow cell batteries, and/or particulate redox couples suspended in a carrier fluid.

Furthermore, since the protected anode is completely decoupled from the catholyte, so that catholyte compatibility with the anode is no longer an issue, solvents and salts which are not kinetically stable to the active metal anode (e.g., Li, Na, $LiC_6$, and the like) can be used. The protected anode architecture enables a wide range of possible catholytes, including ionic liquids, for use in battery cells that incorporate cathode structures comprising intercalation cathodes like $LiFePO_4$, and $LiV_2PO_4$ and other high voltage cathodes. Moreover, the choice of anolyte solvents and salts in contact with the active metal anode or active metal intercalating anode such as a lithiated carbon anode is broadened as the chemical stability of the anolyte with the cathode structure is de-coupled.

In one embodiment of the invention, the catholyte is designed to flush through the cathode compartment/region thereby expelling discharge product and re-supplying oxidant, for example, as would be embodied in a metal/seawater battery cell immersed in the ocean or an electrochemical flow cell structure.

In other embodiments the invention relates to electrochemical cell structures having aqueous cathode environments such as those of metal/air cells, metal/seawater cells, metal/hydride cells, such as are described in commonly assigned co-pending published US applications US 2004/0197641 and US 2005/0175894.

The cathode structure of a battery cell comprising protected anode architectures in accordance with the present invention may have any desired composition and, due to the isolation provided by the protected anode architecture, is not limited by the active metal anode or anolyte composition. In particular, the cathode structure may incorporate components which would otherwise be highly reactive with the anode active metal.

The protected anodes described herein enable the efficient operation of active metal (e.g., Li, Na) batteries and other electrochemical cells that are open to their environment such as metal/air and metal/water batteries having aqueous constituents in their cathode compartments, such as Li/seawater cells and Li/air cells. Generally, such cells have a cathode compartment comprising a catholyte and a cathode structure which further comprises an electronically conductive component, an ionically conductive component, and an electrochemically active component, with at least one of these cathode structure components having an aqueous composition or constituent. These cells have greatly enhanced performance characteristics relative to conventional cells. As described further below, the cells have a broad array of potential implementations and applications. While these cell types operate according to different electrochemical reactions and have electrochemically active components in their cathodes drawn from different states (primarily liquid, gas and solid states, respectively), each of these cell types includes the common feature of an aqueous constituent for Li ion transport on the cathode side of the cell. The decoupling of the anode and cathode by the protective membrane allows for the fabrication of this powerful new type of battery or other electrochemical cell.

Metal/Air Cells

The protected anode architectures and associated arrays of the instant invention have particular utility in metal air batteries such as Li-air (or Na-air). These cells have an active metal, e.g., alkali metal e.g., lithium, anode that is encapsulated by the protective membrane architecture in contiguity with the compliant seal structure and anode backplane and a cathode with air as the electrochemically active component. While not so limited, the electrochemical reaction between the Li ions from the anode and the air is believed to be described by one or more of the following reaction schemes:

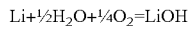
$Li + \frac{1}{2}H_2O + \frac{1}{4}O_2 = LiOH$

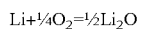
$Li + \frac{1}{4}O_2 = \frac{1}{2}Li_2O$

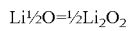
$Li \frac{1}{2}O = \frac{1}{2}Li_2O_2$

Thus both moisture ($H_2O$) and oxygen in the air are participants in the electrochemical reaction.

Alkali metals such as Li corrode in aqueous solutions. Accordingly, any part of the active metal anode (e.g., Li or Na) that is not covered by the protective membrane architecture must be sealed off from the air cathode environment. The protected anodes of the present invention provide such an enclosure in the form of an hermetically sealed anode compartment that encapsulates the active metal anode by a continuity of the solid electrolyte and the substantially impervious compliant seal structure and anode backplane. Moreover, the flexibility of the compliant seal structure provides a mechanism to minimize the volume of the anode compartment during charging and discharging while concomitantly allowing for optimization of the volume of the entire battery cell. For example, during discharge of a Li/air cell the anode thickness decreases as Li leaves the anode compartment, while the cathode/aqueous electrolyte volume tends to increase as a result of the formation of lithium hydroxide. Accordingly, during discharge as the anode compartment shrinks, the associated volume in the remainder of the cell, cathode compartment, gets larger and is able to incorporate the discharge product as it is formed. If not for the compliant seal structure not only would there be lost space in the anode compartment during discharge, the cathode compartment would need to be designed to accommodate the entirety of the cathode volume expansion. The compliant seal structure thereby minimizes the volume (weight) of the entire electrochemical cell structure. The extra space needed for the LiOH would have to be entirely compensated for by extra volume of the cathode compartment prior to cell operation, if not for the compliancy of the seal structures of this invention.

Figure 9A:
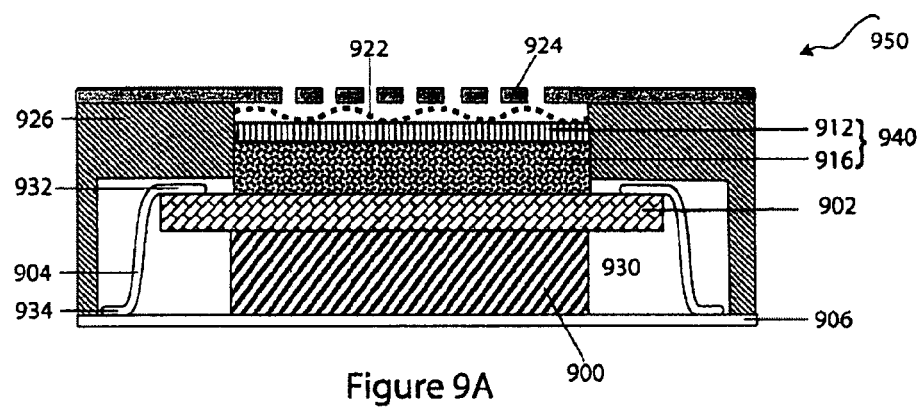
FIGS. 9A-B show an active metal/air battery cell incorporating a protected anode architecture in accordance with an embodiment of the present invention.

An example of a metal/air battery comprising a protected anode in accordance with the instant invention is a Li/air battery cell. Referring to FIG. 9A, there is illustrated a cross sectional depiction of a specific implementation of such a lithium/air 950 cell in accordance with the present invention. The battery cell 950 comprises a cell container comprising a top lid 924 having ambient air access holes, a bottom base 906 (which is the anode backplane in this embodiment) and a container wall 926. The metal air battery cell 950 further comprises a protective anode architecture. The protective anode architecture comprising a protective membrane architecture 902, an anode backplane 906, and a compliant seal structure 904. When joined and sealed, the protective membrane architecture 902, anode backplane 906, and compliant seal structure 904 effectively form a hermetic anode compartment, 930, that encloses the active metal anode 900. In this embodiment the anode backplane 906 is a substantially impervious, electronically conductive material that provides structural support in the form of the bottom base of the cell container, it also provides current collection and terminal connection for the protected anode architecture.

In the case of the instant embodiment, the compliant seal structure 904 is molded into a preformed frame having a first 932 and second step 934. The inner surface of the first step 932 is bonded to the protected anode architecture 902. The inner surface of the second step 934 is bonded to the anode backplane 906. While the inner surface of the compliant seal structure is exposed to the environment inside the anode compartment 930, the outer surface of the compliant seal structure is exposed to the environment of the cathode compartment 940, which further comprises a cathode structure 912 and a catholyte reservoir 916 comprising catholyte.

A preferred compliant seal structure of the instant embodiment is a multi-layer laminate comprising a plurality of layers. A top polymeric layer, that forms the outer surface of the laminate and is chemically resistant to the environment of the cathode compartment (e.g., PET, PTFE, etc); at least one of a middle barrier layer comprising a metal foil such as an aluminum foil, and a bottom polymeric layer that forms the inner surface of the laminate and is chemically resistant to the elements of the anode compartment, including in some aspects a liquid or gel anolyte, and is also heat-sealable (e.g., PE, PP, ionomers and ionomer resins commonly referred to as Surlyn,). In this embodiment, the compliant seal structure is bonded by thermal compression to the protective anode architecture and anode backplane.

The anode backplane 906 provides the bottom base for the battery cell container. In this embodiment the bottom base of the battery container can be an electronically conductive material, such as a stainless steel alloy or nickel, suitably thick to provide a substantially impervious barrier (e.g., about 200 microns), current collection and a terminal connection.

The battery cell also includes a cathode compartment 940 comprising a cathode structure 912 and a catholyte reservoir 916. The cathode structure 912 (sometimes referred to as an air electrode) comprises an electronically conductive component, an aqueous or ionomeric ionically conductive component, and air as an electrochemically active component. The air electrochemically active component of these cells includes moisture to provide water for the electrochemical reaction. Since metal/air batteries obtain the cathode active reactant from the ambient environment, the volumetric and gravimetric energy densities are very high. The high energy density of metal/air batteries makes them attractive for a wide variety of applications where weight and size are a premium.

The cathode structure 912 includes an electronically conductive component (for example, a porous electronic conductor, an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, N.Y., Third Edition) and are usually composed of several layers including an air diffusion membrane, a hydrophobic PTFE (e.g., Teflon®) layer, a catalyst layer, and a metal electronically conductive component/current collector, such as a Ni screen. The catalyst layer also includes an ionically conductive component/electrolyte that may be aqueous and/or ionomeric. A typical aqueous electrolyte is composed of KOH dissolved in water. An typical ionomeric electrolyte is composed of a hydrated (water) Li ion conductive polymer such as a perfluoro-sulfonic acid polymer film (e.g., du Pont NAFION). The air diffusion membrane adjusts the air (oxygen) flow. The hydrophobic layer prevents penetration of the cell's electrolyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal anode, the chemical composition of the air electrode is not constrained by potential reactivity with the anode active material. This can allow for the design of higher performance air electrodes using materials that would normally attack unprotected metal electrodes.

The catholyte reservoir 916, contains aqueous catholyte and in the instant embodiment is located between the cathode structure 912 and the protective membrane architecture 902. The catholyte reservoir may include a porous support material such as a zirconia cloth from Zircar Products, Inc. filled with catholyte solution. The catholyte may be formulated with neutral (LiCl) basic (KOH) or acidic ($NH_4Cl$, HCl, etc) solutions. For example, a 0.5M $NH_4Cl$+0.5M LiCl. The catholyte reservoir may further comprise an optional separator material (not shown) may be provided between the catholyte reservoir and the protective membrane architecture such as a polyolefin such as polyethylene or polypropylene, for example a CELGARD separator.

The Li/air cells of the present invention may be either primary or secondary cells.

The battery enclosure includes a top lid 924 having air access holes for the inlet of ambient air and moisture into the cathode compartment. Optionally, a spring 922 may be incorporated between the top lid of the battery container and the cathode compartment to maintain contact of internal components during discharge and charge. The battery container wall 926 surrounds the battery cell and is joined on one of its open faces to the bottom base of the container and on its opposing open face to the top lid 924. In the instance whereby the bottom base is a terminal connector for the anode and the top lid is in electronic continuity with the cathode, the surrounding wall should be an electronic insulator so as not to short circuit the battery. Alternatively, any other suitable material or technique to avoid electronic contact between the top lid and the bottom base can be used, and such materials and techniques are well known to those skilled in the art, such as providing an insulating gasket between either the container wall and the top lid or the container wall and the bottom lid, or both.

It is an aspect of the present invention that the compliant seal structures allow for minimization of wasted volume in the battery. An internal seal in an electrochemical cell structure can adversely affect the energy density of a battery cell in that as the battery is discharged, the active metal anode thickness decreases leaving an internal void in the battery at the same time products formed in the positive electrode lead to a volume expansion; so the battery design, including the size of the battery cell container, needs to include extra space in the positive electrode compartment to accommodate that expansion. In one embodiment, it is a feature of the present invention that during charge and discharge, as the active metal anode expands and shrinks, the compliant seal structure deforms in such a manner as to alter the thickness of the anode compartment. This allows the protective membrane architecture and anode backplane to maintain physical continuity with the surface of the active metal anode and mitigates the formation of voids in the anode compartment. Furthermore, because the void volume is taken up by the anode compartment as it shrinks during discharge, the extra space subsequently formed in the remainder of the battery cell can be used to accommodate the expansion of the cathode structure. This results in a compact battery cell design. Thus, according to this aspect of the instant invention, the compliant seal structure is used to minimize volume in the battery container, thereby maximizing the energy density of the battery.

Figure 9B:
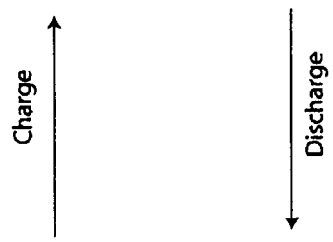
Figure 9B:
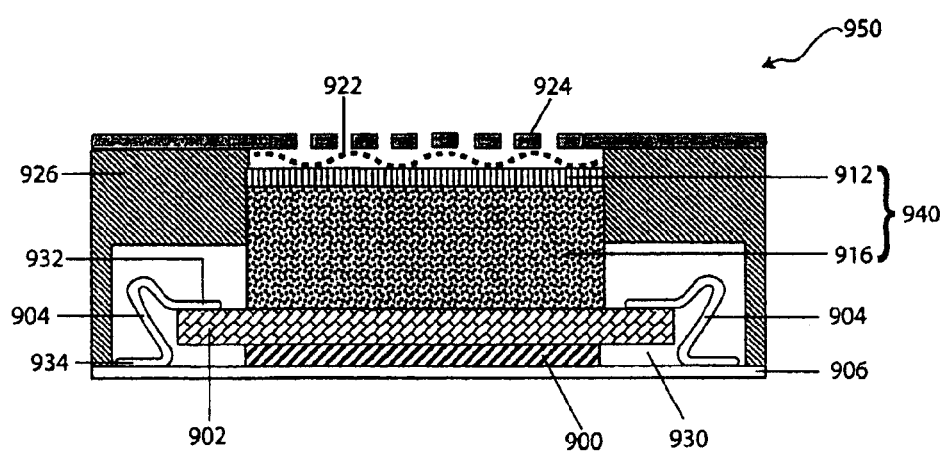

As illustrated in FIGS. 9A and 9B, during discharge of a Li/air galvanic cell, the Li anode 900 supplies a source of lithium ions to the reaction physically manifested by the disappearance of the lithium metal foil, concomitant with the production of lithium hydroxide. In the Li/air cell 950, the product LiOH is stored in the cathode compartment 940, leading to an expansion of volume with proceeding cell discharge. As the discharge progresses the presence of the compliant seal structure 904 allows the expansion of the cathode compartment 940 volume to be compensated by the decrease in volume of the anode compartment.

FIGS. 9A and 9B qualitatively illustrate the volumetric changes that take place in the Li/air cell 950 during operation (discharge and charge). FIG. 9A shows the cell 950 in the fully charged state and FIG. 9B shows the cell 950 in a state of intermediate discharge. As the Li metal thickness shrinks during discharge the compliant seal structure 904 deforms in such a manner as to provide the protective membrane architecture 902 a range of motion for it to follow the first surface of the Li metal foil 900. Furthermore, in certain embodiments, the anode backplane 906, which forms the bottom base of the battery cell container, is prevented from moving because it is anchored to the battery container. By this expedient, as the anode thickness shrinks or expands, respectively during discharge or charge, it is the protective membrane architecture that under an external force moves/translates as it follows the first surface of the anode, while the backplane, being fixed to the container, is substantially immobilized. In certain embodiments, the force exerted on the membrane architecture is brought about by a volume expansion of the cathode compartment which can be effected by the formation of discharge product (e.g., lithium hydroxide) in the catholyte and/or by absorption of water from the air, and/or brought about or augmented by a spring 922 or some other cell component or phenomena. Ergo, in this embodiment, it is the traversal of the protective membrane architecture, as it moves along with the anode's first surface, which leads to the concomitant decrease in the height/thickness of the anode compartment.

The compliant seal structure 904 of the present invention provides a large range of motion as Li/air batteries are generally high capacity cells that incorporate a relatively thick active metal anode. The range of motion corresponds to about 100% of the battery rated depth of discharge. Typically the Li metal foil anodes are at least 10 microns, more preferably at least 50 microns, even more preferred is greater than 100 microns. In some aspects of the present invention the range of motion is greater than 250 microns, greater than 500 microns, greater than 1 centimeter, or even as much as 10 cm, or more.

Figure 10:
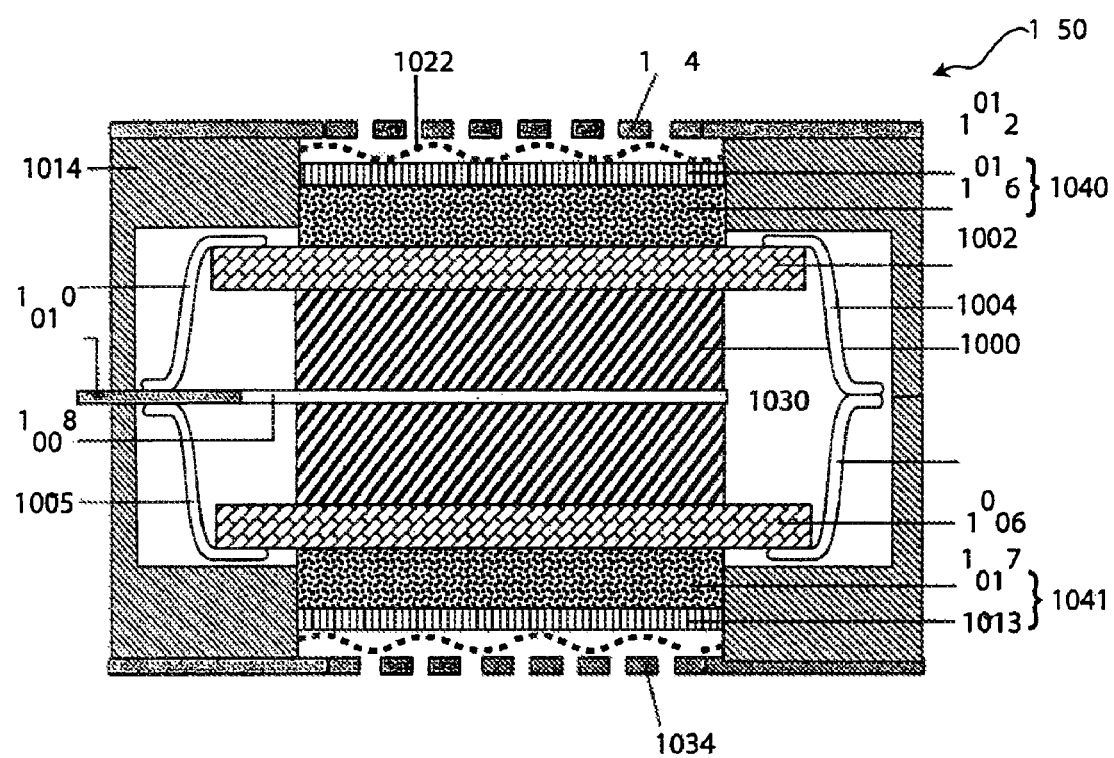
FIG. 10 shows a double-sided active metal/air battery cell incorporating a protected anode architecture in accordance with an embodiment of the present invention.

In another embodiment of the present invention, the metal/air battery cell is double sided in the sense that it is able to capture ambient air and moisture from both planar surfaces. Compared to a single sided cell, the apparent active area is doubled. Referring to FIG. 10, a double-sided metal air battery cell 1050 is illustrated in a cross-sectional depiction comprising a protected anode architecture, a cathode compartment and a battery casing. The protected anode architecture comprises an active metal anode 1000 with a first and second surface. The first surface is adjacent to the protective membrane architecture 1002. The second surface of the active metal anode is adjacent to the anode backplane 1006, which in this embodiment is a second protective membrane architecture. A terminal connector 1010 joined to a current collector 1008 that is embedded within the active metal anode, providing both current collection and an electronic terminal. In one aspect the current collector 1008 and terminal connector may comprise nickel metal, about 50 micron thick and are joined by resistance welding.

Each of the ion membrane architectures 1002 and 1006 of the instant embodiment are bonded to separate compliant seal structure components 1004 and 1005. In the instant embodiment, the compliant seal structure is referred to herein as being configurationally symmetric in that there are two mirror planes that run through the middle of the anode layer: one that is perpendicular and the other that is parallel with the first and second surfaces of the anode; these mirror planes are referred to herein more simply as the perpendicular mirror plane and the parallel mirror plane. The compliant seal structure components are molded into preformed frames with top and bottom steps. As described above the first step of each compliant seal structure component (1004/1005) is bonded to its respective protective membrane architecture (1002/1006). The second step of each compliant seal structure component 1004 and 1005 are bonded to each other to form the hermetic enclosure that is the anode compartment of the double-sided protected anode architecture. In one embodiment the compliant seal structures comprise a low melting temperature thermoplastic (e.g., PE, PP, Surlyn, etc.) and are bonded to their protective architectures and to each other by a heat seal.

Adjacent to the outer surface of the first protective membrane architecture 1002 and the second protective membrane architecture 1006 are cathode compartments 1040 and 1041 that respectively comprise a catholyte reservoir 1016 and 1017 and a cathode structure 1012 and 1013. The cathode structures 1016, 1017 and catholyte reservoirs 1012, 1013 are similar to those described in the above embodiment.

The battery cell container comprises a top lid 1024, a bottom base 1034 and a container wall 1014. Both the top lid 1024 and the bottom base 1034 contain air access holes to provide ambient air and moisture to enter into the top and bottom cathode compartments. The container wall is typically an electronic insulator. The top and bottom lids may provide terminal electronic connections for their respective cathode structures. Accordingly, the top and bottom lids may be comprise a suitable metal, such as a stainless steel alloy or nickel. Optionally, a spring 1022 is located between the top lid 1024 and the cathode structure 1012 as well as between the bottom base 1034 and its adjacent cathode structure 1013.

The current collector 1008 for the active metal anode 1000 is joined to a terminal connector 1010. The terminal may be attached to the current collector or the active metal material of the anode by any of a number of well-known methods such as but not limited to soldering, physical pressure, ultrasonic welding, and resistance welding. The current collector may bisect the active metal material, as shown, or alternatively, may contact it or partially penetrate it depending upon the design choice of the manufacturer.

The terminal tab extends to the outside of the anode compartment and in one aspect of the invention it exits the anode compartment at the junction where the first and second compliant seal structures 1004/1005 are bonded together. In the instance whereby the compliant seal structures 1004 and 1005 are a multi-layer laminate comprising a heat-sealable thermoplastic, the terminal tab 1010 is encapsulated by thermal compression.

In this embodiment, the terminal tab exits the anode compartment, but must be electronically insulated around its surface to avoid internally short circuiting the battery cell via contact with catholyte. Accordingly the terminal tab is wrapped or embedded inside an insulating, chemically resistant material such as PP, PE or PTFE over the length of the terminal tab that remains inside the battery cell container.

In accordance with the instant invention, the compliant seal structure, which comprises compliant seal structure components 1004 and 1005), adapts its shape during discharge in order to allow both the first and second membrane architectures to move toward each other during discharge, and to move away from each other during a subsequent charge. In this embodiment, the compliant seal structure is configurationally symmetric and affords both membranes substantially the same translational range of motion, albeit in opposite directions.

Figure 14:
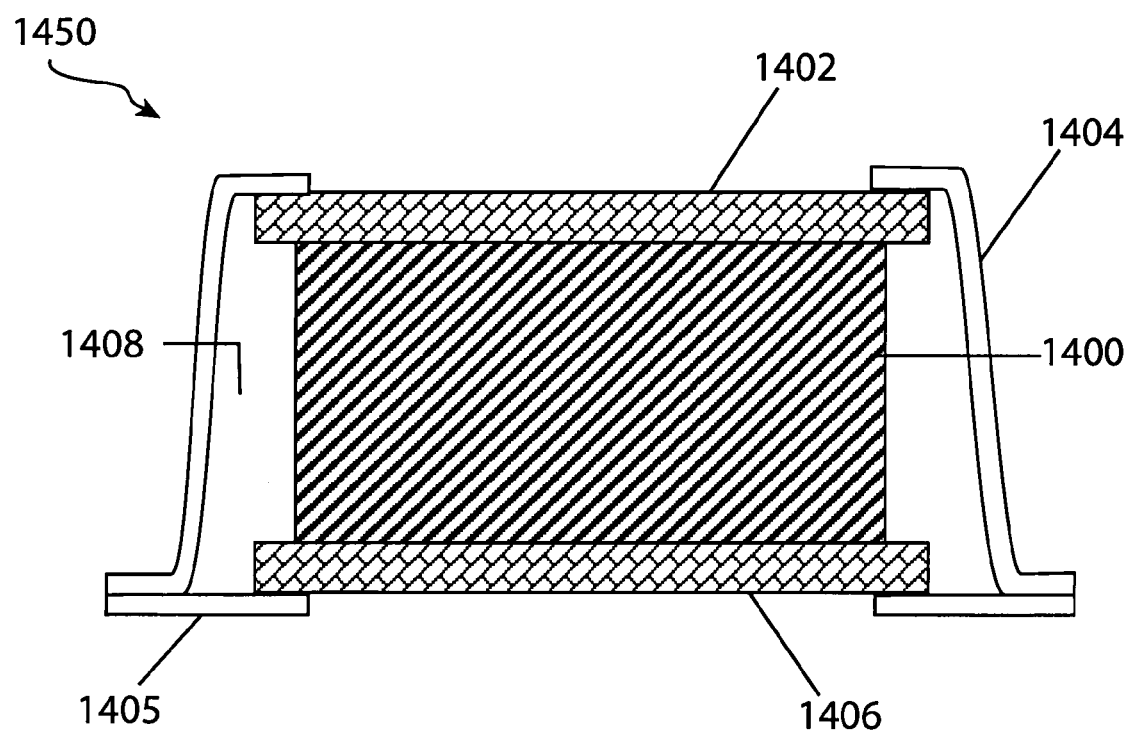
FIG. 14 depicts an embodiment of a double-sided, asymmetric, protected anode architecture in accordance with the present invention.

Alternatively, protected anode architectures in accordance with the instant invention can have asymmetric compliant seal structures. The asymmetry can arise from the configuration of the structure or its geometry (e.g., thickness); asymmetry can also be imparted to the structure by a materials variation. The embodiment illustrated in FIG. 14 is that of a double-sided protected anode architecture 1450 having an asymmetric seal structure that comprises a first seal structure component 1404 having a double step configuration and a second structure component 1405 having a flat configuration. The first component 1404 is bonded to the first protective membrane architecture 1402, and the second component 1405 is bonded to the anode backplane 1406, which in this embodiment is the second protective membrane architecture. The anode 1400 is encapsulated on its first surface by the first protective membrane 1402 and on its second surface by the second protective membrane 1406. The two component structures (1405 and 1405) are bonded together, thus forming the compliant seal structure. The seal structure, while having a perpendicular mirror plane is configurationally asymmetric in that it does not have a horizontal mirror plane through the middle of the anode. The asymmetry alters the manner in which the compliant seal structure deforms or adapts its shape in response to anode thickness changes during discharge or charge. By this expedient, the range of motion of one or the other of the anode backplane or the protective membrane architecture can be adjusted. For instance, in the instant embodiment, the deformation of the compliant seal structure during discharge favors translation of the first protective membrane architecture over that of the second. So the thickness decrease of the anode compartment is effected more so by the translation of the first rather than that of the second protective membrane architecture.

Figure 11:
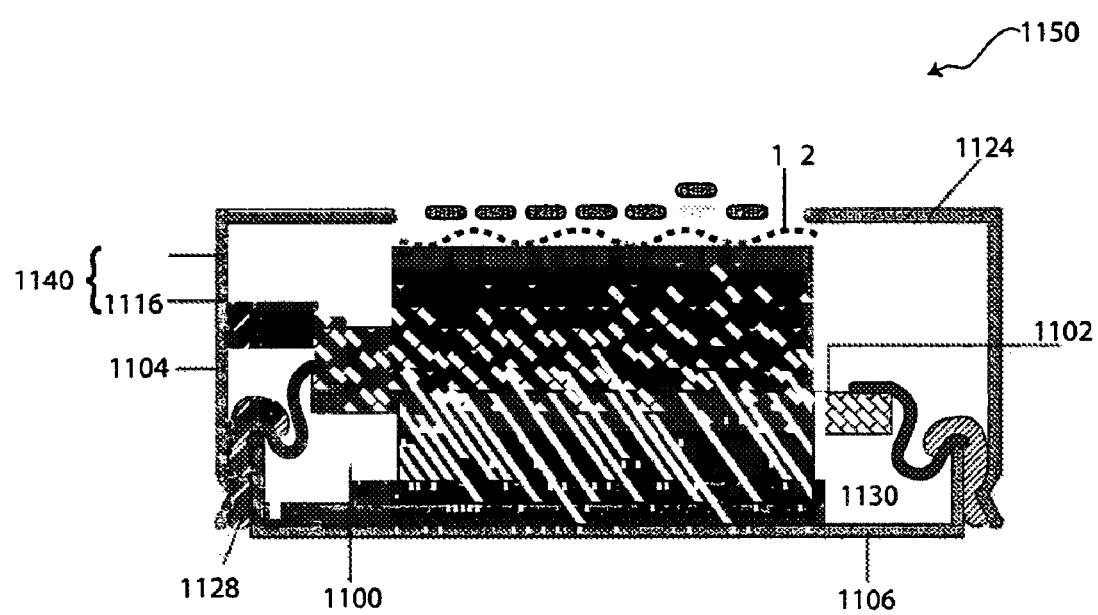
FIG. 11 shows another metal/air battery cell design incorporating a protected anode architecture in accordance with an embodiment of the present invention.

In an alternative embodiment, illustrated in FIG. 11, the battery container has a button cell format. The metal/air button cell 1150 has a top lid 1124 and a bottom base 1126. The top lid contains air access holes and is joined to the bottom base by a fixed seal insulator 1128. The protected anode architecture includes an active metal anode 1100 e.g., lithium, having a first and second surface. The second surface of the Li is adjacent to the anode backplane 1106, which in this embodiment is the bottom base of the button cell container. In this embodiment, the anode backplane is affixed to the cell container (a positionally fixed rigid member), and as such is prevented from moving as the anode thickness changes during cell operation. By this expedient, the change in the anode compartment thickness, as a result of cell discharge is brought about entirely by the translation of the protective membrane architecture—it moving along with the first surface of the anode. Encapsulating the first surface of the Li is a protective membrane architecture 1102. The compliant seal structure comprises a flexible frame material formed to have a first and second step. The protective membrane architecture is bonded to the first step of the compliant seal structure. Different than that described in previous embodiments, the second step of the compliant seal structure is bonded to a fixed seal joint that is capable of forming an hermetic compression seal between the top lid and bottom base of the container. Fixed seal insulators are known in the art, particularly suitable fixed seal insulators are fluoro-elastomeric co-polymers such as those developed under the trade name of Viton. Accordingly, the anode compartment is sealed off from the cathode compartment 1140 of the cell by the crimp/compression seal of the fixed seal joint. The cathode compartment 1140 comprises a cathode structure 1112 and a catholyte reservoir as described above. Similar to the above embodiments there is an optional spring 1122.

The protected anode architectures of the instant invention are useful for almost any battery cell system that contains catholyte or cathode structures that are unstable against an active metal anode. This includes aqueous catholytes as well as non-aqueous catholytes such as those useful for improved performance of ion intercalating battery chemistries, such as those comprising cathode structures comprising transition metal oxides and transition metal phosphates.

In another embodiment of battery systems in accordance with the present invention, electrochemical cell structures comprise catholyte that may be flushed through the cathode compartment/region. For example, in a redox flow cell, the catholyte comprises active metal species that may be flowed to the cathode structure in order to undergo reduction, and subsequent to reduction flushed out of the cathode compartment/region to a separate reservoir for disposal or oxidation back to its original charged state. Alternatively, the reduced species may be flowed back through the cathode compartment/region for oxidation of the electrochemically active species in the catholyte and as means to charge the active metal anode.

In another embodiment, seawater is the catholyte. The compliant seal structures of the instant invention yield significant benefit for metal/seawater batteries including Li/seawater (or sodium/seawater). Such batteries have exceptionally high energy density (Wh/l) and specific energy (Wh/kg) since seawater serves as both the aqueous electrolyte and oxidant, and does not have to be carried in the battery pack. In addition to providing hermetic protection, the use of the compliant seal structures to enclose the protected anode compartment allows the hydrostatic pressure of the ocean to compress the anode as discharge of the negative electrode proceeds, facilitating uniform pressure of the solid electrolyte plate against the active metal of the anode which is important to achieve full utilization of the active metal.

Figure 12A:
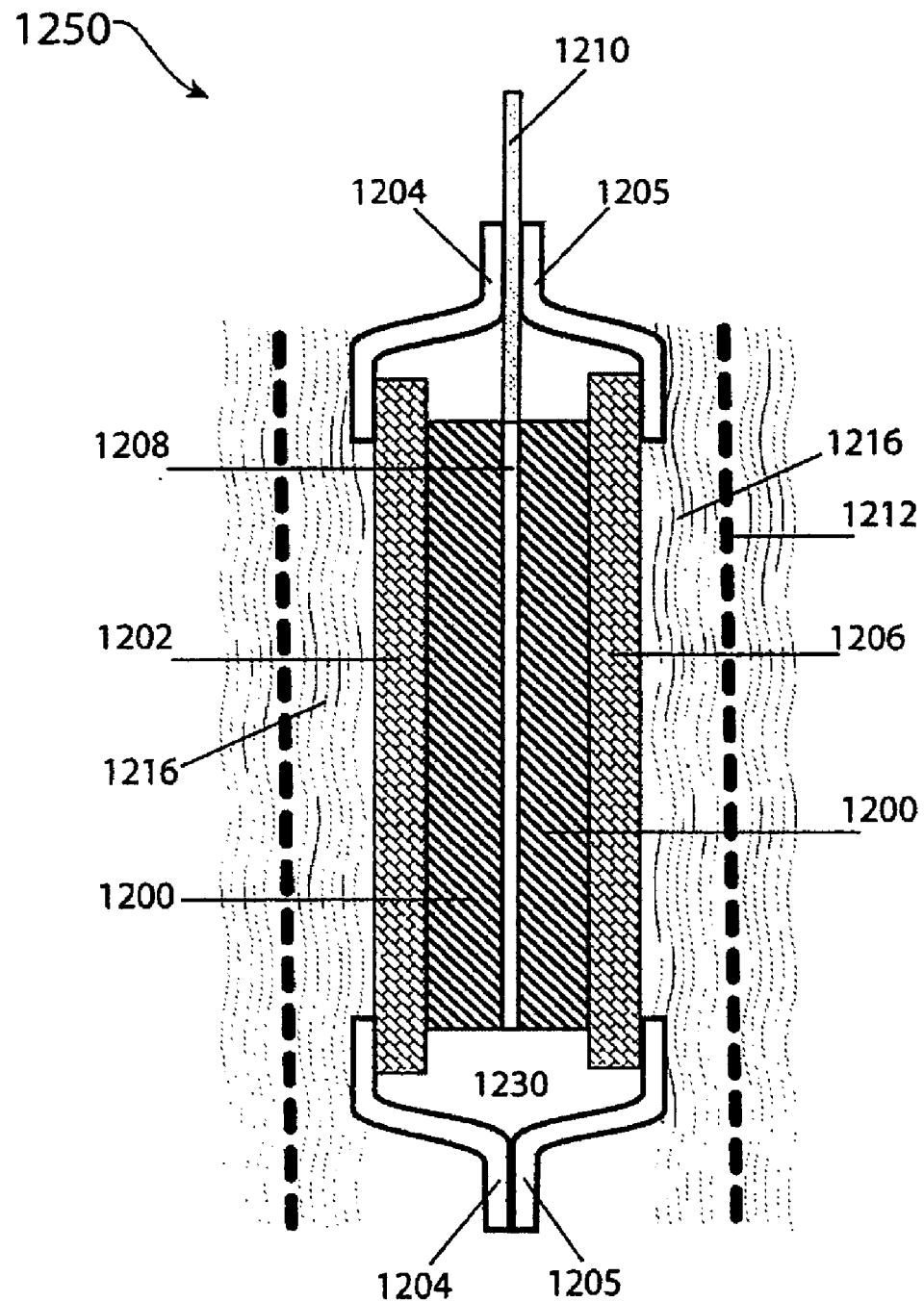
FIGS. 12A-B depict embodiments of metal/seawater cells with protected anode architectures in accordance with the present invention.
Figure 12B:
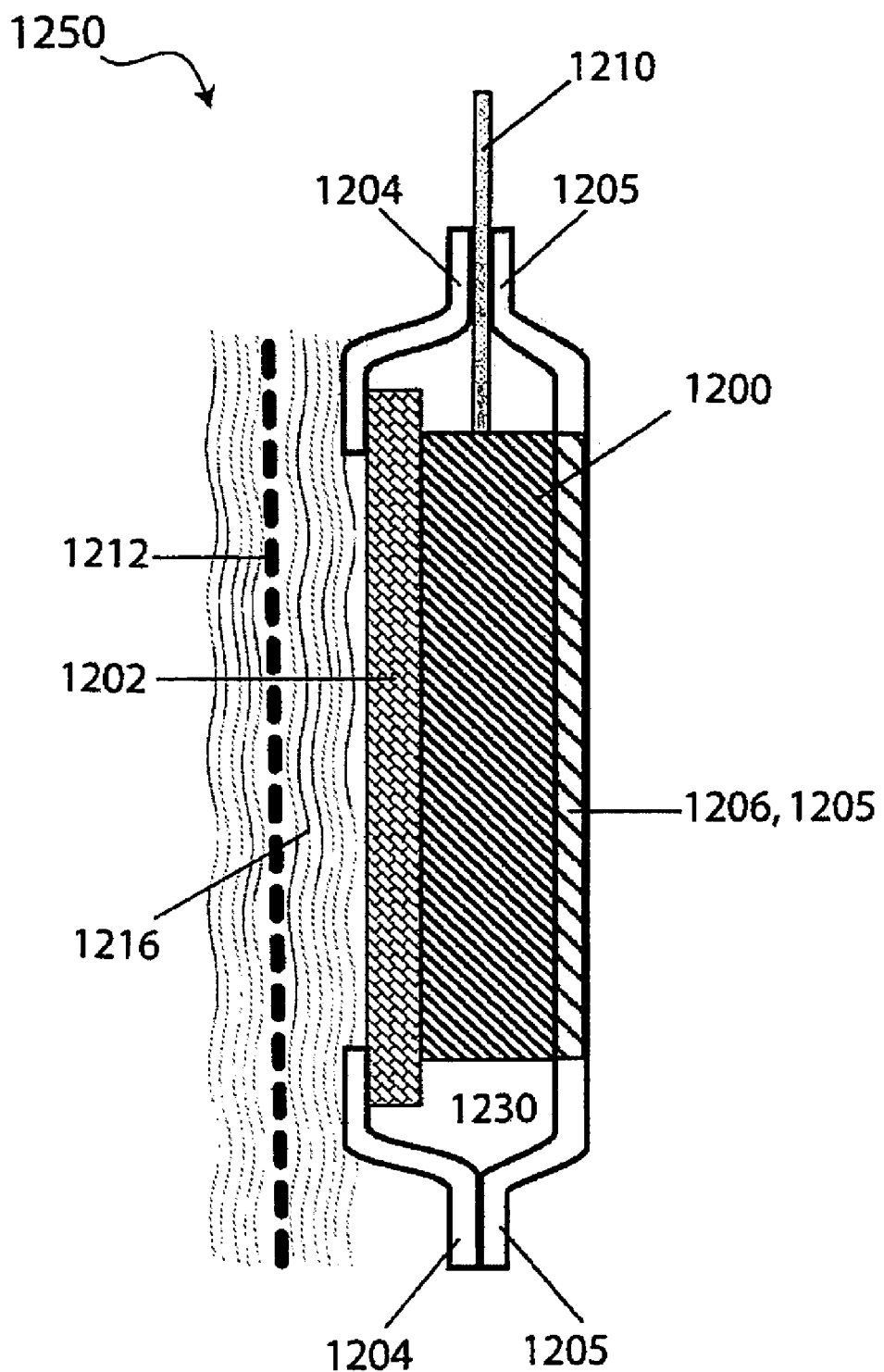

Embodiments of metal seawater cells 1250 with a protected anode of the present invention is illustrated in FIGS. 12A and 12B. In FIG. 12A the protected anode architecture is double sided. In FIG. 12B the protected anode architecture is single sided.

Referring to FIG. 12A, the protected anode is fully described in the description of the embodiment illustrated in FIG. 4 for a double-sided protected anode. Briefly the protected anode architecture comprises an active metal anode 1200, having a current collector 1208 embedded inside and a terminal connector 1210 joined to the current collector. The active metal anode 1200 has a first and second surface. Each surface is adjacent to a protective membrane architecture 1202 and 1206 (anode backplane) The compliant seal structure components 1204 and 1205 are bonded to their respective protective membrane architectures 1202 and 1206 and to each other to form the anode compartment 1230. In the seawater battery cell, adjacent to each surface of the protective membrane architecture is a cathode structure 1212 that provides electrochemical reduction of the electrochemically active oxidants in the seawater. The seawater catholyte 1216 exists in the region of the cathode compartment between the cathode structure 1212 and the protective membrane architecture 1202 and 1212. Typically, seawater contains dissolved oxygen, in which case the cell potential will be a mixed potential due to the lithium/water and lithium/oxygen reactions. The battery cells incorporating the protected anode architectures of the present invention are designed such that the reduction products, such as active metal hydroxides, do not remain in the cathode compartment/region. The cathode structures of the instant embodiment comprise an electronically conductive support structure that is generally porous to allow fluid to flow through. The cathode comprises a suitable electronically conductive material that does not corrode in seawater, such as a titanium screen or mesh that allows for seawater to flow through its structure.

The suitability of seawater as an electrolyte enables a battery cell for marine applications with very high energy density. Prior to use, the cell structure is composed of the protected anode and the porous electronically conductive support structure (electronically conductive component), such as a titanium screen. When needed, the cell is completed by immersing it in seawater which provides the electrochemically active and ionically conductive components. Since the latter components are provided by the seawater in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

In active metal/Seawater batteries of the instant invention, such as Li/Seawater or Na/Seawater, it is generally hydrostatic pressure that supplies the external force against the protective membrane architecture and anode backplane which causes either or both to move along with the anode surface which they respectively encapsulate. Protected anode architectures such as those previously described herein for Li/Air battery embodiments can generally be usefully employed in a Li/Seawater battery. This includes single and double sided protected anode architectures, having symmetrical or asymmetrical compliant seal structures.

In various embodiments, the Li/Seawater batteries of the instant invention have utility for use in the ocean/sea, and in certain applications at considerable depths. The hydrostatic pressure of the ocean increases at a rate of 1 atmosphere per every 10 meters, so at a depth of 3000 meters the pressure is about 4200 psi. In another aspect of this invention, in order to survive the hydrostatic pressure of the ocean, particularly at depth, it is preferable that the anode compartment should be filled with an anolyte (incompressible fluid; this minimizes or eliminates void space in the anode compartment. Suitable anolytes useful for filling the anode compartment include those described above for use as anolyte in protective membrane architectures.

Another protected anode architecture embodiment that is particularly suitable for high capacity (Ah) Li/Seawater battery cells is illustrated in FIG. 15A-C.

Referring to FIG. 15A, the Li/Seawater battery cell 1550 is shown in its fully charged state. The cell 1550 comprises a protected anode architecture 1520 and a cathode structure 1512 which provides electrochemical reduction of seawater oxidants. Cathode structures usefully employed in a Li/Seawater battery have already been described above. The protected anode architecture 1520 comprises a lithium metal anode 1500 having a first surface and an opposing second surface (e.g., a rod of lithium). Referring back to FIG. 15A, the first surface of the anode is encapsulated by a protective membrane architecture 1502.

In accordance with this embodiment the compliant seal structure 1504 is joined to the protective membrane architecture 1502 via a rigid member 1505. The rigid member 1505 forms a portion of the anode compartment enclosure, and it is joined to an edge or outer peripheral surface of the protective membrane 1502, for instance by using a discrete sealant such as an epoxy. In certain embodiments, the rigid member is positionally fixed and prevents translation of the protective membrane architecture during discharge. The rigid member can be, for instance, in the form of an annulus (e.g., square or circular), hollow tube or cylinder; the wall thickness of which should be large enough to provide the necessary mechanical strength so that during discharge the member remains rigid. The rigid member should also be substantially chemically resistant in contact with seawater. Suitable materials for the rigid member include metals such as stainless steel, aluminum and the like or even plastics such as plexiglass or high-density polyethylene. Moreover, a chemically resistant coating can be applied to the outer surface of the rigid member to enhance its chemical stability in contact with seawater.

The compliant seal structure 1504 is joined to the rigid member 1505 (e.g., by a discrete sealant such as an epoxy). The compliant seal structure can be molded or fabricated into a pre-formed shape, for instance into a flexible cylindrical vessel or tube having an open and a closed end. Moreover, in accordance with the instant embodiment, the seal structure is pre-formed to contain a fold 1522 that can be formed for instance by folding the seal material onto itself. The closed end of the compliant seal structure encapsulates the second surface of the anode, and thus constitutes the anode backplane 1506 or a component thereof. Accordingly, the compliant seal structure 1504 and the anode backplane 1506 are formed by a single contiguous piece of material such as a polymer or laminate. The fold 1522 is configured such that its vertex is directed away from the anode backplane 1506, substantially in a direction opposite the anode. The fold 1522 can serve to influence the manner in which the complaint seal structure 1504 deforms in response to the translation of the anode backplane 1506 during discharge.

Suitable materials for the compliant-seal-structure/anode-backplane component include polymers or laminates as described above for compliant seal structures, including ethylene propylene diene monomer rubber (EPDM). The compliant seal 1504 may further comprise a barrier material layer, such as a metal layer, to improve its impermeability to constituents of seawater. In accordance with the instant embodiment, the anode backplane 1506 may further comprise an optional anode backplane support component, not shown, such as a copper sheet that can function as both a current collector and as a mechanical support for the anode. For providing electronic current through the anode compartment, a terminal connector, also not shown, can be attached to the current collector or directly to the lithium, the connector exiting the anode compartment, for instance, through a sealed port in the anode backplane 1506.

In accordance with the instant embodiment illustrated in FIG. 15A, and as described above, depending on depth, the hydrostatic pressure in the ocean can be large, so in order to survive high pressures, the anode compartment can be filled with an incompressible fluid, such as a liquid (e.g., liquid anolyte or a non-aqueous solvent). In the instance where the protective membrane architecture has a liquid anolyte interlayer, it is preferable that the incompressible fluid used to fill the anode compartment has nominally the same composition as the interlayer anolyte, because the two liquids might eventually mix with each other, perhaps in fabrication or at some point during device operation. In certain embodiments, particularly when the protected anode architecture 1520 is deployed at some considerable ocean depth, any open spaces in the anode compartment (as shown at 1510) are filled with an incompressible fluid, such as a liquid anolyte. Moreover, the incompressible fluid (e.g., anolyte or a non-aqueous solvent) can be usefully employed as a liquid layer situated between the anode 1500 and the compliant seal structure 1504 in order to facilitate the ease with which the compliant seal structure 1504 deforms as the anode backplane 1506 follows the second surface of the anode 1500 during discharge.

In FIGS. 15B and C the protected anode architecture 1520 is shown at various stages of discharge in a partially discharged state. In certain embodiments, the rigid member 1505 is positionally fixed, so only the backplane 1506 is able to translate under the influence of hydrostatic pressure. As the anode backplane 1506 moves along with the second surface of the anode during discharge, the compliant seal structure 1504 continues to fold onto itself. In this way, the compliant seal structure does not crinkle and bunch up in front of the backplane where it (the crinkles) can potentially impede backplane translation. By this expedient, the protected anode architecture 1520 is able to provide a significant range of motion for the anode backplane 1506 to move/translate along with the anode's second surface. In some aspects of the invention this range of motion can be greater than 1 cm, preferably greater than 10 cm, and more preferably greater than 50 cm, and even more preferably greater than 100 cm.

Referring back to FIG. 15A, optionally, the protected anode architecture 1520 may be held in a retaining case 1530 that is open to the seawater. The retaining case can be joined to the rigid member, and the case is generally adjacent to and surrounds most of or a portion of the lateral surface of the anode compartment, and as shown in FIG. 15A, it is also adjacent to the anode backplane. However, the retaining case should not impede the electrochemistry which takes place between the surface of the protective membrane 1502 and the cathode 1512. In the instant embodiment illustrated, the retaining case is joined to the rigid member, for instance by an epoxy seal or a weld. In certain embodiments, the casing 1530 and the rigid member 1505 may be formed from a single contiguous piece of material. The retaining case 1530 is open to the seawater environment at least through an inlet port 1508. Placing the protected anode architecture within such a retaining case 1530 provides both mechanical support and some physical protection against damage that might be incurred during device deployment and/or operation in a dynamic seawater environment. The case 1530 also provides a mechanism to minimize damage that might ensue if the anode compartment is ever breached. Because the casing 1530 is only open to seawater via the inlet port 1508, the flow of seawater into the casing is hindered, so if a seal breach takes place there is only a limited amount of seawater that is immediately available to react with that lithium which might be exposed by a breech. By this expedient the adverse reaction between the seawater and exposed lithium will be slowed down and possibly even mitigated in a short time.

This embodiment is particularly useful for achieving full utilization of anodes with a thickness greater than about 1 cm, and particularly for anodes having a thickness of 10 cm or more. In this embodiment, as the anode is discharged, the backplane moves with the second surface of the anode in a direction toward the protective membrane, as the compliant seal structure deforms by continuing to fold onto itself in a direction away from the backplane. By this expedience, the compliant seal structure does not bunch/crinkle up on itself in front of the backplane, so thick lithium anodes can be discharged until fully exhausted.

In accordance with the present invention, Li/Seawater batteries of the instant invention having protected anode architectures can deliver very high energy density because they are able to discharge a great deal of lithium. In various embodiments, the Li/Seawater batteries of the instant invention comprise lithium anodes that are at least 2 mm thick, more preferably greater than 5 mm, and even more preferably greater than 10 mm. Moreover, in accordance with the present invention, the lithium can be fully utilized which is to say that the lithium can be discharged to substantially 100% utilization. Accordingly, in various Li/Seawater embodiments, the anode compartment can undergo a thickness decrease that is equivalent to the starting thickness of the lithium anode prior to discharge. In various embodiments the anode compartment thickness decreases by more 2 mm, or more than 5 mm, or more than 10 mm.

Methods

Methods suitable for fabricating protected anode architectures in accordance are described in detail in the examples section which follows. Given this description and the structural and materials parameters and guidance provided herein, the fabrication of protected anode architectures, array and cells in accordance with the present invention would be readily apparent to one skilled in the art. A brief overview is provided, with reference to a particular embodiment:

The compliant seal structures of the present invention may comprise discrete elements or combinations of discrete elements each bonded separately to the protective membrane architecture and anode backplane. Alternatively, in a preferred embodiment, the compliant seal structure is fabricated in the form of a unified article, such as a frame prior to bonding to the anode backplane and protective membrane architecture. In a first operation, the compliant seal structure is preferably formed into a frame of the desired configuration and including a window within the frame that provides an area for placing and bonding the protective membrane architecture(s). For example, a multi-layer laminate material can be molded as described in the examples, into a double step configuration with a window cut-out. Preferably, the shape of the window will be the same as the protective membrane architecture. The inner edge around the frame, which in the case of a double-step configure corresponds to the first step, is bonded to the protective membrane architecture. The first step is used as a bonding platform. The bond, for example, may be formed by a thermal compression of an integrated sealant or by the use of a discrete sealant. The protective membrane architecture is bonded on its peripheral edge to the first step of the compliant seal structure, thus filling the space within the window. Essentially, this forms the top half of the anode compartment. The protective membrane architecture is connected to the active metal anode by methods that are fully described in commonly assigned published US applications US 2004/0197641 and US 2005/0175894, cited and incorporated by reference above. In the instances whereby the protective membrane architecture comprises anolyte, the anolyte is preferably applied to the interlayer after the solid-state membrane has been bonded to the compliant seal structure; see Examples 2-4, below, for details. The anode compartment is then fully enclosed, encapsulating the anode, by the bonding of the outer edge (second step in a double-step configure) of the frame to the anode backplane. The protected anode architectures of the present invention form fully enclosed structures that are isolated from the cathode environment (cathode compartment) and thus can be utilized as an anode in a number of battery cells as described above and illustrated above.

Further details relating to fabrication are provided in the Examples which follow.

EXAMPLES

The following examples provide details illustrating advantageous properties and performance of protected anode architectures having compliant seal structures, components thereof, and battery cells in accordance with the present invention. These examples are provided to exemplify and more clearly illustrate aspects of the present invention and are in no way intended to be limiting.

Example 1

Demonstration of Effectiveness of Compliant Seal

A commercial multi-layer laminate material (MLLM) with the product specification Laminate 95014 (manufactured by Lawson Mardon Flexible, Inc. in Shelbyville, Ky.) was used to make a compliant, hermetic seal to a lithium ion conducting glass-ceramic (GC) membrane. In this case, as well as in all the examples described below, we used the GC membranes, developmental product AG-01, supplied to PolyPlus by the OHARA Corporation. The ionic conductivity of the GC membrane was in the range of $(1.0-1.5) \times 10^{-4}$ S/cm. The membrane was a 1"×1" square with a thickness of 150 micrometers.

The MLLM product Laminate 95014 has a thickness of 118-120 μm and is made of:
PET—Polyethylene terephthalate, 12 μm
ADH—a two-part polyurethane adhesive
Aluminum foil, 32 μm
EAA—Ethacrylic acid (a primer for the aluminum foil; also improves wetting between LDPE and PET)
PET—Polyethylene terephthalate, 12 μm
LDPE—Low density polyethylene
EAA—Ethacrylic acid The LDPE heat-sealable bottom layer served for bonding of the GC membrane surface with the multi-layer laminate. A square hole of 22 mm×22 mm was cut into a sheet of laminate of about 5×6 inches. Bonding of the GC membrane surface with the bottom LDPE layer of the MLLM was performed using a Carver hydraulic press equipped with stainless steel hot plates. The width of the seal was approximately 1.7 mm. The following parameters were used for bonding a 1"×1" GC membrane to the laminate material: pressure of 250 kg, temperature of 100° C., pressing time of 3 minutes.

The resulting laminate was then sealed with a heat sealer on three sides to another laminate of similar dimensions (5"×6") making an open-ended bag. The bag was then filled with approximately 40 ml of 1,2 dimethoxyethane (DME), and the remaining side was heat-sealed to produce a completely sealed bag. The human nose is quite sensitive to the smell of ethers such as DME, and can detect a few ppm. After sealing this bag in the manner described here, no scent of DME was detectable, and no loss of volume of this highly volatile solvent was detected, even after about one year of storage in the bag. Under unsealed conditions the same amount of DME evaporates within a couple of hours. This experiment confirms that the seal between the laminate material and the GC membrane is hermetic and does not deteriorate after long-term storage.

The following examples illustrate the performance of protected anode architectures comprising GC-protected Li anodes and compliant seal structures and demonstrate strength and stability of various modifications of compliant seals.

Example 2

Testing of Double-Sided Protected Lithium Anode with Compliant Seal in Seawater Electrolyte The same method and equipment as described in Example 1 were used to bond the GC membrane (substantially impervious, ionically conductive layer) surface with the MLLM having a square hole of 22 mm×22 mm. The width of the bond was approximately 1.7 mm. Two such structures were fabricated and then sealed together on three of their sides by bonding the bottom LDPE layers of the MLLMs to each other. The impulse heat-sealer Model 14A/A-CAB (Vertrod Corp.) with modified jaws was used for this operation. The resulting open-ended bag had two GC plates bonded to the MLLMs.

A lithium electrode was fabricated in the dry room by pressing two square 22 mm×22 mm pieces of Li foil with a nominal thickness of 0.6 mm (FMC Lithium Inc.) on both sides of Ni foil current collector having the same dimensions and a thickness of 50 µm. The pressing operation was performed in a die with polypropylene block using a pressure of 750 kg for 3 minutes. A Ni strip with a width of 3 mm, a length of approximately 12 cm and a thickness of 50 µm served as an anode terminal tab. This tab was sandwiched between two 5 mm wide strips of the PET film (20 µm in thickness), while both of the tab's ends were left exposed. The Ni foil and the PET films were sealed together with an LDPE glue. As a result, the tab was encapsulated with chemically stable and electrically insulating materials. One of tab's ends was then welded to the Ni current collector.

The Li electrode was wrapped with a 25 µm thick film of microporous Celgard 3401 separator. Then the Li electrode was placed into the open-ended bag described above, such that the 22 mm×22 mm Li squares were aligned with the 22 mm×22 mm areas of the GC plates not covered by the bond on the outside of the bag.

The anode compartment was filled under vacuum with anolyte consisting of non-aqueous electrolyte comprising 1.0 M of $LiClO_4$ salt dissolved in propylene carbonate. Here the non-aqueous electrolyte (anolyte) impregnates the microporous Celgard 3401 separator. The anolyte impregnated Celgard interlayer separates the Li metal surface from the GC membrane (solid electrolyte layer). The moisture concentration in the non-aqueous electrolyte did not exceed 10 ppm. The open end of the bag was then heat-sealed with a vacuum sealer Audionvac VM 101H.

The Ni tab exited the anode compartment between the two MLLMs. The hermetic seal at the junction between the tab and the anode compartment was ensured by the heat-seal bond between the PET layers encapsulating the tab and the thermoplastic LDPE layers of the MLLMs. The resulting hermetically sealed anode compartment was approximately 40 mm×40 mm in size.

The protected anode with compliant seal was tested in a Li/water electrochemical cell with seawater electrolyte. The anode was completely immersed in a glass beaker containing 4 L of synthetic seawater (Ricca Chemical Company) as catholyte. A counter electrode (cathode structure) was fabricated from a Ti Exmet 5Ti7-077FA in the form of a cylinder with a geometrical area of 240 $cm^2$ and was placed against the walls of the same beaker, thus surrounding the anode.

During anode discharge the Ti cathode surface facilitated the cathodic reaction of electrochemical hydrogen evolution from seawater.

The cell also employed an Ag/AgCl reference electrode, which was located in seawater electrolyte near the anode and served for anode potential measurements during discharge. The experimental values of the anode potential versus Ag/AgCl were recalculated into the standard hydrogen electrode (SHE) scale. The anode was discharged at a current density of 0.5 $mA/cm^2$ of Li surface using Maccor battery tester.

Figure 16:
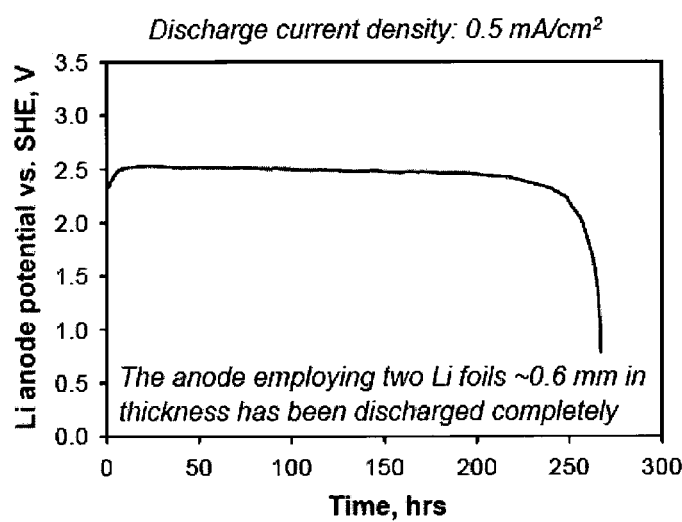
FIG. 16 depicts a plot of the discharge curve of the test cell of Example 2 incorporating a protected anode architecture having a compliant seal structure in accordance with the present invention.

The discharge curve is shown in FIG. 16. Comparison of available anode capacity calculated from the weight of lithium foil placed in the anode compartment and actual discharge capacity shows that discharge is 100% efficient. The entire amount of lithium was discharged from both sides of the Ni current collector across the GC plates into the seawater electrolyte without breaking the GC plates or the seal. There was no sign of deterioration of performance due to water or non-aqueous solvent permeation through the seal and no evidence of gas build-up due to reaction of lithium with water ($Li+H_2O=LiOH+½H_2$) demonstrating that the seal was completely hermetic.

This is the first known example of a compliant seal enabling highly efficient discharge of a packaged anode, which employs large amounts of Li, into aqueous electrolyte. Also, it should be pointed out that the anode compartment, which has a compliant seal and is vacuum-filled with an interlayer electrolyte (no residual air left), contains only incompressible components such as Li and Ni foils and the Celgard separator filled with non-aqueous electrolyte. Therefore, a cell employing such anode compartment is expected to have high tolerance to large isostatic pressures at the depth of the ocean and to function efficiently under these specific conditions.

Example 3

Long-Term Testing of Double-Sided Protected Lithium Anode with Compliant Seal in Aqueous Electrolyte Used in Li/Air Cells In this example, the compliant seal structure included an inorganic layer of $SnN_x$ in the bonded area of the GC surface.

Pre-Forming the MLLM

In this case, the MLLM was molded into a preformed frame. Such performing allows for use of significantly thicker Li foils compared to those used with the unformed MLLMs. Also, it ensures more uniform shrinking (collapsing) of the compliant seal during anode discharge. One more benefit is the potential reduction of the wasted volume of the anode compartment, depending on the frame geometry.

In the first step a square 43 mm×43 mm sheet of MLLM was molded into the shape 1 shown in FIG. 17A using a steel die and applying a pressure of 500 kg. The height H was approximately 1.2 mm and the width of the top $W_1$ was 26 mm. The edges of the bottom step were cut, making its width $W_2$ equal to 2 mm. The bottom opening was in a shape of a square with the side $W_3$ of 31 mm. A square hole of 23 mm×23 mm ($W_4$) with rounded corners (2.0 mm radius) was then cut in the top of the molded MLLM. As a result, a double-step frame 2 shown in FIG. 17B was formed.

Pre-Coating GC Membrane Surface with $SnN_x$

In order to achieve a strong, hermetic bond stable in aqueous and non-aqueous electrolytes the peripheral area of the GC plate (approximately 1.7 mm wide) was coated with a thin film of $SnN_x$ prior to bonding with the MLLM. The $SnN_x$ films have very high chemical resistance to acidic, neutral and basic electrolytes and to non-aqueous electrolytes based on organic carbonates and ethers as well. The film had a thickness of 0.1 μm and was prepared with reactive sputtering of metallic tin in nitrogen plasma using the MRC 8671 sputtering unit. The sputtered $SnN_x$ film adhered to the GC membrane surface very strongly and was well-wetted with LDPE thermoplastic layer of MLLM during heat-sealing.

Bonding the MLLM to the GC Membrane

The next operation was bonding of the top surface of GC membrane 3 with the bottom LDPE layer of the MLLM (see FIG. 17B) using heat-sealing. The width of the seal $W_5$ was approximately 1.2 mm. In this case, the heat sealer employed a stainless steel resistive heating element in the form of a square frame of 26 mm×26 mm with an internal square opening of 23 mm×23 mm. The Power Supply Sorensen DCS8-125E combined with a digital timer was used as a source of pulse voltage for heat-sealing. The design of the heat-sealer allowed us to uniformly heat the areas, where a heat seal was desired, and avoid uncontrolled softening or melting of the thermoplastic LDPE layer in other areas.

Two structures of the type shown in FIG. 17B were fabricated and then sealed together on three of their sides by bonding LDPE layers of the MLLMs' bottom steps to each other. The anode tab was fabricated as described in example 2. Lithium electrode was fabricated as described in example 2, but the Li foil from FMC Lithium Inc. had a thickness close to 1 mm on both sides of the Ni foil current collector. Then the Li electrode was wrapped with a 25 μm thick film of microporous Celgard 3401 separator as interlayer and placed into the open-ended bag as described in Example 2. The anode compartment was vacuum-filled with an anolyte solution of 1.0 M of $LiClO_4$ salt dissolved in propylene carbonate, impregnating the Celgard interlayer with anolyte. The open end of the bag was then heat-sealed and the hermetic seal at the junction between the tab and the anode compartment was ensured by the heat-seal bond. The resulting hermetically sealed anode compartment was 35 mm×35 mm in size.

Figure 18:
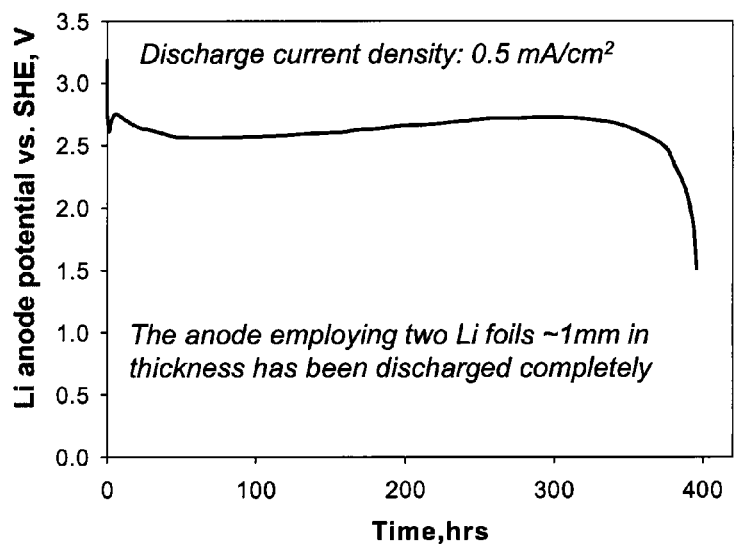
FIG. 18 depicts a plot of the discharge curve of the test cell of Example 3 incorporating a protected anode architecture having a compliant seal structure in accordance with the present invention.

The protected anode architecture with compliant seal was tested in a Li/water electrochemical cell with electrolyte (catholyte) containing 3M $NH_4Cl$, which is used in PolyPlus Li/air batteries with protected Li anode. The electrochemical cell and setup were the same as in Example 2 with the following exceptions: the glass beaker was smaller and contained 200 ml of the aqueous electrolyte; the Ti cathode was smaller and had a geometric area of approximately 50 $cm^2$. The discharge curve at the current density of 0.5 $mA/cm^2$ is shown in FIG. 18. The anode was discharged for 396 hours. The delivered capacity corresponded to 100% of the available capacity of Li, indicating that the seal was hermetic, since any permeation of moisture into the anode compartment would have significantly reduced the delivered capacity. Also, no gas evolution or bubble formation was observed during this long-term discharge. After discharge, the anode was stored further in the same electrolyte (catholyte) under open circuit conditions for 53 days, resulting in the total time of the seal exposure to the aqueous electrolyte and the non-aqueous interlayer electrolyte of 2.5 months. Then, the anode compartment was removed from the aqueous electrolyte (catholyte) and the post-mortem analysis was performed. The bond between the GC plate coated with $SnN_x$ and the MLLM remained strong, and the laminate could not be peeled off from the GC surface. This test demonstrates that the double-sided GC-protected Li anode with compliant seal and thick Li foil performs effectively in aqueous electrolytes (catholytes) used in Li/Air batteries. Also, it shows that the compliant seal architecture including the inorganic layer ($SnN_x$) in the bonded area of the GC surface is stable to aqueous (catholytes) and non-aqueous electrolytes (anolytes) in the long term.

Example 4

Long-Term Testing of Double-Sided Protected Lithium Anode with Compliant Seal in Aqueous Electrolyte (Catholyte) Used in Li/Air Cells In this example, the area of the GC plate (solid electrolyte membrane) bonded to MLLM was etched with concentrated lithium hydroxide prior to bonding.

The anode compartment employing double-sided Li anode and two GC protective plates (substantially impervious, ionically conductive layers) had the same size, contained the same components (including the non-aqueous electrolyte and two Li foils of close to 1 mm in thickness) and was fabricated the same way as in Example 3. The only difference was that coating with an inorganic layer was not performed. Instead, the bonded area of the GC surface was pre-treated with chemical etching prior to bonding the GC plate to MLLM.

The peripheral area of the GC plate (approximately 1.7 mm wide) was etched with 4M LiOH in the following way. The central area of one of the sides of the GC plate and the entire surface of the other side were masked with Kapton tape. Then the GC plate was immersed in a beaker with an aqueous solution of 4M LiOH. After 7 days of storage the plate was rinsed with water, then with diluted acetic acid in order to remove Li carbonate formed due to reaction of LiOH solution with atmospheric $CO_2$, and then again with water. Inspection of the etched GC area under optical microscope demonstrated roughening of the surface. It should be pointed out that the duration of the surface etching could be potentially significantly reduced by performing it at higher temperatures.

Figure 19:
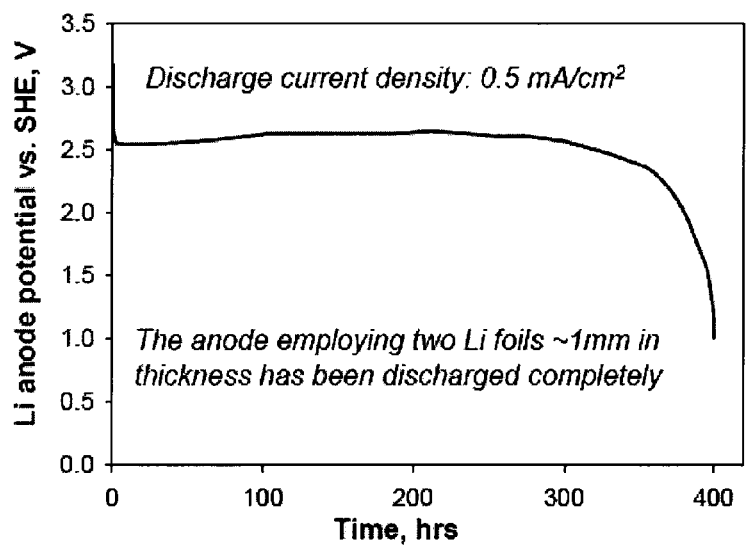
FIG. 19 depicts a plot of the discharge curve of the test cell of Example 4 containing aqueous metal/air cell electrolyte and incorporating a double-sided protected anode architecture having a compliant seal structure in accordance with the present invention.

After the hermetically sealed double-sided protected anode architecture was fabricated, it was electrochemically tested in the same cell containing 3M $NH_4Cl$ as described in the previous example. The obtained discharge curve is shown in FIG. 19. The entire amount of Li placed in the anode compartment was utilized during discharge. There was no sign of damage to GC plates or the seal. 100% efficient discharge confirms that no parasitic corrosion reaction due to Li reaction with water took place during discharge. After discharge, the protected anode was stored further in the same electrolyte (catholyte) under open circuit conditions for 36 days resulting in the total time of the seal exposure to aqueous (catholyte) and non-aqueous electrolytes (anolyte) of 7.5 weeks. The bond between the etched area of GC plate and the MLLM remained strong, and the laminate could not be peeled off from the GC surface. When the anode compartment was opened, no signs of Li corrosion products were observed. These results show that the pre-treatment of the bonded area of the GC surface with concentrated LiOH results in a hermetic seal stable to aqueous (catholyte) and non-aqueous electrolytes (anolytes) in the long term.

Example 5

Testing of Double-Sided Protected Lithium Anode with Compliant Seal in Seawater Electrolyte In this example, a dual sealant structure was used. The primary bond between the GC plate (substantially impervious, ionically conductive layer) and the LDPE layer of MLLM was reinforced with epoxy adhesive (secondary sealant) around the heat-sealed seams.

Figure 20:
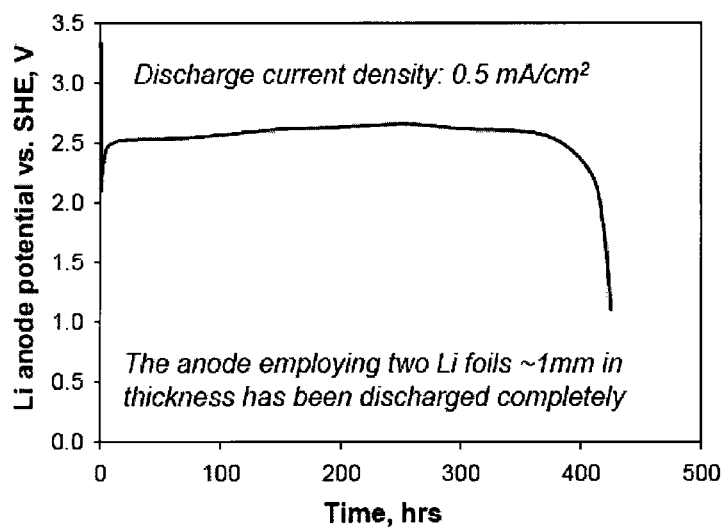
FIG. 20 depicts a plot of the discharge curve of test cell of Example 5 containing seawater as electrolyte and incorporating a double-sided protected anode architecture having a compliant seal structure in accordance with the present invention.

The anode compartment employing double-sided Li anode and two GC protective plates had the same size, contained the same components (including the non-aqueous electrolyte (anolyte) and two Li foils of close to 1 mm in thickness) and was fabricated the same way as in example 3. However, coating with an inorganic layer was not performed. After the anode compartment was fabricated, epoxy adhesive Hysol E-120HP from Loctite Corporation was used to form the secondary seal. A few milliliters of Hysol E-120HP were dispensed from a 50 mL dual cartridge (Item 29353) onto a glass plate and thoroughly mixed. The central area of GC plate was masked, and the mixed adhesive was transferred to the bonded area of the plate. The adhesive completely covered the seam of the primary seal. Then, the adhesive was cured at room temperature for a period of 20 hours. The advantage of forming the secondary seal at room temperature is that it does not affect temperature-sensitive components of the protected anode, in particular the LDPE layer of the MLLM. The resulting hermetically sealed double-sided anode was electrochemically tested in the same cell containing seawater electrolyte, as described in Example 2. The obtained discharge curve at a current density of 0.5 mA/cm$^2$ is shown in FIG. 20. The anode was discharged for 425 hours, and the delivered capacity corresponded to 100% of the available capacity of Li in the anode compartment, indicating a hermetic seal. There was no deterioration of performance due to water or non-aqueous solvent permeation through the seal. There was no evidence of gas build-up due to reaction of Li with water. After discharge, the protected anode was stored in the same catholyte under open circuit conditions for 10 days, resulting in the total time of the seal exposure to seawater and the non-aqueous interlayer electrolyte (anolyte) of four weeks. When the anode was removed from the cell, the seal looked intact. No signs of Li corrosion products were observed in the opened anode compartment. These results indicate that the dual seal employing the epoxy adhesive Hysol E-120HP is hermetic and stable to seawater (catholyte) and non-aqueous electrolytes (anolyte).

Example 6

Fabrication of Double-Sided Protected Lithium Anode Architectures Having an Asymmetric Compliant Seal Structure A multi-layer laminate material (MLLM) manufactured by Alcan Packaging Singen GmbH (Germany) was used to make a compliant, hermetic seal to a lithium ion conducting glass-ceramic (GC) membrane. In this case, as well as in Example 7 and Example 8 described below, GC membranes were used, developmental product AG-01, supplied to PolyPlus by OHARA Corporation. The ionic conductivity of the GC membrane was $1.0 \times 10^{-4}$ S/cm. The membrane was a 1"×1" square with a thickness of 150 micrometers.

The MLLM consisted of the following layers:
PET—Polyethylene terephthalate, 48 gauge
ADH—a two-part polyurethane adhesive
Aluminum foil, 125 gauge
EAA—Ethacrylic acid (a primer for the aluminum foil; also improves wetting between LDPE and PET)
PET—Polyethylene terephthalate, 48 gauge
LDPE—Low density polyethylene
EAA—Ethacrylic acid The LDPE heat-sealable bottom layer served for bonding of the GC membrane surface with the multi-layer laminate.

Figure 21A:
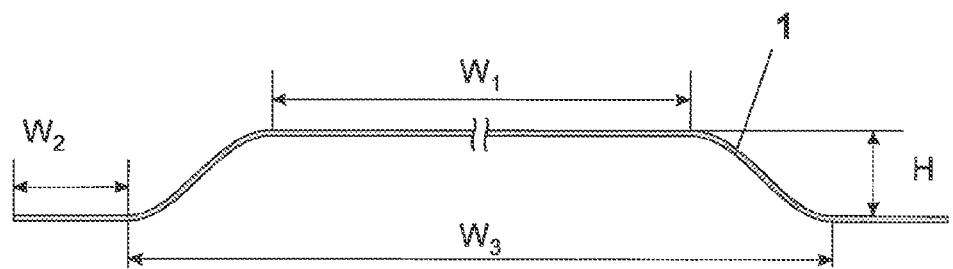
FIGS. 21 A-C illustrate the shape and configuration of multi-layer laminate compliant seal structure of Example 6 in accordance with the present invention.
Figure 21B:
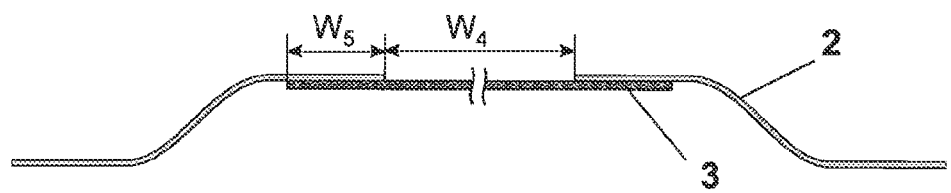
Figure 21C:
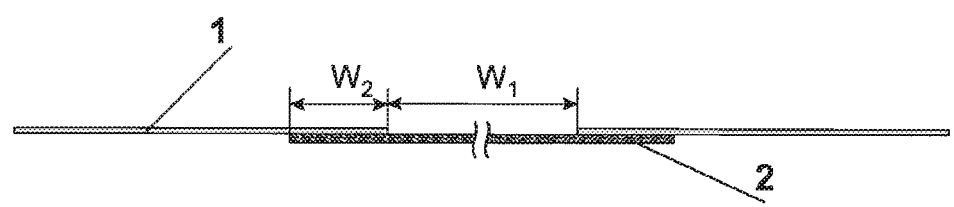

The compliant seal structure was formed from two component seal structures. The first compliant seal structure component is shown in FIGS. 21A-B, and the second component shown in FIG. 21C. The first seal component had a double-step pre-formed frame, and the second seal component, shown in FIG. 21C, had a flat (unformed) frame.

Molding the MLLM into a Preformed Frame

In the first step a square 43 mm×43 mm sheet of MLLM was molded into the shape 1 shown in FIG. 21A using a steel die and applying a pressure of 500 kg. The height H was approximately 1.6 mm and the width of the top $W_1$ was 26 mm. The edges of the bottom step were cut, making its width $W_2$ equal to 2 mm. The bottom opening was in a shape of a square with the side $W_3$ of 31 mm. A square hole of 23 mm×23 mm ($W_4$) with rounded corners (2.0 mm radius) was then cut in the top of the molded MLLM. As a result, a double-step frame 2, shown in FIG. 21B, was formed.

Bonding the MLLM to the GC Membrane

The next operation was bonding of the top surface of GC membrane 3 with the bottom LDPE layer of the preformed MLLM frame (see FIG. 21B) using heat-sealing. The width of the seal $W_5$ was approximately 1.2 mm. In this case, the heat sealer employed a stainless steel resistive heating element in the form of a square frame of 26 mm×26 mm with an internal square opening of 23 mm×23 mm. The Power Supply Sorensen DCS8-125E combined with a digital timer was used as a source of pulse voltage for heat-sealing. The design of the heat-sealer allowed for uniform heating of the areas, where a heat seal was desired, and avoid uncontrolled softening or melting of the thermoplastic LDPE layer in other areas.

Fabrication of Flat Frame

A square hole of 23 mm×23 mm ($W_1$) with rounded corners (2.0 mm radius) was cut in the top of a_square 43 mm×43 mm sheet of MLLM. As a result, a flat frame 1 shown in FIG. 21C was formed.

Bonding of the top surface of GC membrane 2 with the bottom LDPE layer of the flat MLLM frame (see FIG. 21C) was performed using heat-sealing similar to the operation described above for the preformed double-step frame. The width of the seal $W_2$ was approximately 1.2 mm.

Lithium electrode was fabricated in the dry room by pressing two square 22 mm×22 mm pieces of Li foil with a nominal thickness of 1.0 mm (FMC Lithium Inc.) onto both sides of a Ni ExMet current collector having a thickness of 50 μm and dimensions of 21.5 mm×21.5 mm. The pressing operation was performed in a die with a polypropylene block using a pressure of 750 kg for 3 minutes. A Ni strip with a width of 3 mm, a length of approximately 12 cm and a thickness of 50 μm served as the anode terminal tab. This tab was sandwiched between two 5 mm wide strips of the PET film (20 μm in thickness), while both of the tab's ends were left exposed. The Ni foil and the PET films were sealed together with an LDPE glue. As a result, the tab was encapsulated with chemically stable and electrically insulating materials. One of tab's ends was then welded to the Ni ExMet current collector.

The Li electrode was wrapped with a 25 μm thick film of microporous Celgard 3401 separator. Then, the Li electrode was placed between two compliant seal structure components, shown in FIG. 20B and FIG. 20C, such that the 22 mm×22 mm Li squares were aligned with the 22 mm×22 mm areas of the GC plates not covered by the heat-seal bond with MLLM. Then, these structures were sealed together on three of their sides by bonding the LDPE layers of the flat and pre-formed frames to each other. As a result, a bag with an open end was formed.

The anode compartment was filled under vacuum with a non-aqueous electrolyte comprising 1.0 M of $LiN(CF_3SO_2)_2$ salt dissolved in a mixture (1:1 by volume) of ethylene carbonate and dimethyl carbonate. Here the non-aqueous electrolyte acted as a liquid anolyte and the anolyte impregnated into the microporous Celgard separator, which acted as the interlayer, separating the Li metal surface from the GC membrane. The moisture concentration in the non-aqueous electrolyte did not exceed 10 ppm.

The open end of the bag, which played a role of an anode compartment filling port, was then heat-sealed, and the hermetic seal at the junction between the tab and the anode compartment was ensured by the heat-seal bond. As a result, a hermetically sealed double-sided protected anode architecture having an asymmetric compliant seal was fabricated.

Example 7

Testing of Double-Sided Protected Lithium Anode Having Asymmetric Compliant Seal in Seawater Electrolyte The protected anode architecture with asymmetric compliant seal, the fabrication of which was described in Example 6, was tested in a Li/Water electrochemical cell with seawater electrolyte. The protected anode architecture was completely immersed in a glass beaker containing 4 L of synthetic seawater (Ricca Chemical Company). A counter electrode (cathode) was fabricated from a Ti Exmet 5Ti7-077FA in the form of a cylinder with a geometrical area of 240 $cm^2$ and was placed against the walls of the same beaker, thus surrounding the anode.

During anode discharge the Ti cathode surface facilitated the cathodic reaction of electrochemical hydrogen evolution from seawater.

The cell also employed an Ag/AgCl reference electrode, which was located in seawater electrolyte near the protected anode architecture and served for anode potential measurements during discharge. The experimental values of the anode potential versus Ag/AgCl were recalculated into the standard hydrogen electrode (SHE) scale. The anode was discharged at a current density of 0.5 mA/$cm^2$ of Li surface using Maccor battery tester.

Figure 22:
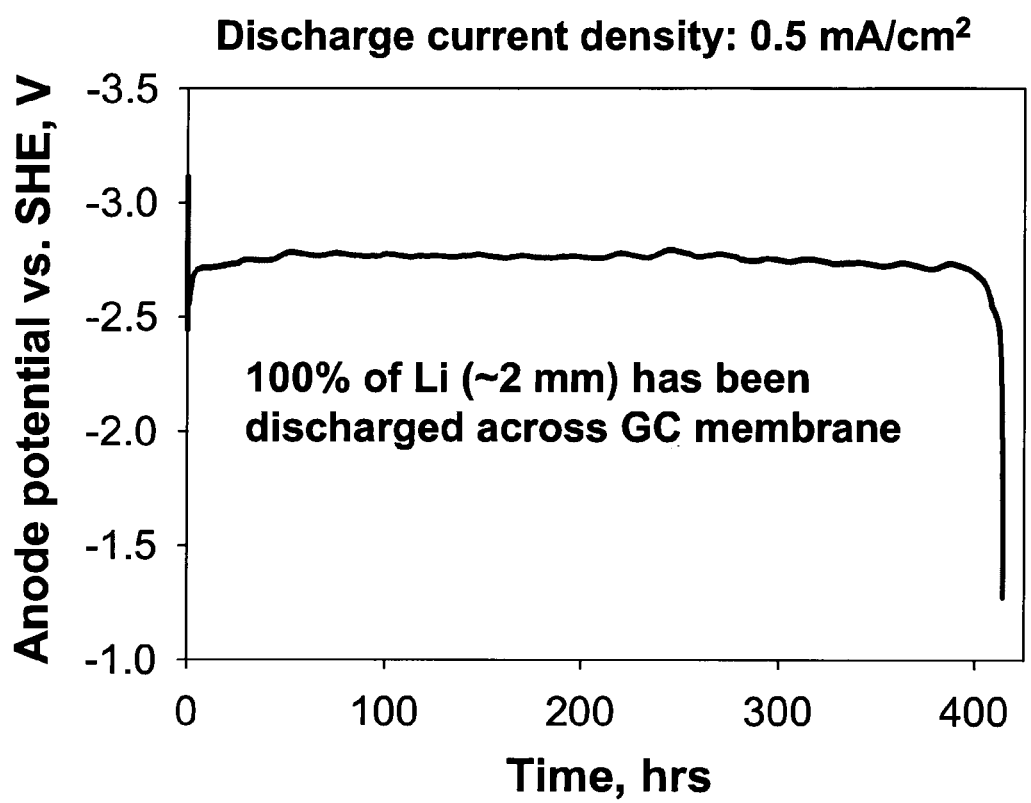
FIG. 22 depicts a plot of the discharge curve of the test cell of Example 7 containing seawater as electrolyte and incorporating a double-sided protected anode architecture having an asymmetric compliant seal structure in accordance with the present invention.

The discharge curve is shown in FIG. 22. Comparison of available anode capacity calculated from the weight of lithium foil placed in the anode compartment and actual discharge capacity shows that discharge is 100% efficient. The entire amount of lithium was discharged from both sides of the Ni ExMet current collector across the GC plates into seawater electrolyte without breaking the GC plates or the seal. The asymmetric compliant seal structure collapsed in a uniform fashion. There was no sign of deterioration of performance due to water or non-aqueous solvent permeation through the seal and no evidence of gas build-up due to reaction of lithium with water.

Example 8

Figure 23:
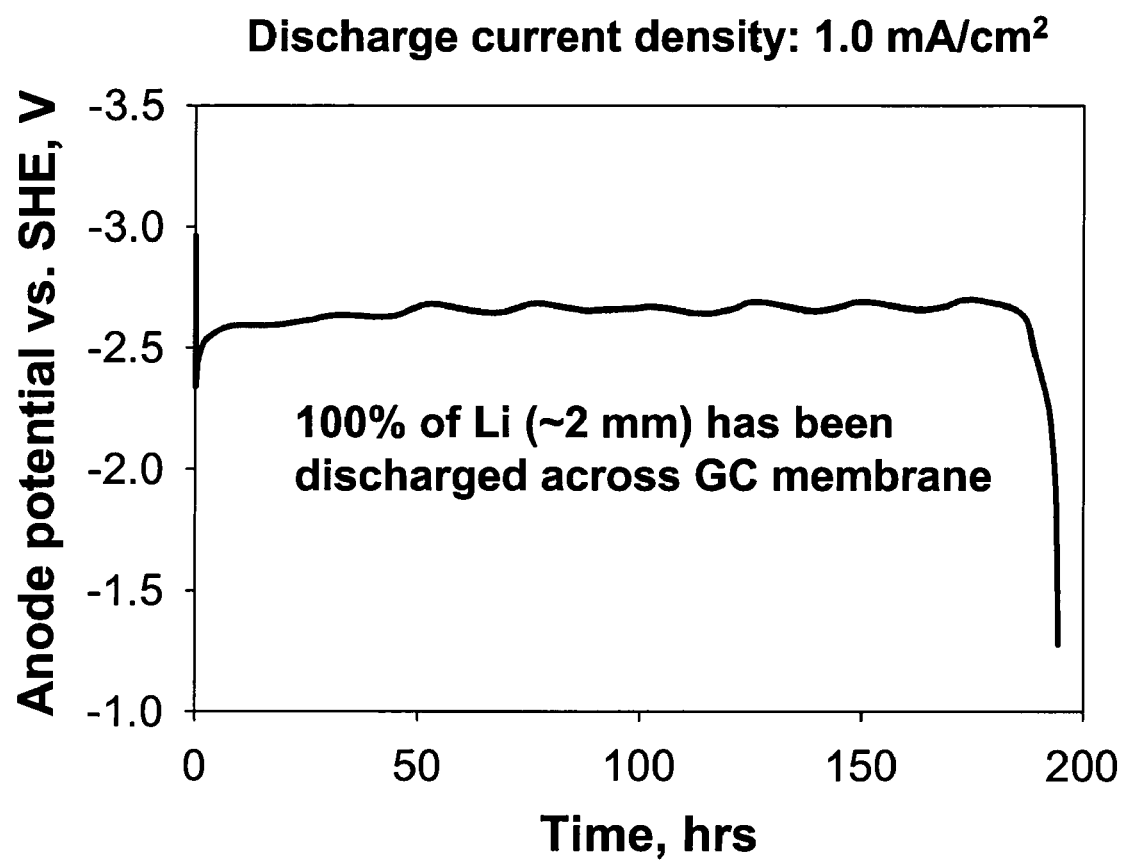
FIG. 23 depicts a plot of the discharge curve of the test cell of Example 8 incorporating a double-sided protected anode architecture having an asymmetric compliant seal structure in accordance with the present invention.

Testing of Double-Sided Protected Lithium Anode Having Asymmetric Compliant Seal in Electrolyte of Li/Air Batteries The protected anode architecture with asymmetric compliant seal structure, the fabrication of which was described in Example 6, was tested in a Li/Water electrochemical cell with electrolyte containing 4M $NH_4Cl$, which is used in PolyPlus Li/Air batteries with protected Li anode. The electrochemical cell and setup were the same as in Example 7 with the following exceptions: the glass beaker was smaller and contained 200 ml of the aqueous electrolyte; the Ti cathode was smaller and had a geometric area of approximately 50 $cm^2$. The discharge curve at the current density of 1.0 mA/$cm^2$ is shown in FIG. 23. It was observed that the asymmetric seal collapsed in a uniform fashion. The delivered capacity corresponded to 100% of the available capacity of Li, indicating that the seal was hermetic, since any permeation of moisture into the anode compartment would have significantly reduced the delivered capacity. Also, no gas evolution or bubble formation was observed during this long-term discharge.

The results described in Examples 7 and 8 have demonstrated the effectiveness of a protected anode architecture employing an asymmetric compliant seal structure in Li/Water and Li/Air batteries.

In conclusion, the results described in Examples 1-8 have experimentally proved the concept of compliant seal structures and have demonstrated the effectiveness of protected anode architectures employing such seals in Li/Water and Li/Air batteries.

CONCLUSION

Although the foregoing invention has been described in some detail for purposes of clarity of understanding, it will be apparent that certain changes and modifications may be practiced within the scope of the invention. While the invention has been described in conjunction with some specific embodiments, it will be understood that it is not intended to limit the invention to such specific embodiments. On the contrary, it is intended to cover alternatives, modifications, and equivalents as may be included within the spirit and scope of the invention as defined by the appended claims.

All references cited herein are incorporated by reference for all purposes.

What is claimed:

1. A protected anode architecture, comprising:
   an active metal anode having a first surface and a second surface;
   an ionically conductive protective membrane architecture in physical continuity with the first surface of the anode;
   an active metal anode backplane in physical continuity with the second surface of the anode; and
   a compliant seal structure interfacing with the protective membrane architecture and the anode backplane to enclose the anode in an anode compartment, the seal structure being compliant to changes in anode thickness such that physical continuity between the anode, protective architecture and backplane are maintained;
   wherein the ionically conductive protective membrane architecture comprises one or more materials configured to provide a first membrane surface chemically compatible with the active metal of the anode in contact with the anode, and a second membrane surface substantially impervious to and chemically compatible with an environment exterior to the anode compartment; and wherein the seal structure interfaces with the protective membrane architecture and the anode backplane such that a substantially impervious barrier between the interior and exterior of the anode compartment is provided.

2. The protected anode architecture of claim 1, wherein the interfacing of the compliant seal structure with the protective membrane is via a rigid-member, and said rigid member forms a portion of the anode compartment enclosure.

3. The protected anode architecture of claim 2, wherein the anode backplane is a single piece of contiguous material forming both the backplane and the compliant seal structure.

4. The protected anode architecture of claim 3, wherein the backplane translates along with the second surface of the anode during discharge.

5. The protected anode architecture of claim 4, wherein the protective membrane architecture is prevented from translating with the first surface of the anode during discharge.

6. The protected anode architecture of claim 5 wherein the anode backplane translates by more than 1 cm.

7. The protected anode architecture of claim 1, wherein the anode backplane translates along with the second surface of the anode and the protective membrane architecture translates along the first surface of the anode during discharge and charge.

8. The protected anode architecture of claim 7, wherein at least one of the anode backplane and protective membrane architecture translates a distance of greater than 250 microns during discharge.

9. The protected anode architecture of claim 1, wherein the thickness of the anode compartment decreases by more than 500 microns during discharge.

10. A battery cell, comprising:
protected anode architecture, comprising,
an active metal anode having a first surface and a second surface,
an ionically conductive protective membrane architecture on the first surface of the anode,
an active metal anode backplane on the second surface of the anode; and
a seal structure interfacing with the protective membrane architecture and the anode backplane to enclose the anode in an anode compartment, the seal structure being compliant to changes in anode thickness such that physical continuity between the anode, protective architecture and backplane are maintained;
a cathode compartment in contact with the ionically conductive protective membrane architecture, the cathode compartment comprising a cathode structure and a catholyte, wherein the cathode structure comprises an electronically conductive component, and at least one of the cathode structure and the catholyte comprises at least one of an ionically conductive component and an electrochemically active component, wherein at least one of the cathode structure and the catholyte component comprises an active metal corrosive constituent;
wherein the ionically conductive protective membrane architecture comprises one or more materials configured to provide a first membrane surface chemically compatible with the active metal of the anode in contact with the anode, and a second membrane surface substantially impervious to and chemically compatible with the cathode compartment and
wherein the seal structure is bound to the protective membrane and the anode backplane such that a substantially impervious barrier between the interior and exterior of the anode compartment is provided.

11. The battery cell of claim 10 wherein during discharge at least one of the anode backplane and protective membrane architecture translates under the influence of an external force.

12. The battery cell of claim 11 wherein the cathode compartment comprises seawater and the external force comprises hydrostatic pressure.

13. The battery cell of claim 12, wherein the thickness of the anode compartment decreases by more than 5 mm.

14. The battery cell of claim 12 wherein the cathode comprises air, and the external force comprises a force brought about by a volume expansion of the cathode compartment.

15. The battery cell of claim 14, wherein the thickness of the anode compartment decreases by more than about 2 mm.

16. A method of making a protected anode structure, comprising:
providing,
an active metal anode having a first surface and a second surface;
an ionically conductive protective membrane architecture in physical continuity with the first surface of the anode;
an active metal anode backplane in physical continuity with the second surface of the anode; and
interfacing the protective membrane architecture with the anode backplane and a compliant seal structure to enclose the anode in an anode compartment, the seal structure being compliant to changes in anode thickness such that physical continuity between the anode, protective architecture and backplane are maintained;
wherein the ionically conductive protective membrane architecture comprises one or more materials configured to provide a first membrane surface chemically compatible with the active metal of the anode in contact with the anode, and a second membrane surface substantially impervious to and chemically compatible with an environment exterior to the anode compartment; and
wherein the compliant seal structure interfaces with the protective membrane architecture and the anode backplane such that a substantially impervious barrier between the interior and exterior of the anode compartment is provided.

17. A method of increasing the energy density of a metal air battery, wherein said method comprises the steps
providing a battery cell comprising
a protected anode architecture, comprising,
an active metal anode having a first surface and a second surface,
an ionically conductive protective membrane architecture on the first surface of the anode,
an active metal anode backplane on the second surface of the anode; and
a seal structure interfacing with the protective membrane architecture and the anode backplane to enclose the anode in an anode compartment, the seal structure being compliant to changes in anode thickness such that physical continuity between the anode, protective architecture and backplane are maintained;
a cathode compartment in contact with the ionically conductive protective membrane architecture, the cathode compartment comprising a cathode structure and a catholyte, wherein the cathode structure comprises an electronically conductive component, and at least one of the cathode structure and the catholyte comprises at least one of an ionically conductive component and an electrochemically active component, wherein at least one of the cathode structure and the catholyte component comprises an active metal corrosive constituent;

wherein the ionically conductive protective membrane architecture comprises one or more materials configured to provide a first membrane surface chemically compatible with the active metal of the anode in contact with the anode, and a second membrane surface substantially impervious to and chemically compatible with the cathode compartment and wherein the seal structure is bound to the protective membrane and the anode backplane such that a substantially impervious barrier between the interior and exterior of the anode compartment is provided;

wherein the volume increase that occurs in the cathode compartment, is compensated by a decrease in the volume of the anode compartment.

18. A method of improving the durability of a protected anode architecture that is disposed in seawater and under the influence of hydrostatic pressure, said method comprising the steps of providing a protected anode architecture comprising, an active metal anode having a first surface and a second surface;

an ionically conductive protective membrane architecture in physical continuity with the first surface of the anode;

an active metal anode backplane in physical continuity with the second surface of the anode; and a compliant seal structure interfacing with the protective membrane architecture and the anode backplane to enclose the anode in an anode compartment, the seal structure being compliant to changes in anode thickness such that physical continuity between the anode, protective architecture and backplane are maintained;

wherein the ionically conductive protective membrane architecture comprises one or more materials configured to provide a first membrane surface chemically compatible with the active metal of the anode in contact with the anode, and a second membrane surface substantially impervious to and chemically compatible with an environment exterior to the anode compartment; and wherein the seal structure interfaces with the protective membrane architecture and the anode backplane such that a substantially impervious barrier between the interior and exterior of the anode compartment is provided; and filling said anode compartment with an incompressible fluid.

* * * * *